(12) United States Patent
Hersh

(10) Patent No.: US 11,672,215 B2
(45) Date of Patent: Jun. 13, 2023

(54) AEROPONIC PLANT GROWING SYSTEM

(71) Applicant: Sentient Design, Inc., San Diego, CA (US)

(72) Inventor: Douglas Evan Hersh, San Diego, CA (US)

(73) Assignee: Sentient Design, Inc., San Diego, CA (US)

( * ) Notice: Subject to any disclaimer, the term of this patent is extended or adjusted under 35 U.S.C. 154(b) by 86 days.

(21) Appl. No.: 16/990,736

(22) Filed: Aug. 11, 2020

(65) Prior Publication Data

US 2021/0212276 A1  Jul. 15, 2021

Related U.S. Application Data

(60) Provisional application No. 62/960,065, filed on Jan. 12, 2020.

(51) Int. Cl.
*A01G 31/06* (2006.01)
(52) U.S. Cl.
CPC .................................. *A01G 31/06* (2013.01)
(58) Field of Classification Search
CPC ........ A01G 31/06; A01G 9/247; A01G 9/023; A01G 9/022
See application file for complete search history.

(56) References Cited

U.S. PATENT DOCUMENTS

| | | | |
|---|---|---|---|
| 3,550,319 A * | 12/1970 | Gaines, Jr. | A01G 31/02 47/79 |
| 4,033,072 A | 7/1977 | Kobayashi et al. | |
| 4,123,873 A | 11/1978 | Canova | |
| 4,216,617 A | 8/1980 | Schmidt | |
| 4,218,847 A | 8/1980 | Leroux | |
| 4,268,994 A | 5/1981 | Urai | |
| 4,514,930 A | 5/1985 | Schorr et al. | |
| 4,574,520 A | 3/1986 | Arledge | |
| 4,594,811 A | 6/1986 | Tokoro | |

(Continued)

FOREIGN PATENT DOCUMENTS

| | | |
|---|---|---|
| AT | 161140 T | 1/1998 |
| AU | 649579 B1 | 5/1994 |

(Continued)

*Primary Examiner* — Magdalena Topolski
*Assistant Examiner* — Katherine Anne Kloecker
(74) *Attorney, Agent, or Firm* — Lukas IP; Rimas T. Lukas

(57) ABSTRACT

An aeroponic grow tower is provided. The tower includes a modular wall system located between a cover and a base. The wall system includes a plurality of individual flat, four-sided wall panels. The identical wall panels are removably connected along their side edges into one or more levels having a polygonal shape. Levels are aligned and stack atop the base and each other. The wall panels have openings defining grow sites configured to support plants such that foliage extends to the outside and roots hang inside the tower. A pump delivers nutrient solution from the base to a high-rotational speed spray nozzle which aerosolizes the solution. The spray also impacts the interior surface further aerosolizing the solution. Channels direct the solution running down the interior surface to the grow sites which include secondary reservoirs to provide a further source of nutrient solution. A ventilation system and seedling covers are also provided.

21 Claims, 48 Drawing Sheets

(56) References Cited

U.S. PATENT DOCUMENTS

| | | |
|---|---|---|
| 4,756,120 A | 7/1988 | Arledge |
| 4,869,019 A | 9/1989 | Ehrlich |
| 4,986,027 A | 1/1991 | Harvey |
| 5,099,606 A | 3/1992 | Koerper |
| 5,309,671 A | 5/1994 | Byun |
| 5,363,594 A | 11/1994 | Davis |
| 5,440,836 A | 8/1995 | Lee |
| 5,502,923 A | 4/1996 | Bradshaw |
| 5,724,768 A | 3/1998 | Ammann, Jr. |
| 5,918,416 A | 7/1999 | Ammann, Jr. |
| 6,477,805 B2 | 11/2002 | Ware |
| 6,502,350 B1 | 1/2003 | Dick |
| 6,615,542 B2 | 9/2003 | Ware |
| 7,055,282 B2 | 6/2006 | Bryan, III |
| 7,080,482 B1 | 7/2006 | Bradley |
| 7,143,544 B2 | 12/2006 | Roy |
| 7,184,846 B2 | 2/2007 | Albright et al. |
| 7,243,460 B2 | 7/2007 | Darlington |
| 7,516,574 B2 | 4/2009 | Gottlieb et al. |
| 7,617,632 B1 | 11/2009 | Imm |
| 7,757,436 B2 | 7/2010 | Bindschedler et al. |
| 7,785,207 B2 | 8/2010 | Henry et al. |
| 7,877,927 B2 | 2/2011 | Roy et al. |
| 7,913,452 B1 | 3/2011 | Imm |
| 7,921,601 B2 | 4/2011 | Henry et al. |
| D638,743 S | 5/2011 | Bouchard et al. |
| D653,156 S | 1/2012 | Phelps et al. |
| 8,096,892 B2 | 1/2012 | Henry et al. |
| D658,536 S | 5/2012 | Roch |
| D658,537 S | 5/2012 | Simmons |
| 8,181,391 B1 | 5/2012 | Giacomantonio |
| 8,225,549 B2 | 7/2012 | Simmons |
| 8,250,809 B2 | 8/2012 | Simmons |
| 8,266,840 B2 | 9/2012 | Jung |
| 8,365,466 B1 | 2/2013 | Storey |
| 8,484,890 B2 | 7/2013 | Simmons |
| 8,495,833 B2 | 7/2013 | Cussol et al. |
| 8,505,238 B2 | 8/2013 | Luebbers et al. |
| 8,549,788 B2 | 10/2013 | Bryan, III |
| 8,776,433 B2 | 7/2014 | Huang et al. |
| 8,778,184 B2 | 7/2014 | Byrd |
| 8,893,431 B2 | 11/2014 | Busch et al. |
| 8,919,040 B2 | 12/2014 | Galvan |
| 8,966,815 B1 | 3/2015 | Smiles |
| 9,010,022 B2 | 4/2015 | Brusatore |
| 9,032,665 B2 | 5/2015 | Whitney |
| 9,043,962 B2 | 6/2015 | Trofe |
| 9,101,099 B2 | 8/2015 | Nagels et al. |
| 9,220,207 B2 | 12/2015 | Storey |
| 9,258,948 B2 | 2/2016 | Dos Santos |
| D752,478 S | 3/2016 | Cudmore et al. |
| D754,559 S | 4/2016 | Liang |
| 9,332,695 B2 | 5/2016 | Hwang |
| D758,917 S | 6/2016 | Smith |
| D758,918 S | 6/2016 | Smith |
| 9,357,715 B2 | 6/2016 | Cottrell |
| 9,374,952 B1 | 6/2016 | Cross |
| D760,622 S | 7/2016 | Ogden |
| 9,380,751 B2 | 7/2016 | Storey |
| 9,420,768 B2 | 8/2016 | Kasner et al. |
| 9,445,557 B2 | 9/2016 | Darlington |
| 9,491,915 B2 | 11/2016 | Storey |
| 9,591,814 B2 | 3/2017 | Collins et al. |
| 9,606,553 B2 | 3/2017 | Faris |
| 9,622,427 B2 | 4/2017 | Wagner |
| D809,965 S | 2/2018 | Linneberg |
| 10,028,456 B2* | 7/2018 | Mackichan ........ A01G 13/0281 |
| 10,136,594 B2 | 11/2018 | Blank |
| 10,986,791 B2* | 4/2021 | Klein .................... A01G 31/06 |
| 11,089,744 B2* | 8/2021 | Moffitt .................... A01G 9/20 |
| 2002/0040548 A1 | 4/2002 | Ware |
| 2003/0089037 A1 | 5/2003 | Ware |
| 2005/0039397 A1 | 2/2005 | Roy |
| 2005/0055879 A1 | 3/2005 | Darlington |
| 2006/0032128 A1 | 2/2006 | Bryan, III |
| 2006/0162252 A1 | 7/2006 | Lim |
| 2007/0051038 A1 | 3/2007 | Henry et al. |
| 2007/0051039 A1 | 3/2007 | Henry et al. |
| 2007/0144069 A1 | 6/2007 | Gottlieb et al. |
| 2008/0209805 A1 | 9/2008 | Dau et al. |
| 2008/0295402 A1 | 12/2008 | Bindschedler et al. |
| 2009/0007486 A1 | 1/2009 | Corradi |
| 2009/0265986 A1 | 10/2009 | Young |
| 2009/0293357 A1 | 12/2009 | Vickers et al. |
| 2010/0154301 A1 | 6/2010 | Song |
| 2010/0313473 A1 | 12/2010 | Cussol et al. |
| 2011/0061296 A1 | 3/2011 | Simmons |
| 2011/0061297 A1 | 3/2011 | Simmons |
| 2011/0232190 A1 | 9/2011 | Pindus et al. |
| 2012/0085026 A1 | 4/2012 | Morris |
| 2012/0167460 A1 | 7/2012 | Omidi |
| 2012/0256018 A1* | 10/2012 | Lange ..................... B05B 3/002 |
| | | 239/587.1 |
| 2012/0279126 A1 | 11/2012 | Simmons |
| 2012/0297678 A1 | 11/2012 | Luebbers et al. |
| 2012/0297679 A1 | 11/2012 | Busch et al. |
| 2013/0067813 A1 | 3/2013 | Storey |
| 2013/0067814 A1 | 3/2013 | Riley et al. |
| 2013/0118074 A1 | 5/2013 | Fulbrook |
| 2013/0160363 A1 | 6/2013 | Whitney et al. |
| 2013/0219788 A1 | 8/2013 | Vanlente |
| 2014/0000162 A1* | 1/2014 | Blank ..................... A01G 31/06 |
| | | 47/62 A |
| 2014/0000163 A1 | 1/2014 | Lin |
| 2014/0083007 A1 | 3/2014 | Galvan |
| 2014/0138456 A1* | 5/2014 | Lev .................... H04N 1/00278 |
| | | 239/11 |
| 2014/0190079 A1 | 7/2014 | Neola |
| 2014/0223816 A1 | 8/2014 | Parker |
| 2014/0283450 A1 | 9/2014 | Darlington |
| 2014/0290137 A1 | 10/2014 | Nagels et al. |
| 2014/0311029 A1 | 10/2014 | Anderson et al. |
| 2014/0311030 A1 | 10/2014 | Anderson et al. |
| 2015/0040477 A1 | 2/2015 | Wang et al. |
| 2015/0121756 A1 | 5/2015 | Dos Santos |
| 2015/0181821 A1 | 7/2015 | Park |
| 2015/0223418 A1 | 8/2015 | Collins et al. |
| 2015/0250114 A1 | 9/2015 | Storey |
| 2015/0264899 A1 | 9/2015 | Kasner et al. |
| 2015/0313104 A1 | 11/2015 | Cottrell |
| 2015/0334930 A1 | 11/2015 | Stoltzfus et al. |
| 2016/0037739 A1 | 2/2016 | Fankuchen et al. |
| 2016/0050863 A1 | 2/2016 | Graber |
| 2016/0100535 A1 | 4/2016 | Daugirdas |
| 2016/0120141 A1* | 5/2016 | Stolzfus .................. A01G 31/06 |
| | | 47/62 A |
| 2016/0135394 A1 | 5/2016 | Wagner |
| 2016/0135398 A1 | 5/2016 | Mathieu et al. |
| 2016/0143234 A1 | 5/2016 | Nasu |
| 2016/0198650 A1 | 7/2016 | Lahaeye |
| 2016/0227722 A1 | 8/2016 | Storey |
| 2016/0295820 A1 | 10/2016 | Aykroyd et al. |
| 2016/0353674 A1 | 12/2016 | Keats |
| 2017/0027119 A1 | 2/2017 | Storey |
| 2017/0055460 A1 | 3/2017 | Brusatore |
| 2017/0055473 A1* | 3/2017 | Baker ..................... A01G 31/06 |
| 2017/0086399 A1 | 3/2017 | Anderson et al. |
| 2017/0105360 A1 | 4/2017 | Kingelin et al. |
| 2017/0105372 A1 | 4/2017 | Bryan, III |
| 2017/0150686 A1 | 6/2017 | Erbacher |
| 2018/0042191 A1* | 2/2018 | Blackburn ............. A01G 31/06 |
| 2018/0064037 A1* | 3/2018 | Tyink ..................... A01G 7/045 |
| 2018/0263201 A1 | 9/2018 | Linneberg |
| 2021/0161091 A1* | 6/2021 | Tyink ........................ F21S 4/28 |
| 2022/0162860 A1* | 5/2022 | Sherman ............. E04F 13/0875 |

FOREIGN PATENT DOCUMENTS

| | | |
|---|---|---|
| AU | 1885497 A | 9/1997 |
| AU | 3666900 A | 11/2000 |
| AU | 763928 B2 | 8/2003 |
| AU | 2003221583 A1 | 11/2003 |
| AU | 2006274753 A1 | 2/2007 |

(56) References Cited

FOREIGN PATENT DOCUMENTS

| | | | |
|---|---|---|---|
| AU | 2008337673 A1 | 6/2009 | |
| AU | 2009321277 A1 | 7/2011 | |
| AU | 2008337673 B2 | 9/2013 | |
| AU | 2014204038 A1 | 7/2015 | |
| AU | 2010311208 B2 | 5/2016 | |
| CA | 1107069 A | 8/1981 | |
| CA | 1233643 A | 3/1988 | |
| CA | 2082278 A1 | 9/1992 | |
| CA | 1315553 C | 4/1993 | |
| CA | 2359920 A1 | 1/2002 | |
| CA | 2488178 A1 | 2/2006 | |
| CA | 2590685 A1 | 7/2006 | |
| CA | 2335074 C | 1/2007 | |
| CA | 2223685 C | 2/2007 | |
| CA | 2608655 C | 4/2009 | |
| CA | 2773851 A1 | 3/2011 | |
| CA | 2779344 A1 | 5/2011 | |
| CA | 2675414 C | 11/2011 | |
| CA | 2836409 A1 | 12/2011 | |
| CN | 1108466 A | 9/1995 | |
| CN | 1205163 A | 1/1999 | |
| CN | 1090897 C | 9/2002 | |
| CN | 2636617 Y | 9/2004 | |
| CN | 2852672 Y | 1/2007 | |
| CN | 201869637 U | 6/2011 | |
| CN | 102845292 A | 1/2013 | |
| CN | 202759956 U | 3/2013 | |
| CN | 103004571 A | 4/2013 | |
| CN | 203136714 U | 8/2013 | |
| CN | 204032009 U | 12/2014 | |
| CN | 204443485 U | 7/2015 | |
| CN | 105123483 A | 12/2015 | |
| CN | 107771030 A * | 3/2018 | ............ A01G 31/02 |
| CN | 110050602 A * | 7/2019 | |
| CO | 6210768 A2 | 10/2010 | |
| DE | 3800095 A1 | 7/1989 | |
| DE | 69512618 T2 | 5/2000 | |
| DE | 60307623 T2 | 9/2007 | |
| DE | 102015004112 B3 | 5/2016 | |
| DE | 102015004112 B3 * | 5/2016 | ............ A01G 31/02 |
| EP | 0004103 A1 | 9/1979 | |
| EP | 0004103 B1 | 11/1981 | |
| EP | 0098474 A2 | 1/1984 | |
| EP | 0098474 A3 | 7/1985 | |
| EP | 0166057 A2 | 1/1986 | |
| EP | 0533939 A1 | 3/1993 | |
| EP | 0610137 A1 | 8/1994 | |
| EP | 0717923 A1 | 6/1996 | |
| EP | 0610137 B1 | 12/1997 | |
| EP | 0717923 B1 | 10/1999 | |
| EP | 0959664 A1 | 12/1999 | |
| EP | 0920247 B1 | 5/2001 | |
| EP | 1210868 A1 | 6/2002 | |
| EP | 1583416 A1 | 10/2005 | |
| EP | 2575428 A2 | 4/2013 | |
| EP | 2493282 B1 | 4/2014 | |
| EP | 2842415 A1 | 3/2015 | |
| EP | 2904894 A4 | 6/2016 | |
| EP | 2904895 B1 | 6/2017 | |
| ES | 478119 A1 | 11/1979 | |
| FR | 2700918 A1 | 8/1994 | |
| FR | 2700918 B1 | 4/1995 | |
| FR | 2888678 A1 * | 1/2007 | ............ H01R 35/04 |
| FR | 2923139 B1 | 12/2009 | |
| FR | 2956283 A1 | 8/2011 | |
| FR | 2956283 B1 | 3/2012 | |
| FR | 3066069 A1 | 11/2018 | |
| FR | 3070235 A1 | 3/2019 | |
| GB | 1587550 A | 4/1981 | |
| GB | 2070403 A | 9/1981 | |
| GB | 2070403 B | 8/1983 | |
| GB | 2147484 A | 5/1985 | |
| GB | 2406031 A | 3/2005 | |
| GB | 2431328 A | 4/2007 | |
| GB | 2536127 B | 5/2017 | |
| IM | 924272 L | 12/1992 | |
| IT | 1155847 B | 1/1987 | |
| JP | H10327675 A | 12/1998 | |
| JP | 2006262879 A | 10/2006 | |
| JP | 2008092859 A | 4/2008 | |
| JP | 2009065926 A | 4/2009 | |
| JP | 2013509172 A | 3/2013 | |
| KR | 1019960009840 A | 4/1996 | |
| KR | 20090050563 A | 5/2009 | |
| KR | 101124280 B1 | 3/2012 | |
| KR | 101249925 B1 | 4/2013 | |
| KR | 101325537 B1 | 11/2013 | |
| KR | 101384684 B1 | 4/2014 | |
| KR | 101477087 B1 | 12/2014 | |
| KR | 20160049257 A | 5/2016 | |
| KR | 20160118219 A | 10/2016 | |
| NZ | 509411 A | 8/2003 | |
| RU | 2163755 C1 | 3/2001 | |
| RU | 2496307 C1 | 10/2013 | |
| TW | 201633900 A | 10/2016 | |
| WO | 9215194 A1 | 9/1992 | |
| WO | 9413129 A1 | 6/1994 | |
| WO | 9730579 A1 | 8/1997 | |
| WO | 0044220 A1 | 8/2000 | |
| WO | 0064241 A1 | 11/2000 | |
| WO | 0209500 A1 | 2/2002 | |
| WO | 02069694 A1 | 9/2002 | |
| WO | 03092355 A1 | 11/2003 | |
| WO | 2004047521 A1 | 6/2004 | |
| WO | 2006070164 A1 | 7/2006 | |
| WO | 2008088108 A1 | 7/2008 | |
| WO | 2008088133 A1 | 7/2008 | |
| WO | 2009025514 A2 | 2/2009 | |
| WO | 2009025514 A3 | 4/2009 | |
| WO | 2009092905 A3 | 9/2009 | |
| WO | 2010061292 A1 | 6/2010 | |
| WO | 2010083549 A1 | 7/2010 | |
| WO | 2010118627 A1 | 10/2010 | |
| WO | 2011031939 A1 | 3/2011 | |
| WO | 2011145619 A1 | 11/2011 | |
| WO | 2011150365 A2 | 12/2011 | |
| WO | 2011150365 A3 | 1/2012 | |
| WO | WO-2014100854 A1 * | 7/2014 | ............ A01G 9/025 |
| WO | 2014182600 A1 | 11/2014 | |
| WO | 2014199883 A1 | 12/2014 | |
| WO | 2015123587 A1 | 8/2015 | |
| WO | 2016010795 A1 | 1/2016 | |
| WO | 2016081711 A2 | 5/2016 | |
| WO | 2016105222 A1 | 6/2016 | |
| WO | 2016117884 A1 | 7/2016 | |
| WO | 2016138544 A1 | 9/2016 | |
| WO | 2016147195 A1 | 9/2016 | |
| WO | 2016156334 A1 | 10/2016 | |
| WO | 2016196733 A1 | 12/2016 | |
| WO | 2017010952 A1 | 1/2017 | |
| WO | 2017058116 A1 | 4/2017 | |
| WO | 2017069803 A1 | 4/2017 | |
| WO | 2017109279 A1 | 6/2017 | |
| WO | WO-2019043341 A1 * | 3/2019 | ............ A01G 9/023 |

* cited by examiner

AEROPONIC PLANT GROWING SYSTEM

CROSS-REFERENCE TO RELATED APPLICATIONS

This application claims priority to and benefit of U.S. Provisional Patent Application Ser. No. 62/960,065 entitled "Aeroponic plant growing system" filed on Jan. 12, 2020 which is incorporated herein by reference in its entirety.

FIELD OF THE INVENTION

This application relates to an aeroponic plant growing system, and in particular, to an aeroponic plant growing system which allows for vertical arrangement of planting sites so that plants can be grown in a fraction of the space necessary for traditional soil cultivation, hydroponic or aeroponic applications.

BACKGROUND OF THE INVENTION

There is a need for a soilless agricultural cultivation system that allows users with no arable soil, little space and no former experience to grow edible greens for their own consumption and for sale or trade. The subject invention can be shipped as a compact kit, assembled on site and operated by the average person, thereby allowing people living in apartments or other non-farmable conditions to gain a degree of food and financial independence through the crops they successfully cultivate and harvest on their own.

SUMMARY OF THE INVENTION

According to one aspect of the invention, an aeroponic grow system is provided. The system includes a cover, a base and a wall system. The base has a bottom wall integral with a sidewall. The sidewall encompasses and stands up from the bottom wall to define a reservoir. The sidewall has an inner surface, an outer surface and a top end. The wall system is located between the base and the cover and includes a plurality of planar, modular wall panels removably interconnected at their first and second side edges to form a ring level. Each ring level has an equal number of wall panels. The wall system has one or more ring levels stacked upon each other with a bottommost ring level being stacked directly onto the sidewall of the base and the cover being located on a topmost ring level defining an interior. The wall panels have an inner surface and an outer surface transected by a plurality of grow sites.

DETAILED DESCRIPTION OF THE INVENTION

Figure 1A:
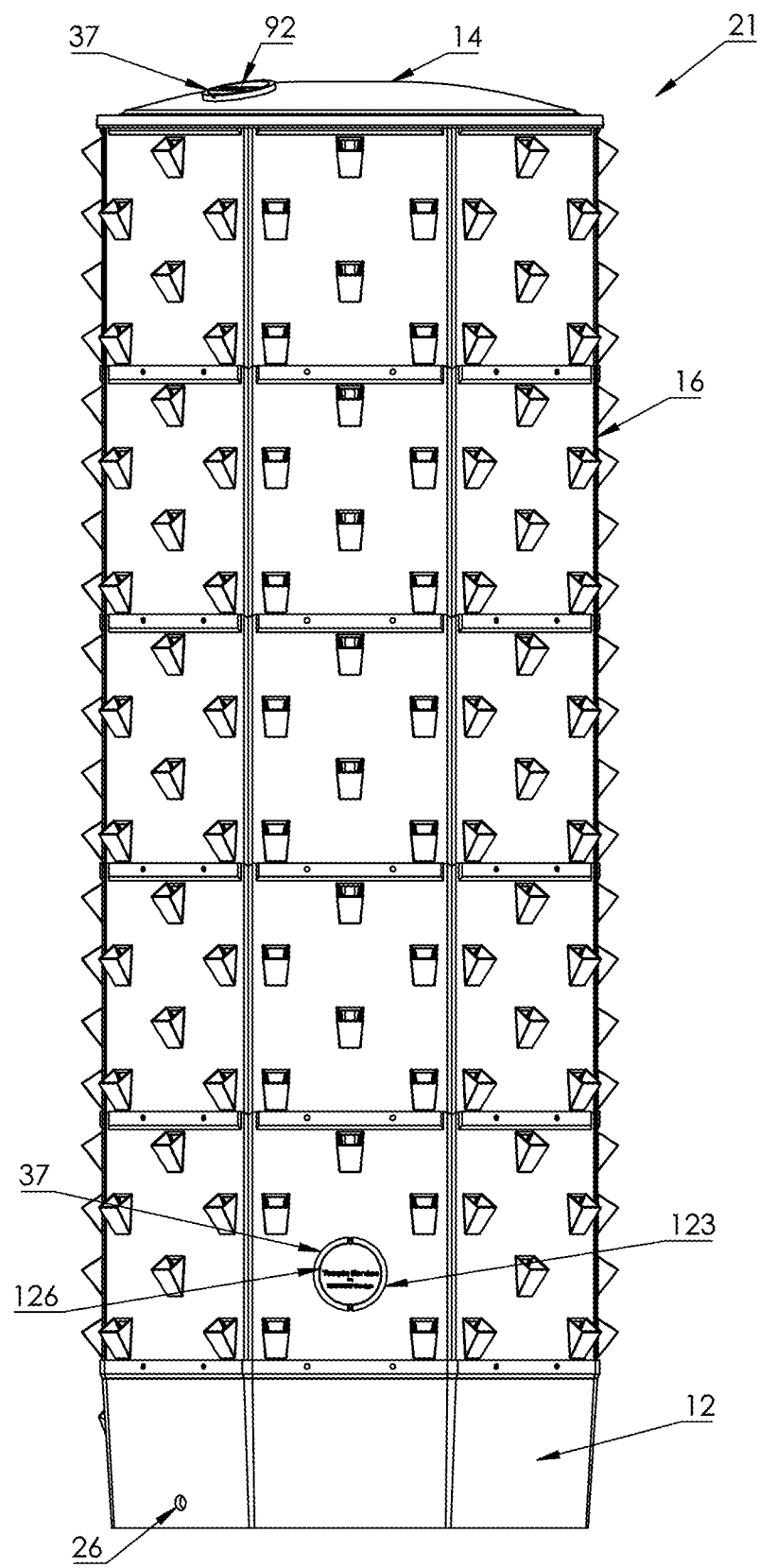
FIG. 1A is a front elevational view of a grow system according to the present invention.
Figure 1B:
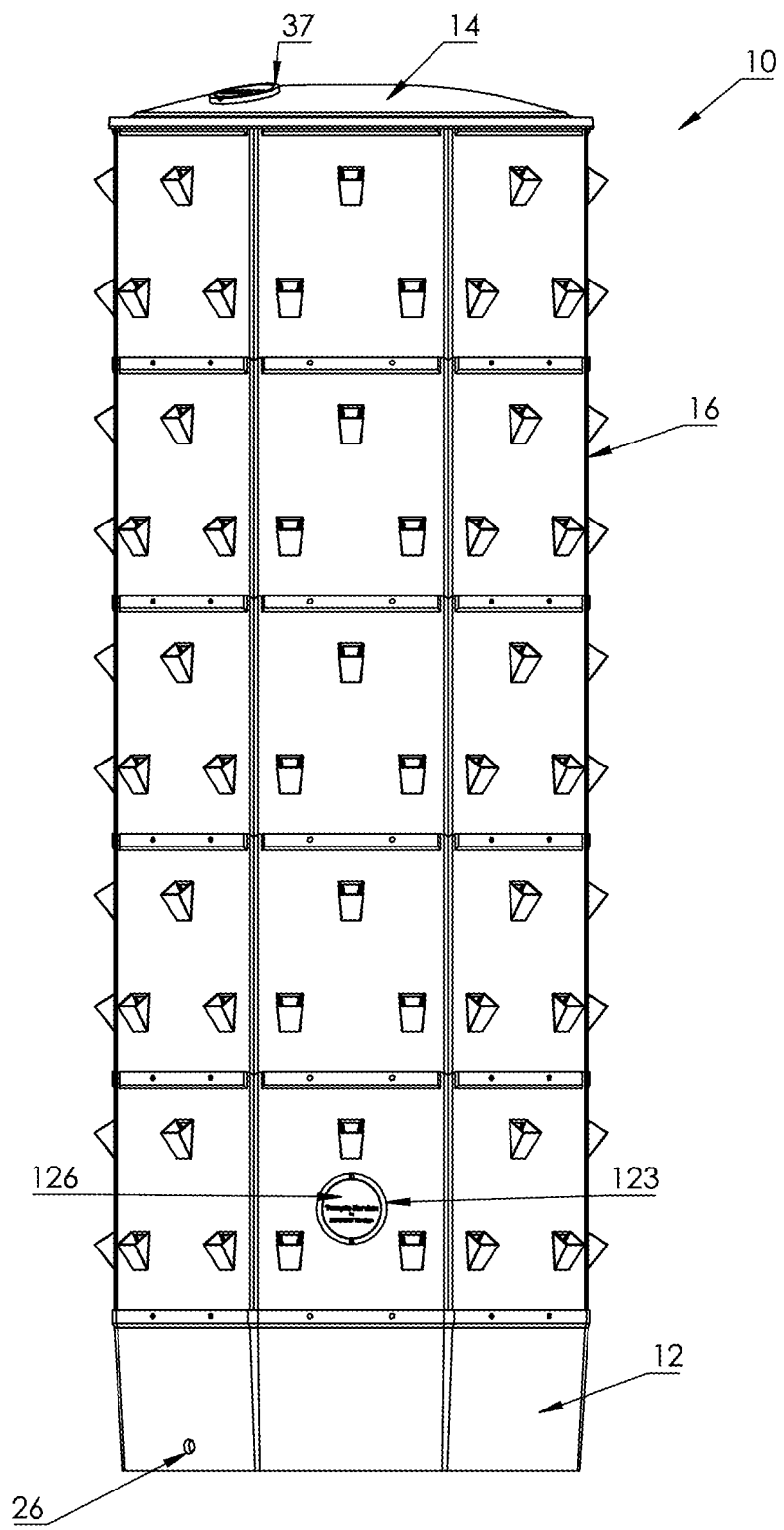
FIG. 1B is a front elevational view of a grow system according to the present invention.
Figure 2:
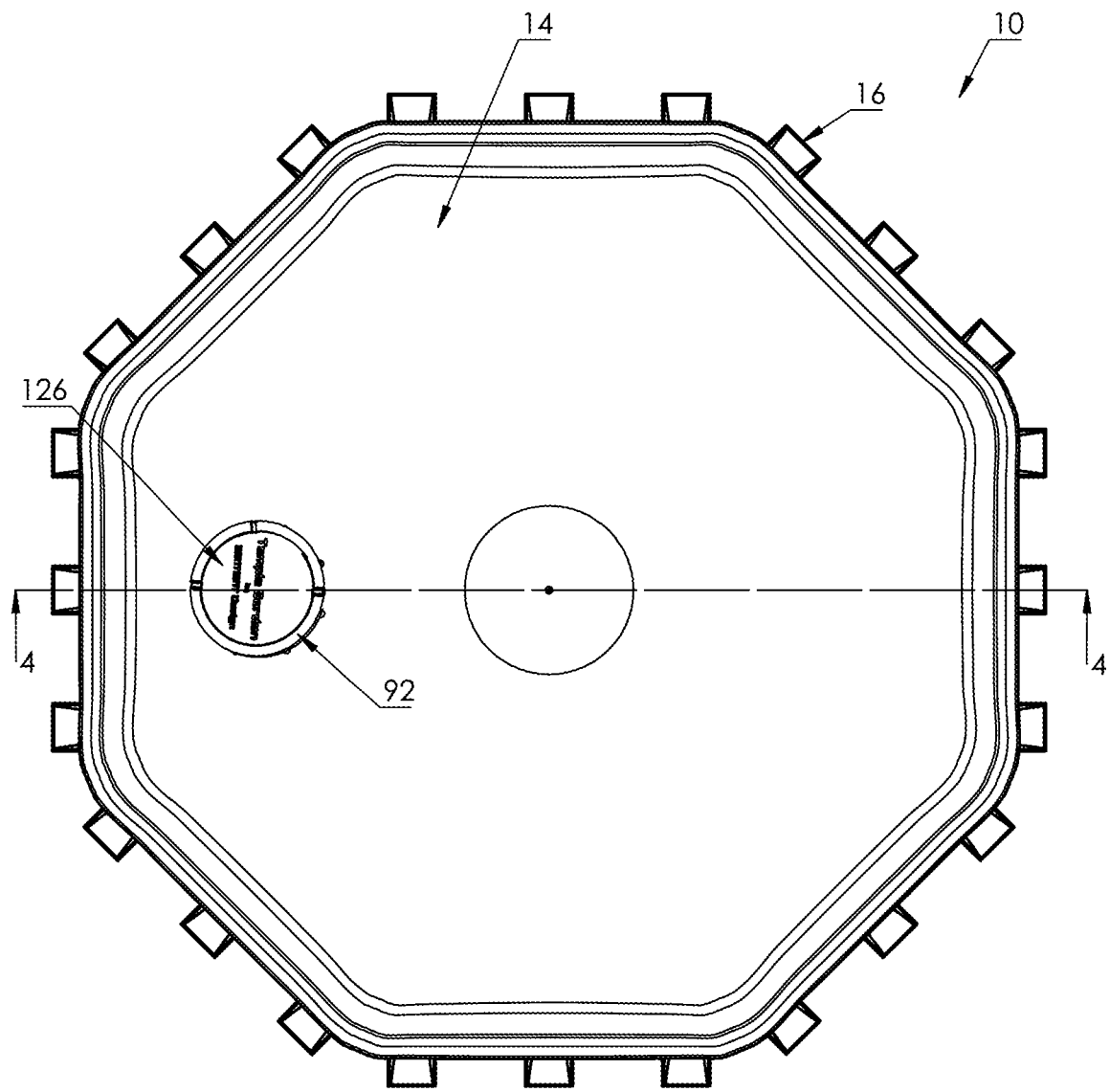
FIG. 2 is a top view of a grow system according to the present invention.

FIGS. 1-5 depict a grow system 10 according to one variation of the invention. The grow system 10 comprises a base 12, a lid 14, a wall system 16 located between the base 12 and the lid 14, and an irrigation system 18 located inside the grow system 10. The vertical aeroponic, biodynamic grow system 10 is designed to enhance plant growth by irrigating plant roots with timed finely aerosolized sprays of nutrient solution located in the base 12 and delivered by the irrigation system 18. The interior of the grow system 10 defined by the base 12, lid 14 and wall system 16 provides a humid, highly oxygenated, temperature-controlled interior environment for the plants that is also supportive of rhizospheric symbiotic organisms known to aid in nutrient metabolism and supports seeds, seedlings as well as mature plants. The grow system 10 is configured as vertical column that supports high-density plant growth.

Figure 4:
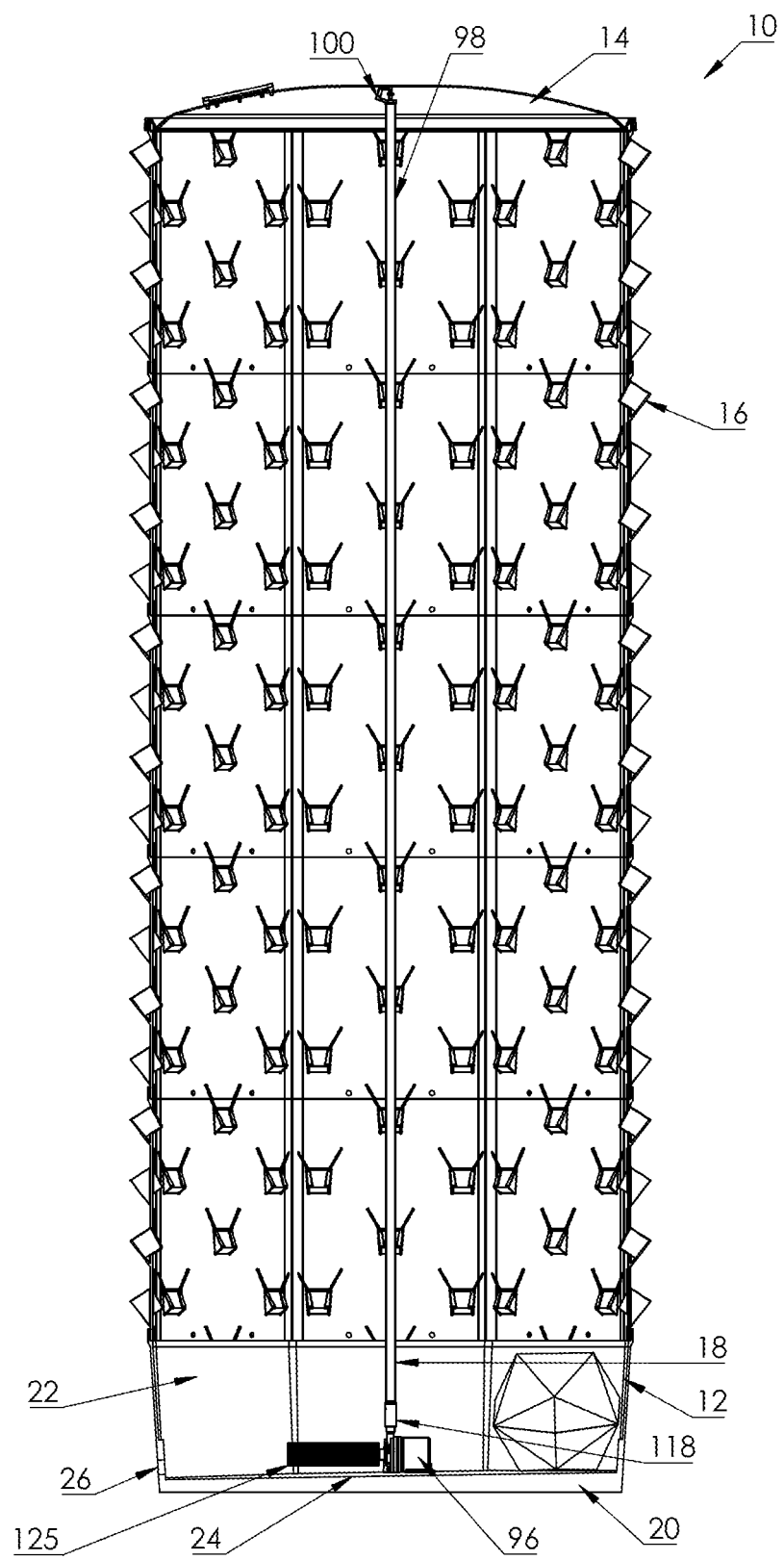
FIG. 4 is a cross-sectional view taken along line 4-4 of FIG. 2 of a grow system according to the present invention.
Figure 5:
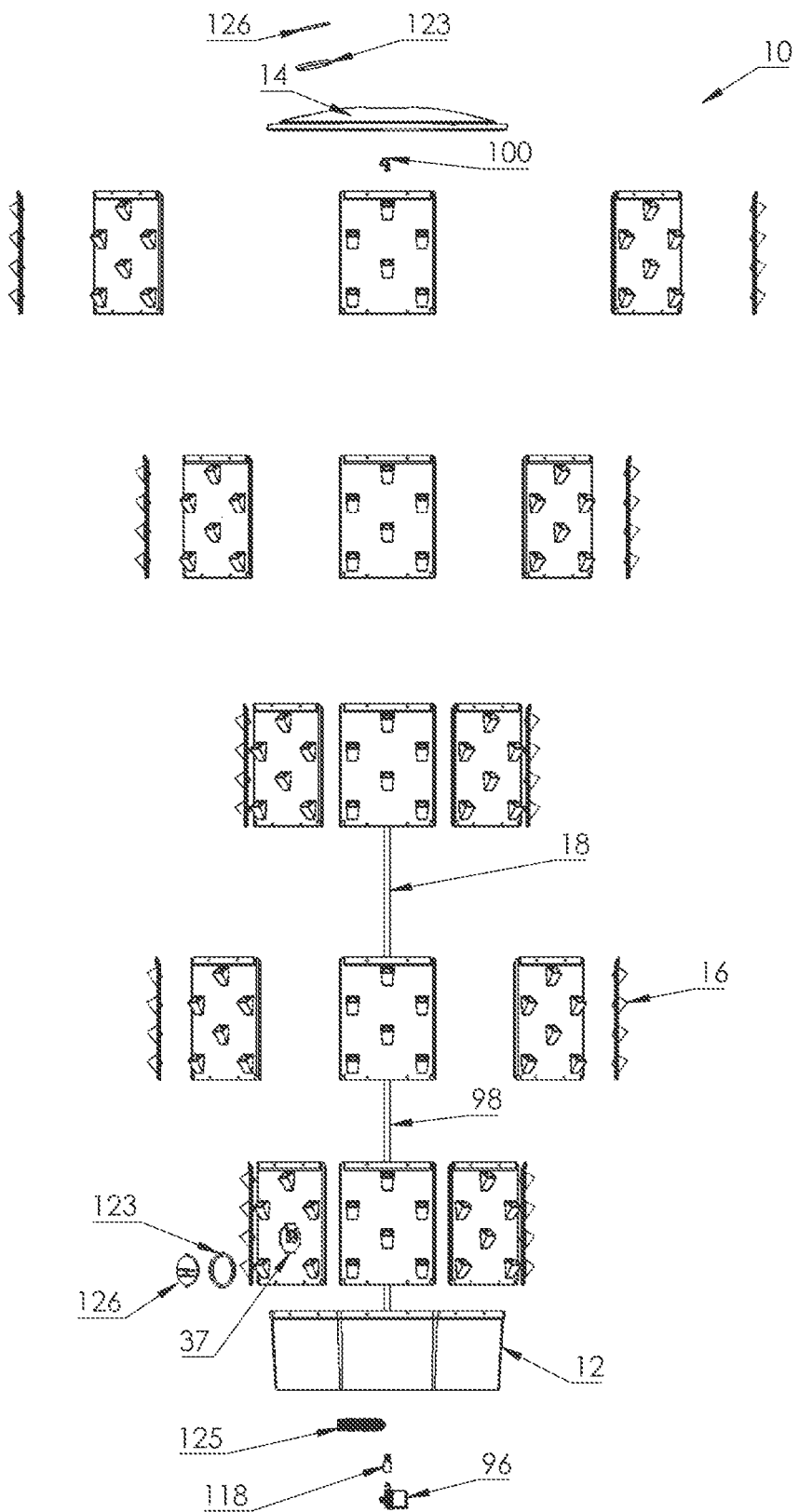
FIG. 5 is an exploded front view of a grow system according to the present invention.
Figure 6:
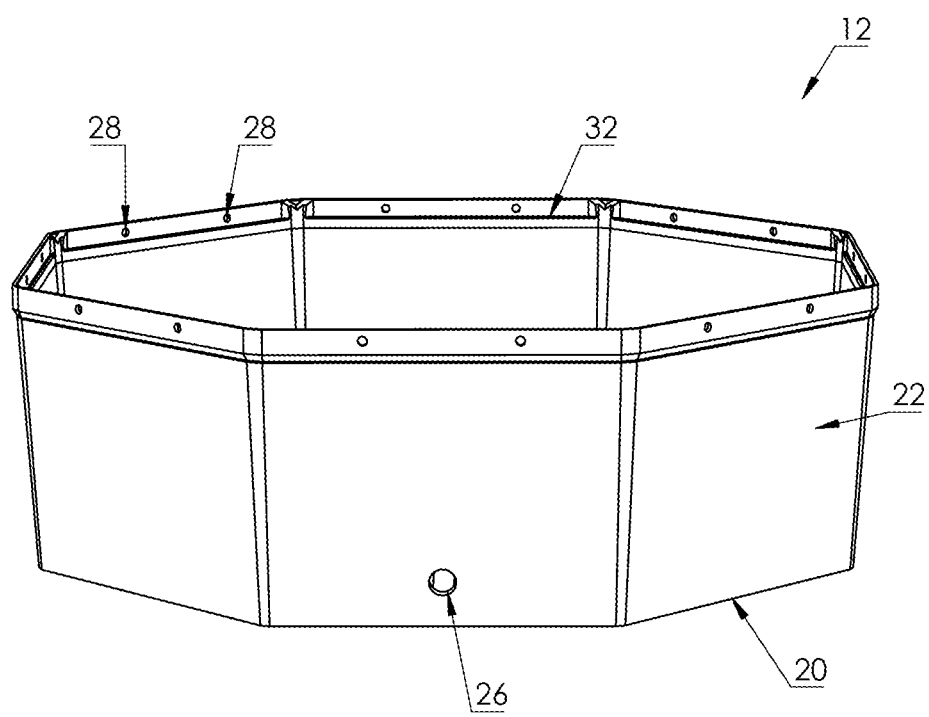
FIG. 6 is a top perspective view of a base according to the present invention.
Figure 9:
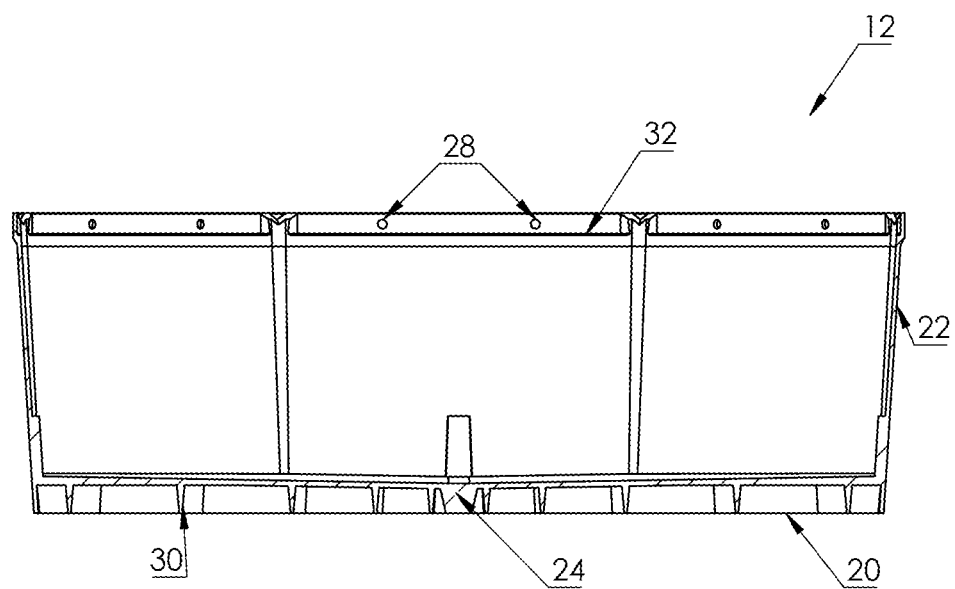
FIG. 9 is a cross-sectional view of a base according to the present invention.
Figure 10:
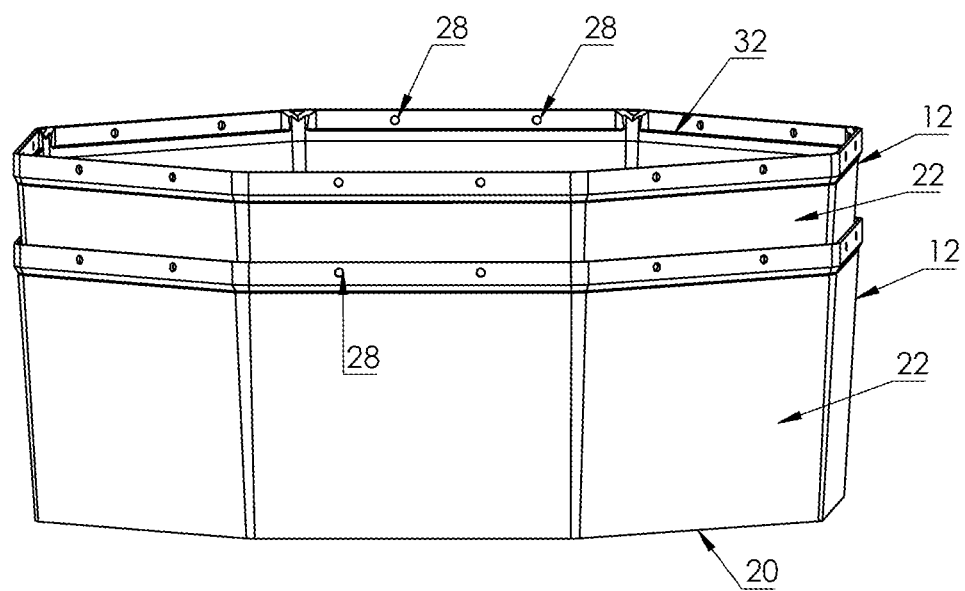
FIG. 10 is a top perspective view of a base nested inside another base according to the present invention.
Figure 11A:
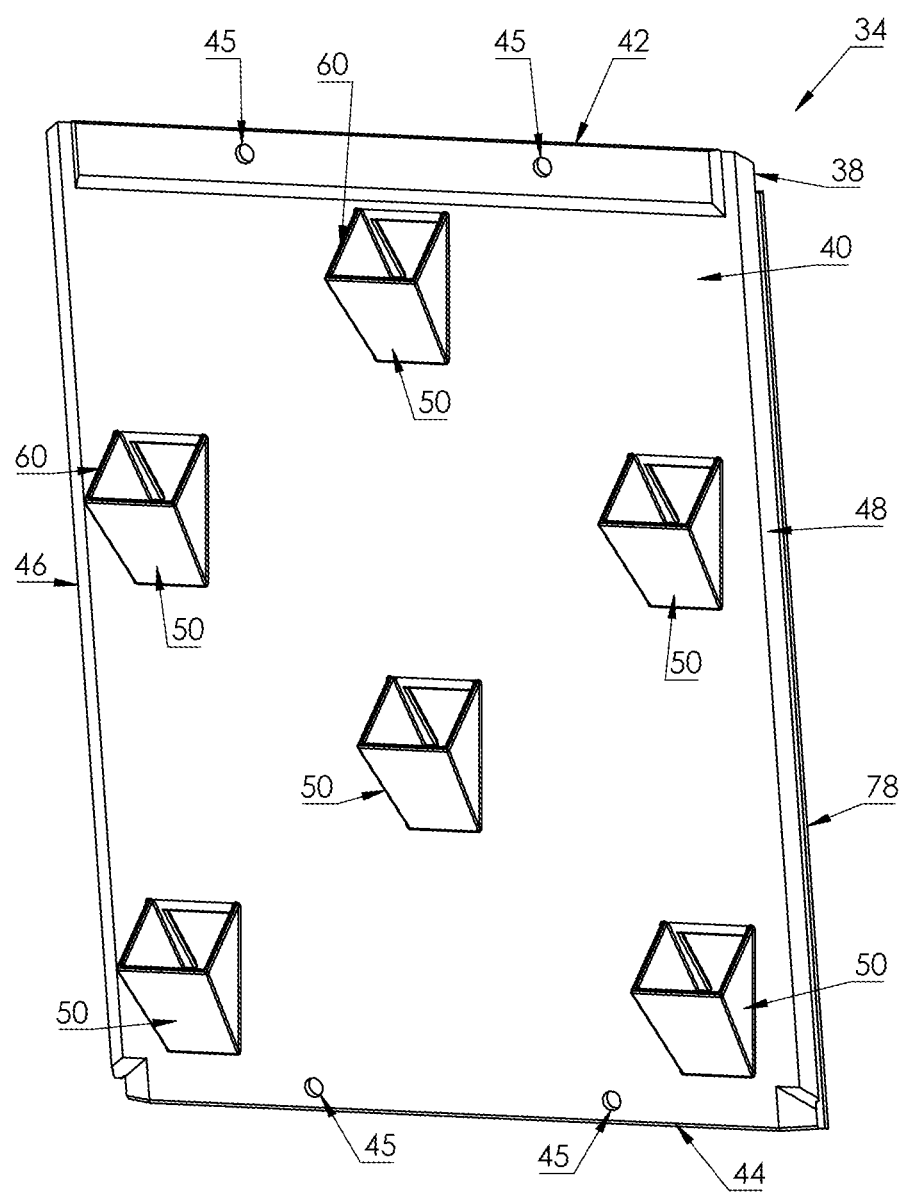
FIG. 11A is a top perspective front view of a wall panel according to the present invention.
Figure 11B:
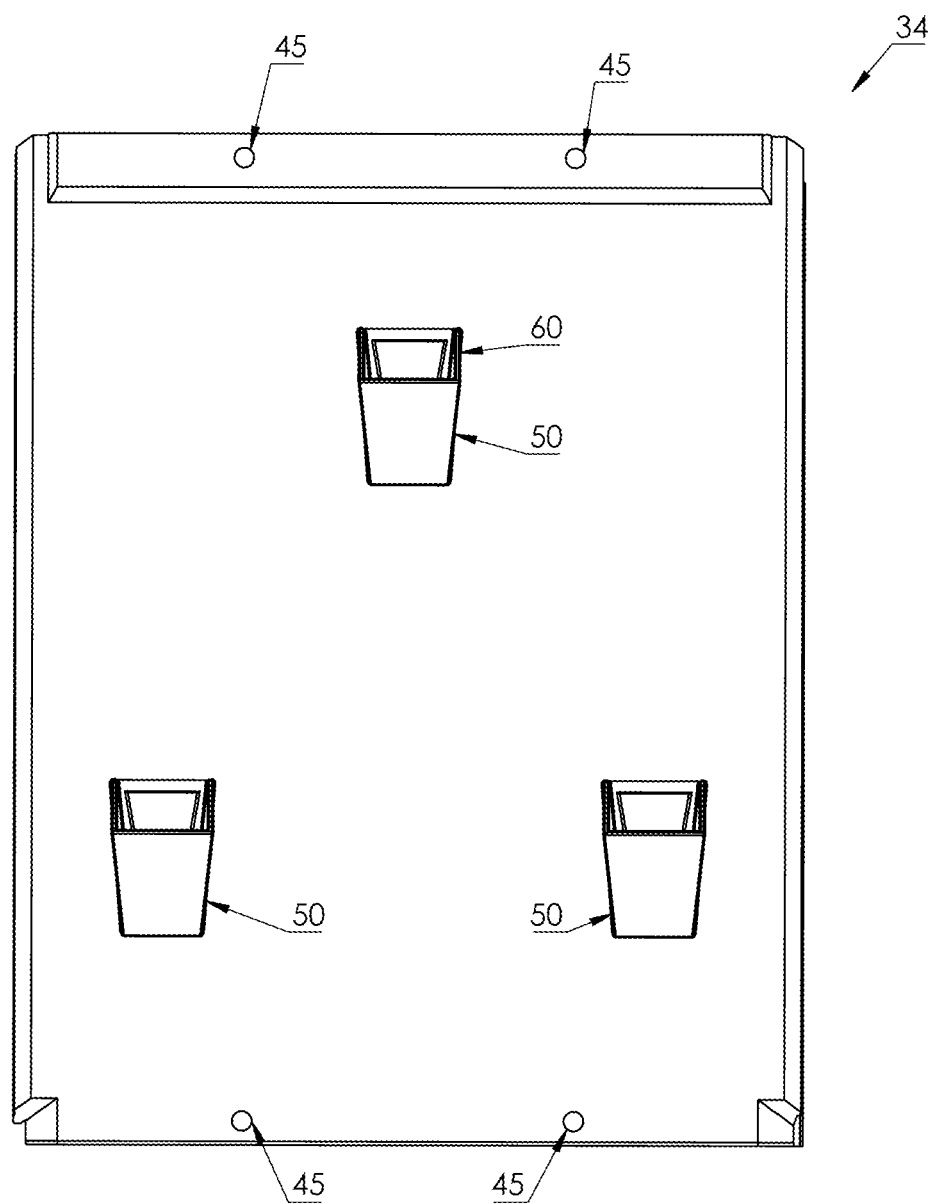
FIG. 11B is a front elevational view of a wall panel according to the present invention.
Figure 12A:
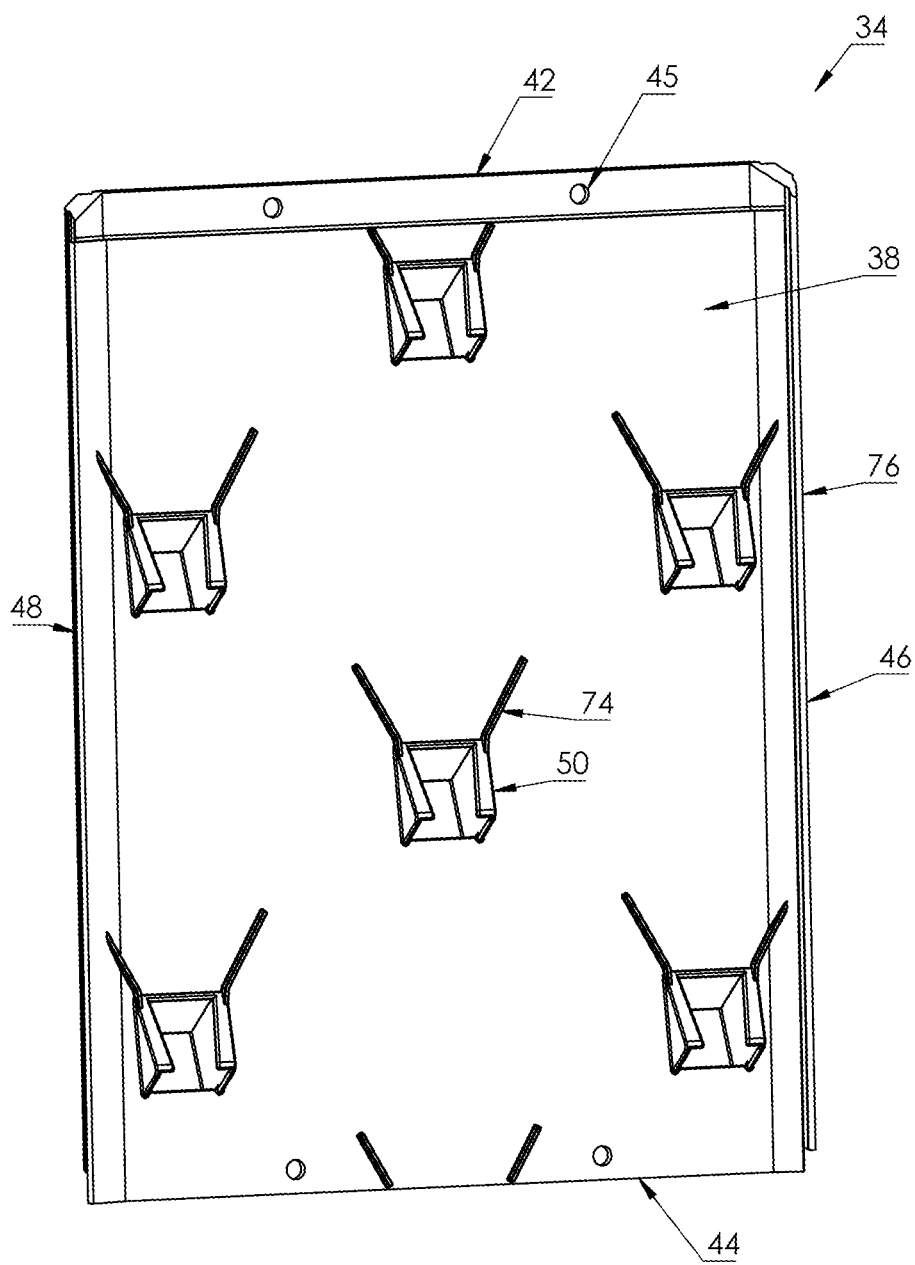
FIG. 12A is a top perspective back view of a wall panel according to the present invention.
Figure 12B:
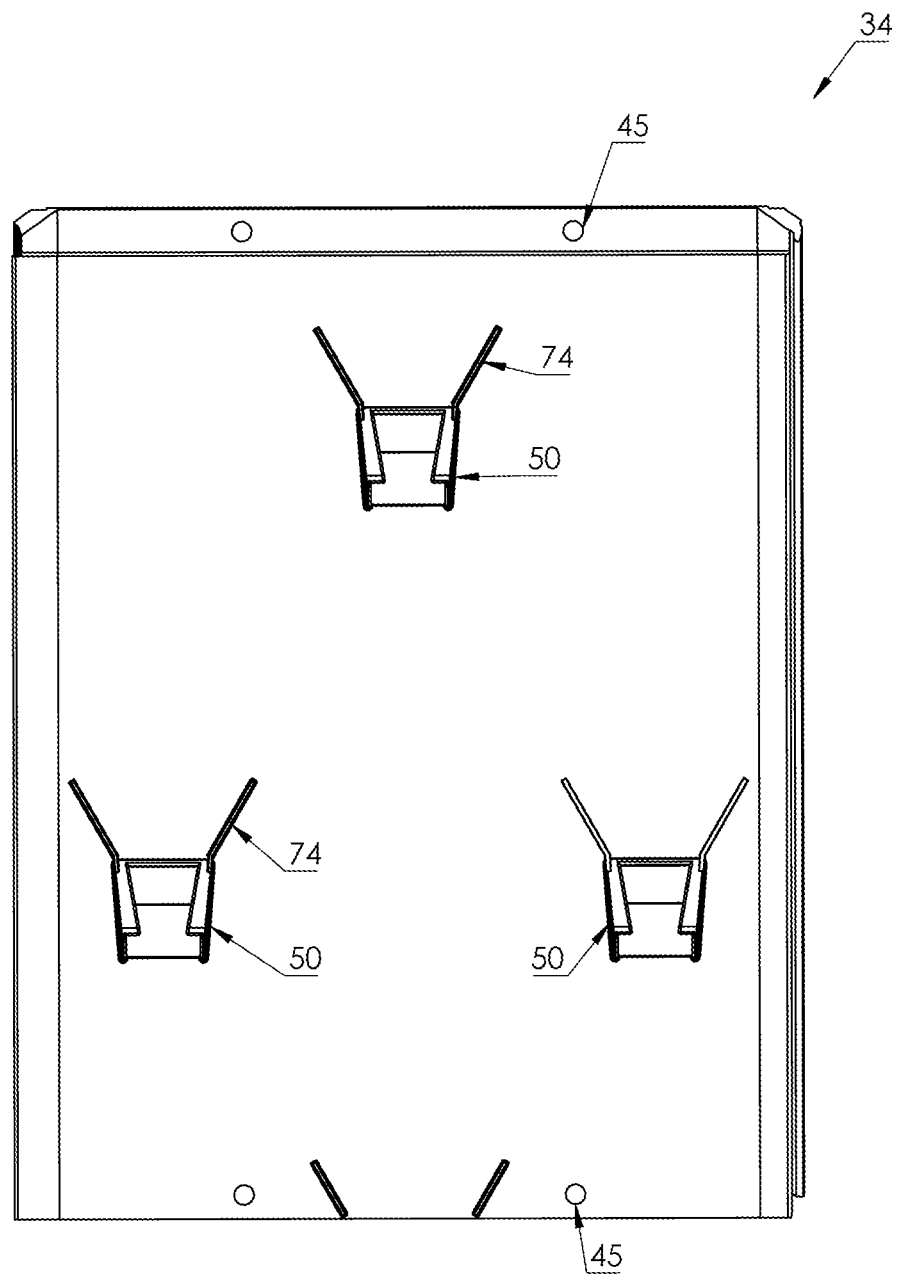
FIG. 12B is a back elevational view of a wall panel according to the present invention.
Figure 13:
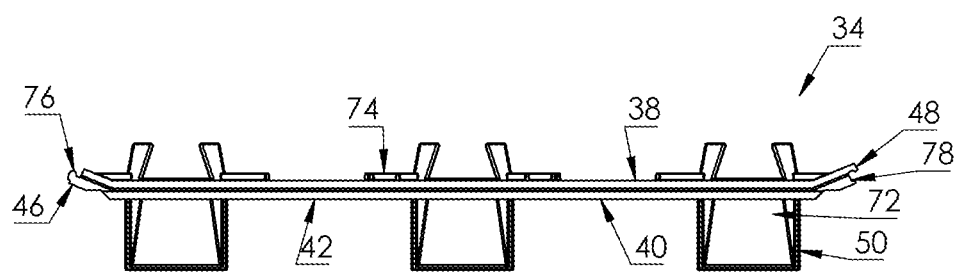
FIG. 13 is a top view of a wall panel according to the present invention.
Figure 14:
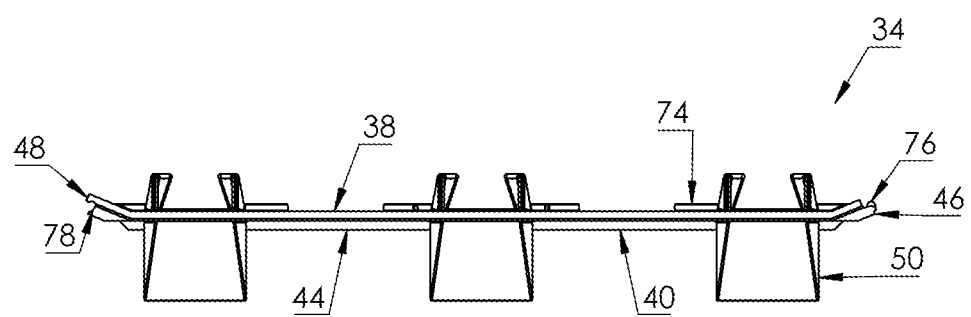
FIG. 14 is a bottom view of a wall panel according to the present invention.
Figure 15:
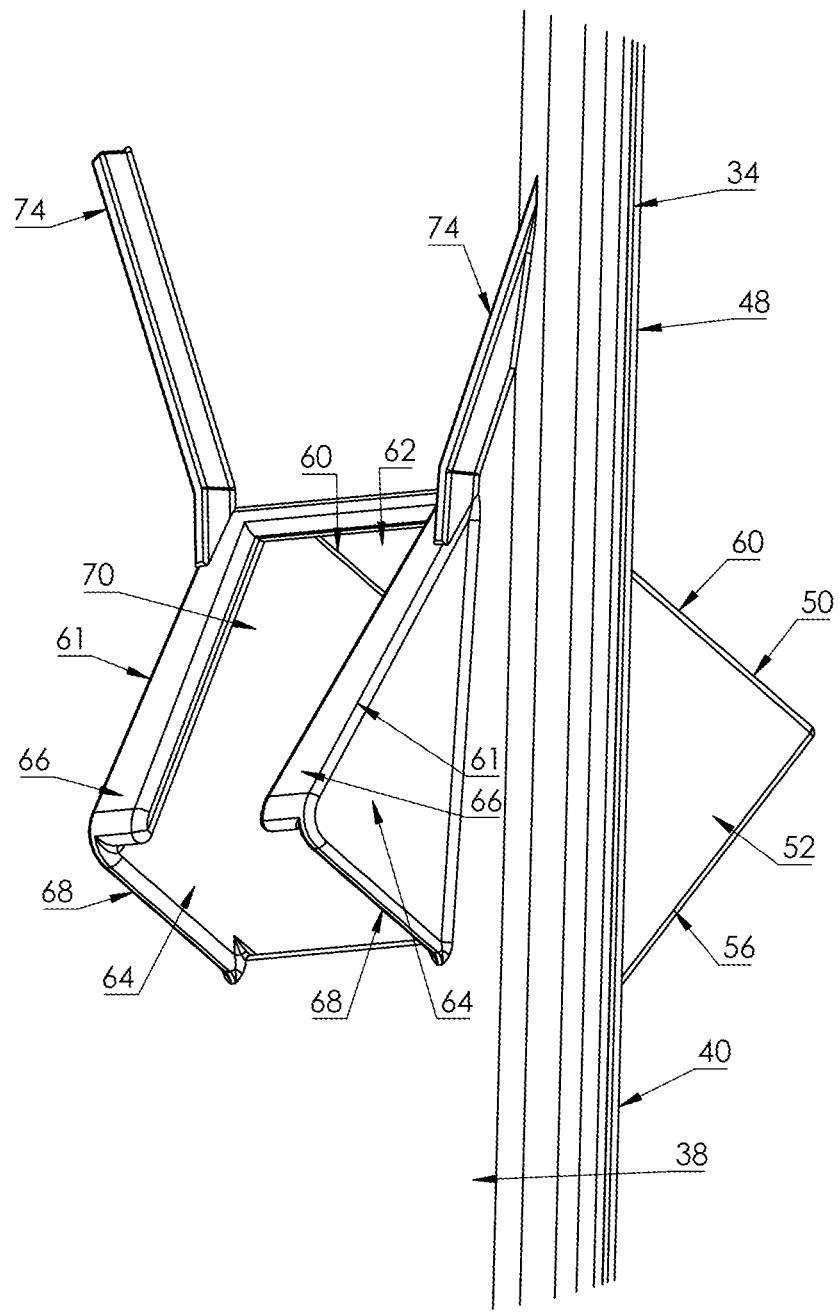
FIG. 15 is a bottom perspective section view of a wall panel according to the present invention.
Figure 16:
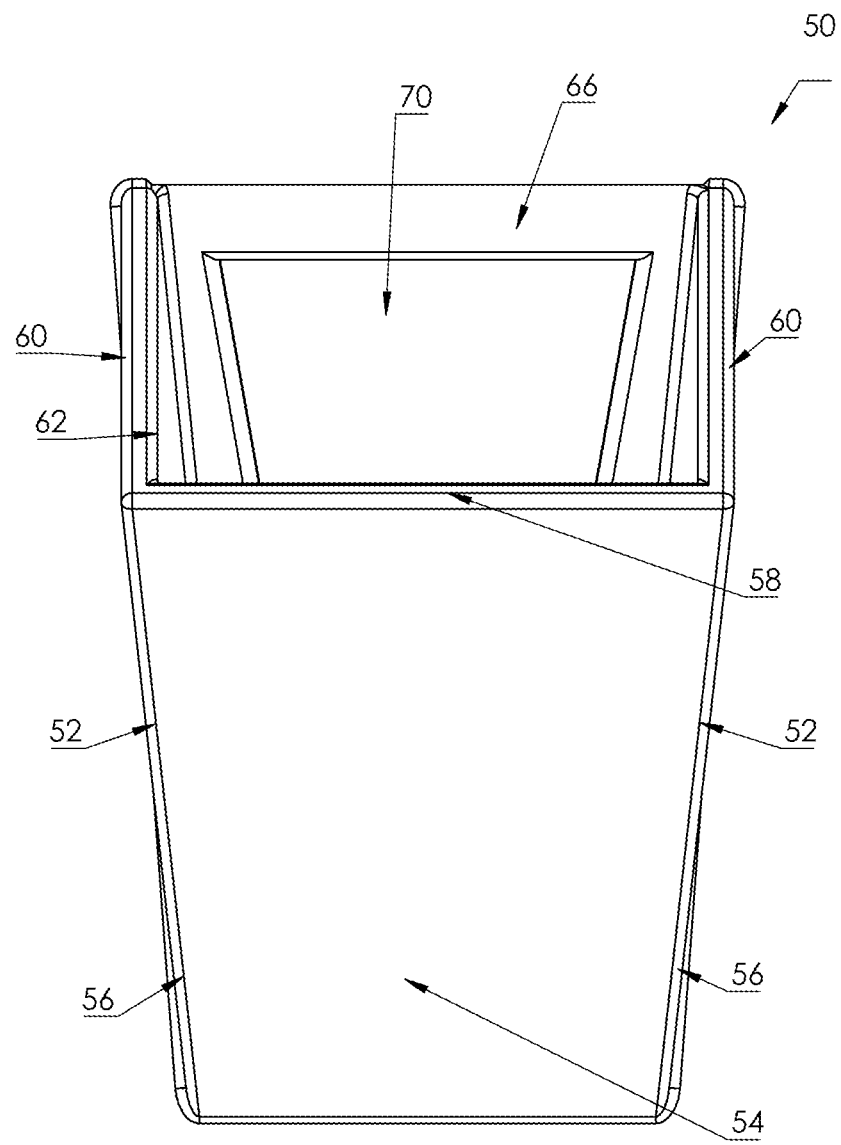
FIG. 16 is a front view of a grow cup according to the present invention.
Figure 17:
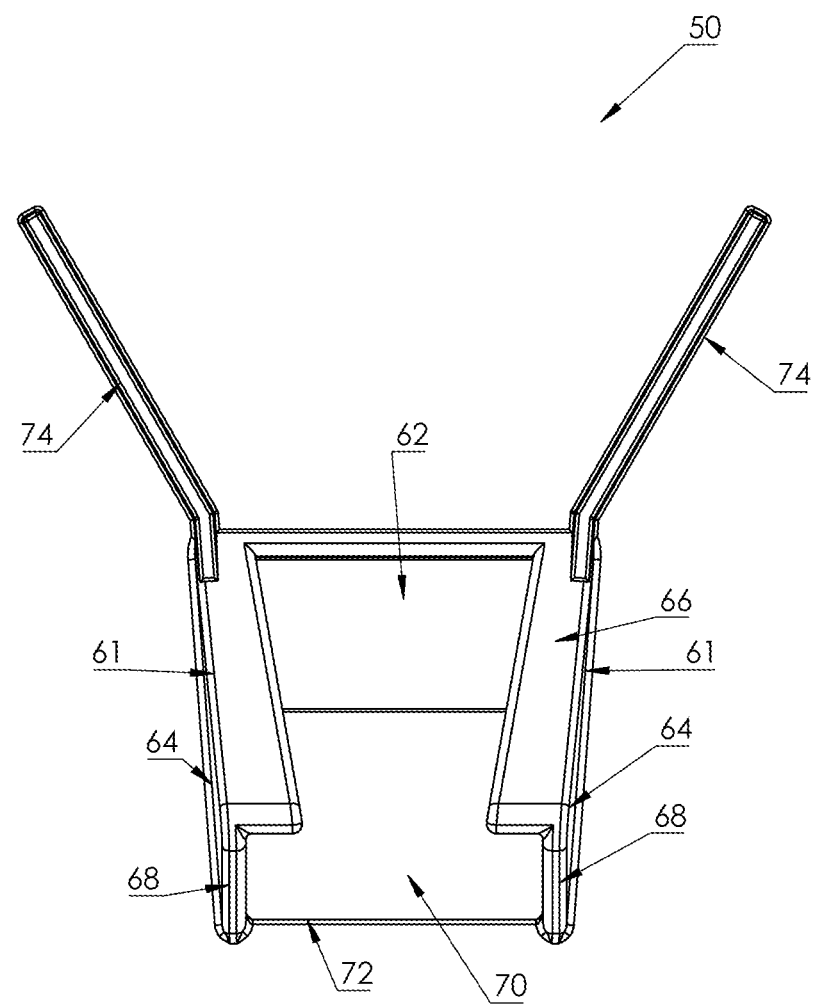
FIG. 17 is a back view of a grow cup according to the present invention.
Figure 18:
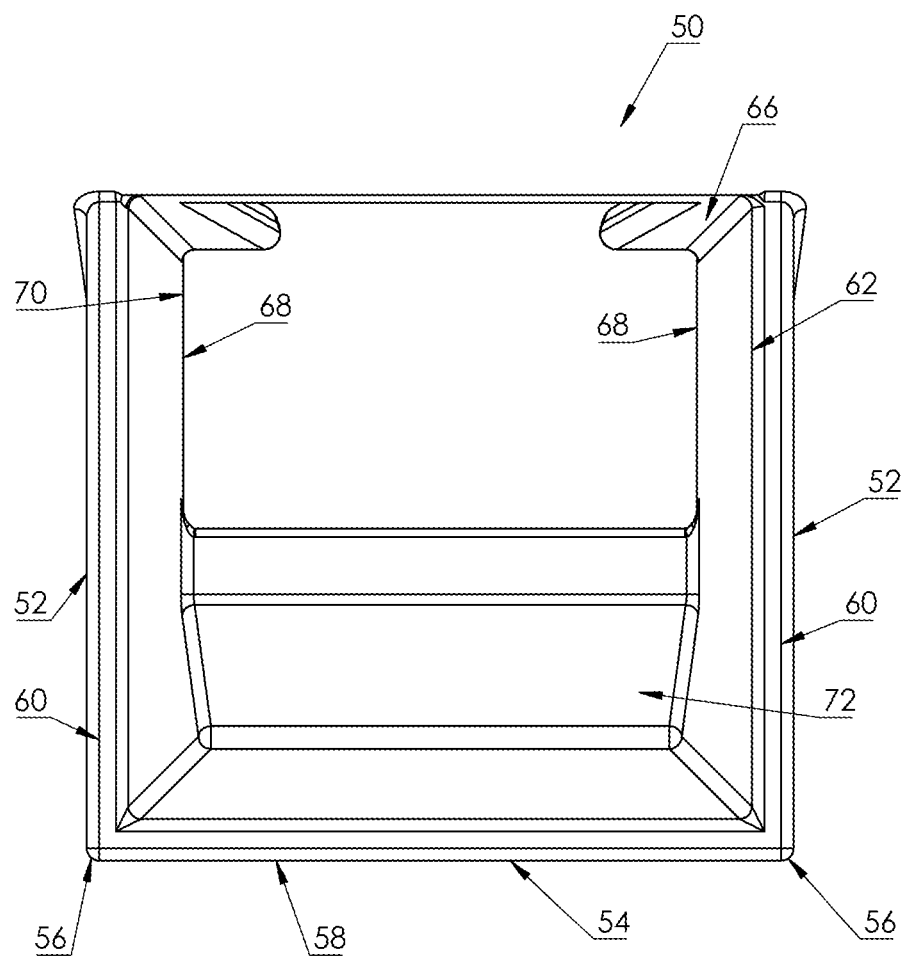
FIG. 18 is a view into a grow cup according to the present invention.
Figure 19:
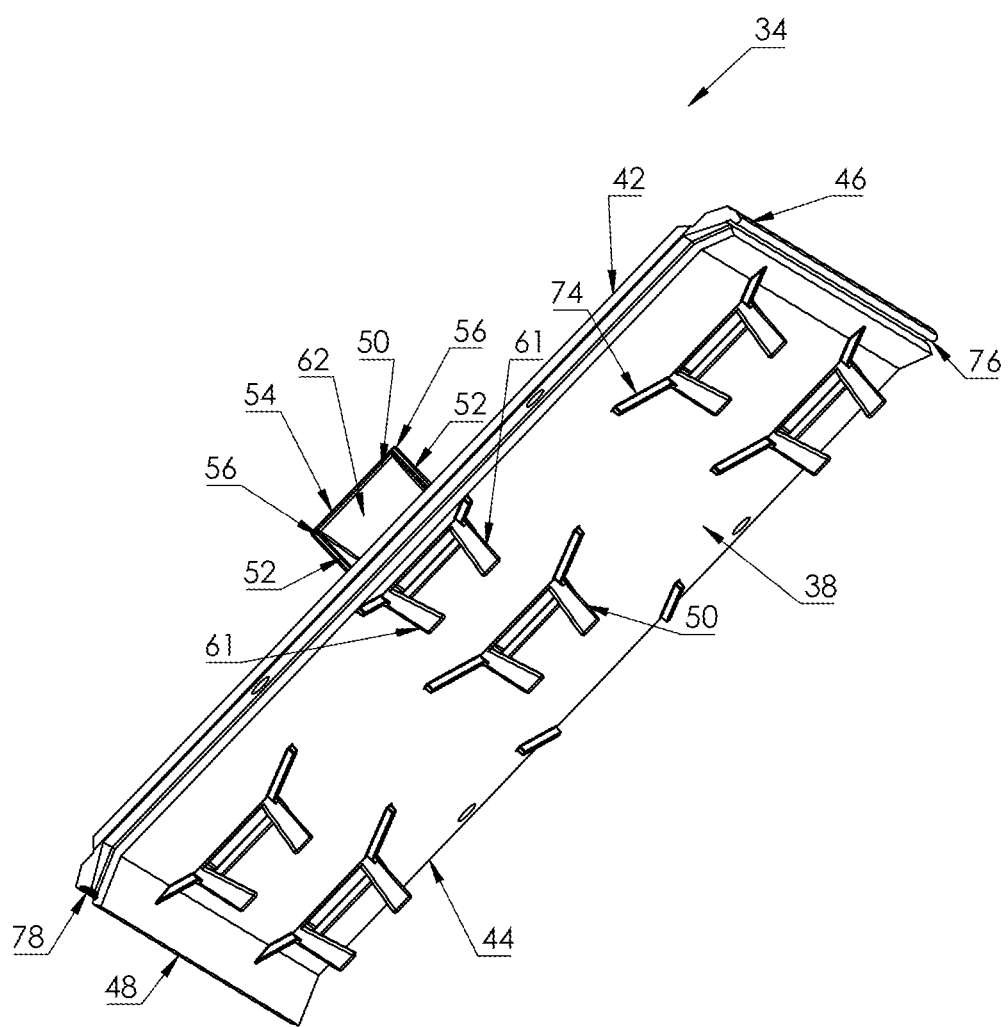
FIG. 19 is a top perspective view of a wall panel according to the present invention.
Figure 20:
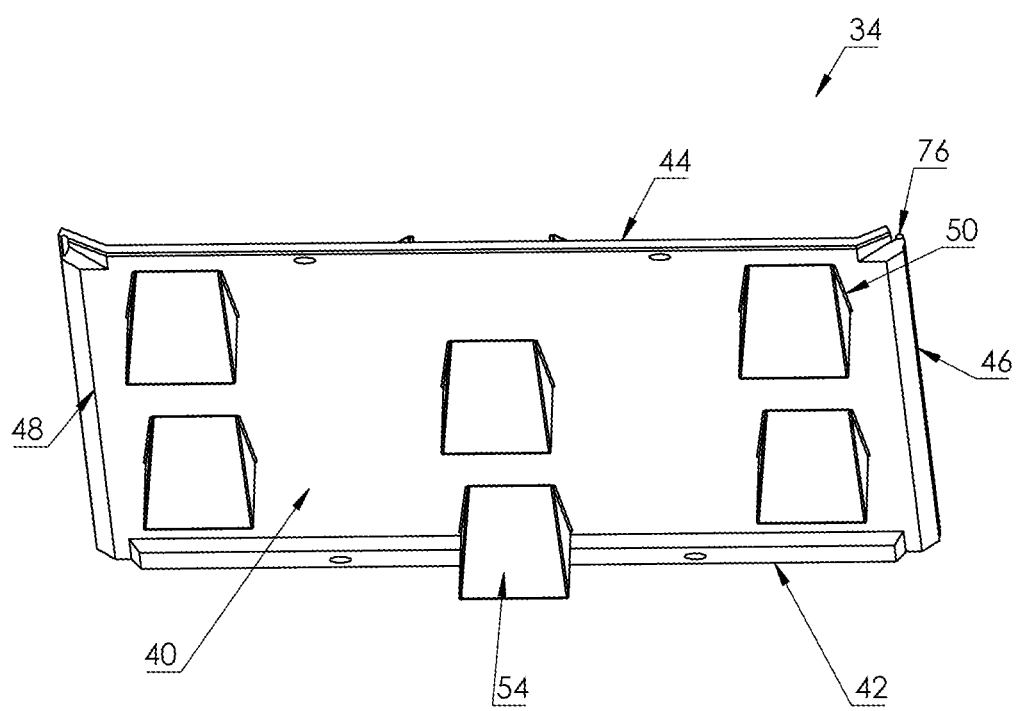
FIG. 20 is a bottom perspective view of a wall panel according to the present invention.
Figure 21:
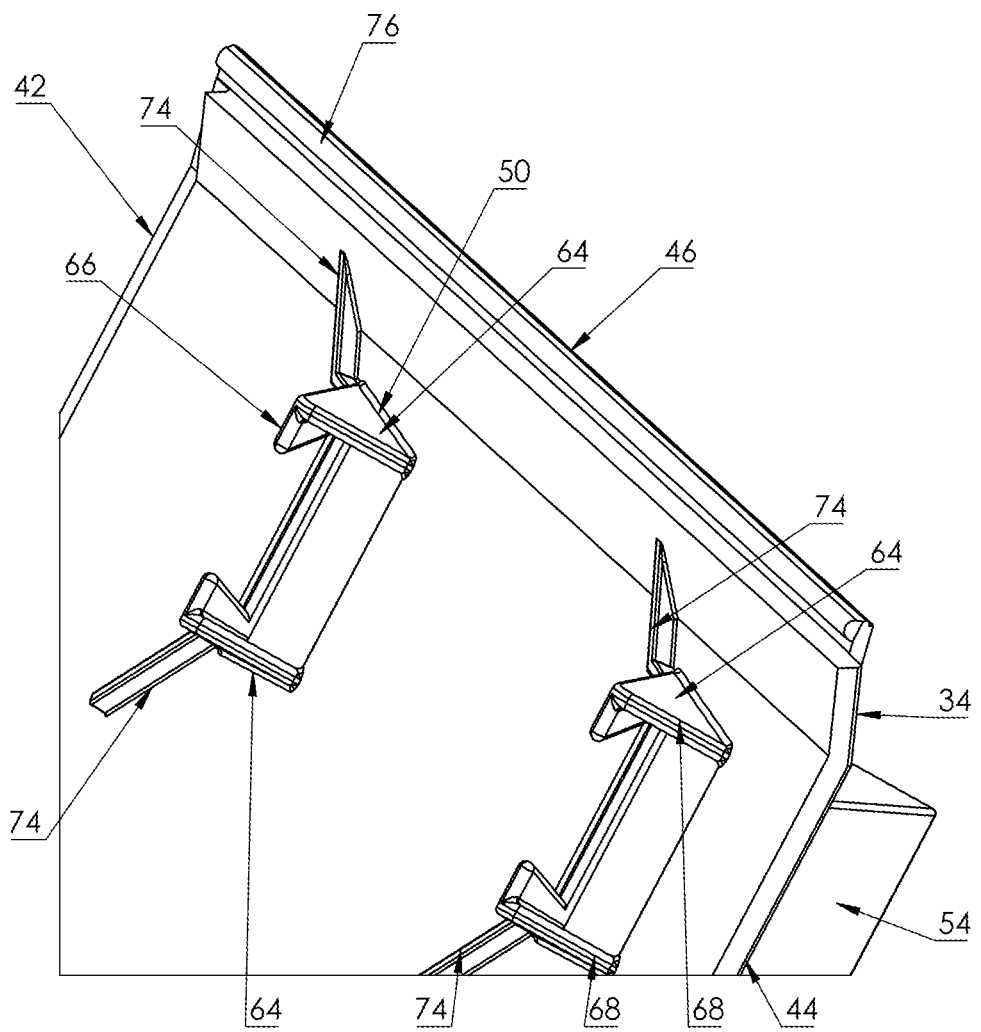
FIG. 21 is a bottom perspective section view of a wall panel according to the present invention.
Figure 22:
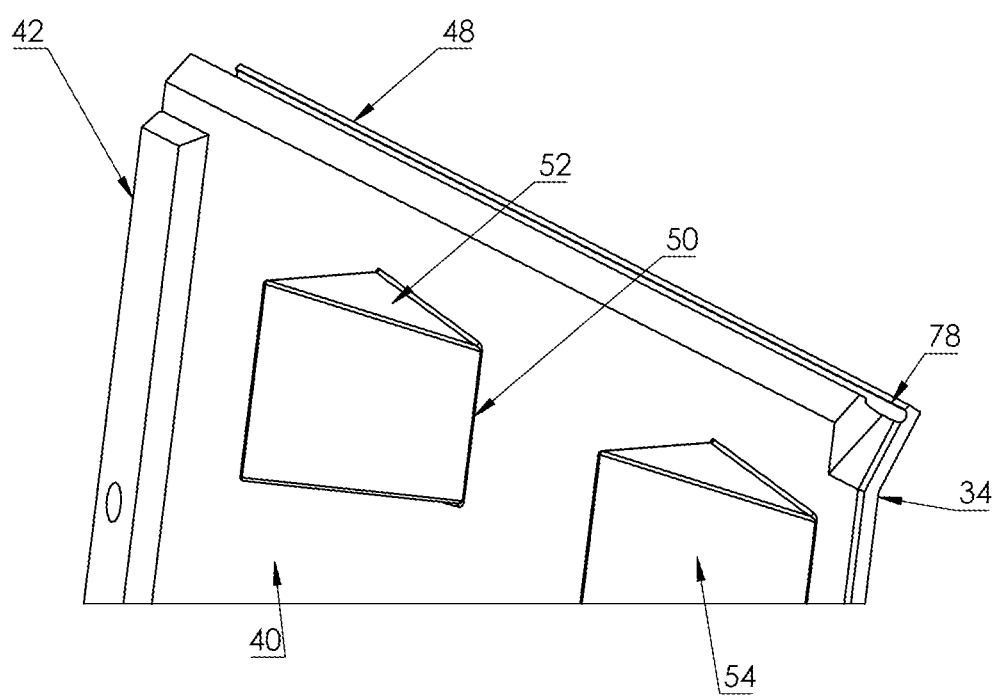
FIG. 22 is a bottom perspective section view of a wall panel according to the present invention.

Turning now to FIGS. 6-10, the base 12 of the grow system 10 includes a bottom wall 20 connected to eight side walls 22 with each side wall 22 joined at a 45-degree angle to each other to form an octagon. The top end of the base 12 optionally includes a plurality of apertures 28 for receiving fasteners (not shown), preferably of the type described in U.S. patent application Ser. No. 16/537,322 entitled "Fastener" by Sentient Design, Inc. of San Diego, Calif. incorporated herein by reference in its entirety. The apertures 28 and fasteners are configured for connecting the base 12 to the wall system 16. The base 12 is sturdy and sized and configured to support the rest of the grow system 10 including the wall system 16, lid 14, irrigation system 18, plants and other components. The side walls 22 include a ledge 32 formed on the inside near the apertures 28 at the top of the base 12. This ledge 32 is sized and configured to support the wall system 16 on top of the base 12. The ledge 32 forms a half-lap joint with the base of the wall system 16 such that the resulting overlap joint is water-tight and prevents nutrient solution from seeping out. This sealed joint prevents algae growth and calcification from building up at the outside joints which can be harmful to plants and cause degradation of the underlying structure The bottom wall 20 includes a central channel 24 extending across the base 12 from one end to another end dividing the bottom wall 20 into two halves. Each half of the bottom wall 20 is angled at approximately 5 degrees toward the central channel 24 so that fluid in the base 12 drains toward and into the central channel 24. FIG. 9 depicts the two halves of the bottom wall 20 angled toward the central channel 24. At one end, the central channel 24 is in fluid communication with a hole 26 formed in one of the side walls 22. The hole 26 is sized and configured to receive a spigot or plug (not shown) to help drain the base 12 of fluid. Furthermore, the channel 24 and/or the entire bottom wall 20 is angled by approximately 5 degrees toward the hole 26 as can be seen in FIG. 4. The base 12 functions as a reservoir for nutrient solution that, advantageously, can easily be drained and washed without the need to uplift the base 12 heavy with fluid. A hose may be attached to the spigot to recycle the nutrient-rich solution for secondary applications. Together the doubly-canted floors and sluice, as well as the low spigot placement, allows for ease of cleaning after each harvest by means of spraying the system with a hose without having to tip the system 10 over, take it apart or scrub it down, thereby, reducing the amount of labor required to cycle the unit for the next planting significantly over traditional soilless growing systems.

Figure 3:
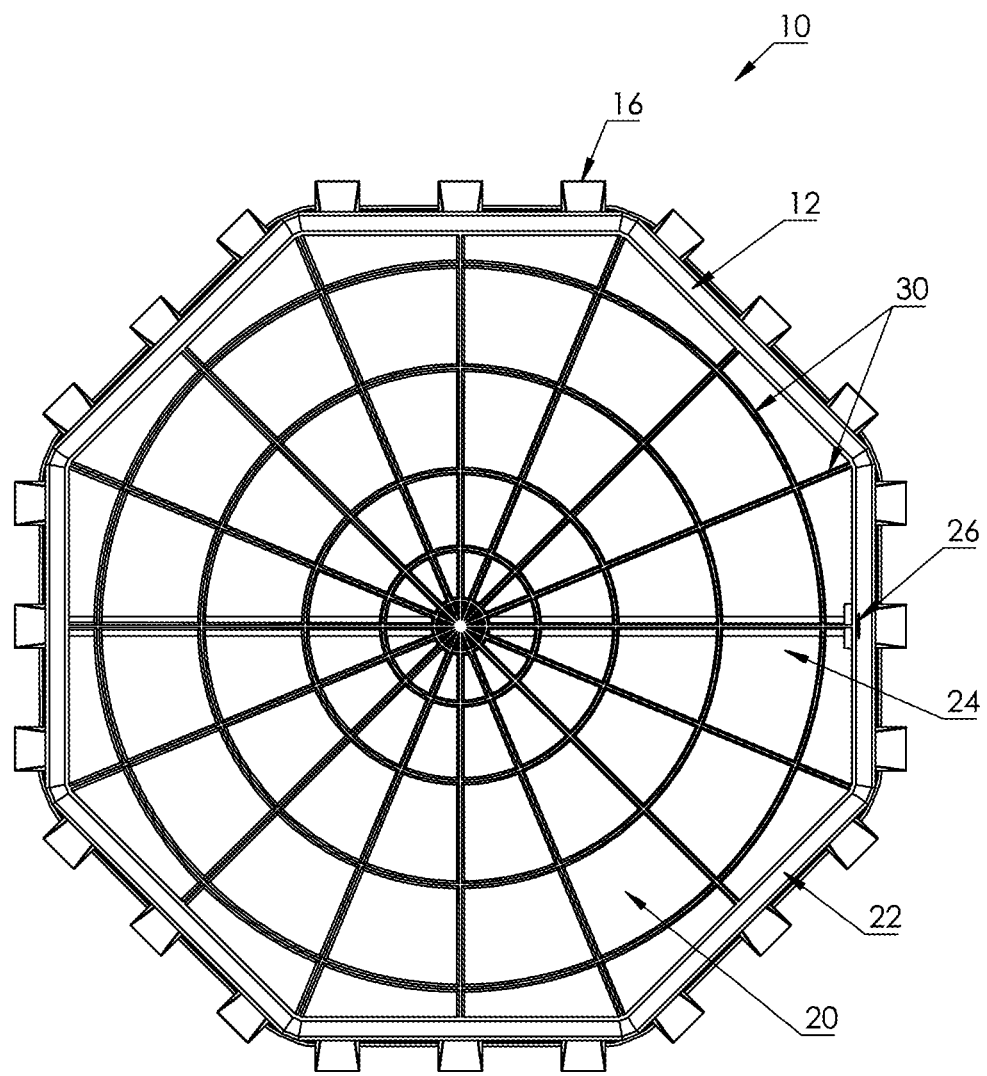
FIG. 3 is a bottom view of a grow system according to the present invention.
Figure 7:
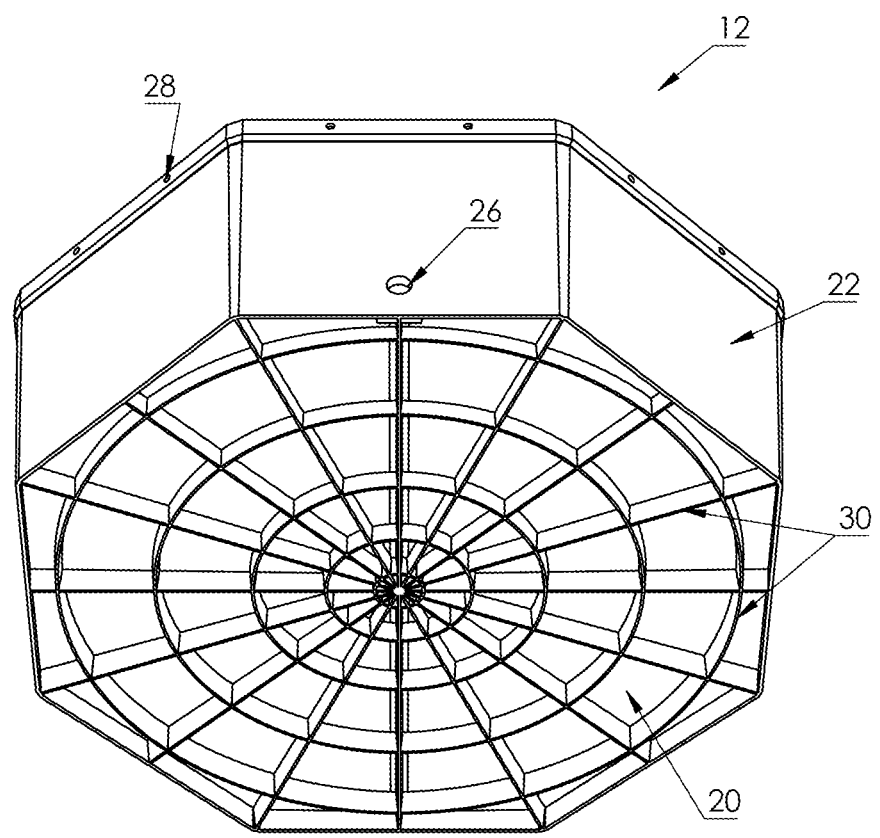
FIG. 7 is a bottom perspective view of a base according to the present invention.
Figure 8:
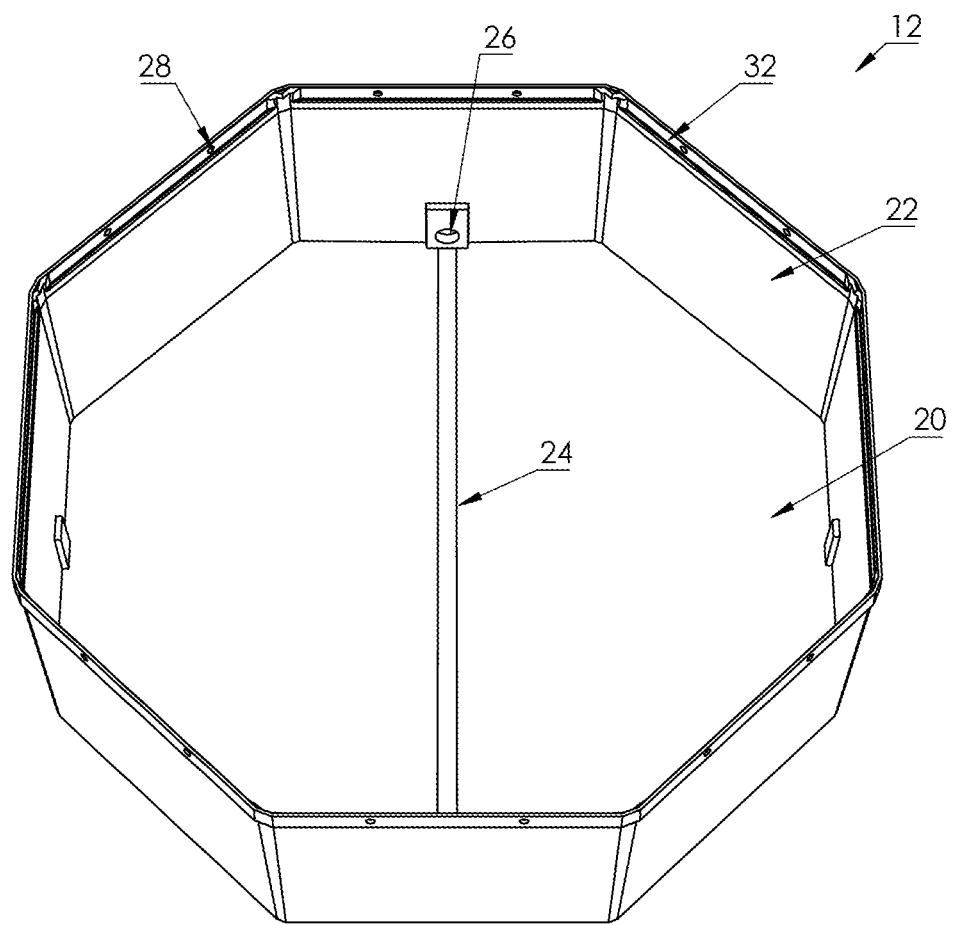
FIG. 8 is a top perspective view of a base according to the present invention.

The undersurface of the bottom wall 20 is provided with a plurality of structural support fins 30 as can be seen in FIGS. 3 and 7. The fins 30 extend radially and concentrically around the center. Sixteen fins 30 are arranged radially from the center to the perimeter of the underside of the base 12 and are intersected by a further five concentric rings of fins and an additional octagonal fin at the perimeter of the base 12. The fins 30 provide rigidity to the base 12 and distribute the weight of the system and prevent the base 12 from deforming when placed on an uneven surface. Together these vanes 30 significantly increase structural integrity across the floor section such that it will not bend, twist or warp when placed on uneven surfaces and thus allow for octagonal ring level stacking. Also, the fins 30 distance the bottom wall 20 from the ground surface permitting complete decanting of the nutrient solution and other solutes and debris contained within it. The base 12 has a high-strength to weight ratio.

In one variation, the base 12 is sized to contain as much as approximately 275 pounds of solution which creates a system that has a heavy anchor point and a low center of gravity such that the system will not tip over when subjected to shear forces such as high winds. The base 12 allows the system 10 to be placed on tilted surfaces and still function without an exact perpendicular orientation. Because the base 12 serves as the nutrient reservoir, the system 10 is very stable. By virtue of this design, over approximately 80 percent of the system's total bare weight resides in the first ten percentile of its entire height and at full plant growth a five-ring vertical tower system will still maintain over approximately 70 percent of its total weight in the bottom-most approximately 10 percent of its height. Stability is further increased by a base-to-height ratio of approximately 1:3 in a five ring-level 36 system and approximately 1:1 in a one ring-level 36 system. A five ring-level 36 system has been shown to remain standing in gale force winds of over 40 knots.

The side walls 22 of the base 12 are all slanted slightly outwardly to allow them to advantageously nest into each other for compact shipping and transport as shown in FIG.

10. The base 12 may further include features such as a step or horizontal rib formed on and projecting inwardly from the inner surface of at least four of the base side walls 22 to prevent adjacent bases 12 from fully nesting and locking and, thereby, avoid air pressure locking from tight stacking of bases 12. Another anti-locking feature includes a hole, such as spigot hole 26, formed in one of the side walls 22 that allows air to exit and enter the space created by stacking and unstacking the bases 12. An anti-locking step/rib formed near the spigot hole 26 reinforces the location near the spigot and advantageously reduces the chance of base wall failure from stresses when the spigot is repeatedly turned opened or closed.

Turning now to FIGS. 11-27, the wall system 16 will now be described. The wall system 16 includes a plurality of individual wall panels 34 interconnected to form one or more ring-shaped levels 36. Although the grow system 10 may have as little as one level 36, more than one level 36 may be stacked on each other to form a multi-level tower of desirable height. The bottommost level 36 is constructed by connecting eight individual wall panels 34 into an octagonal ring-shaped level 36 stacked atop the side walls 22 of the base 12. Consecutive levels 36 are similarly constructed and stacked atop the previous ring-shaped level 36. The fully constructed wall system 16 of desirable height defines an elongated octagonal volume creating a humid, oxygenated interior environment for the roots of plants and an exterior environment open to the ambient air and light for the propagation of plants. Plants reside in a substrate medium in a plurality of grow cups 50 integrally formed across the wall panel. Each grow cup surrounds an opening across the wall panel 34 and supports the plant with the plant roots growing into the interior of the wall system 16 and leaves and shoots of the plant growing exterior to the wall system 16.

The wall panel 34 defines a thickness between an inner surface 38 and an outer surface 40 and extends between a top end 42 and a bottom end 44 and a first side 46 and second side 48. Each wall panel 34 includes a plurality of grow cups 50. In one variation, the grow cups 50 are integrally molded with the wall panel 34. In another variation, the grow-cups 50 are removable from the wall panel 34. Each wall panel 34 is shown with six grow cups 50 equally spaced apart in a checkerboard-like pattern. Forty-eight grow cups 50 are provided per level 36. In another variation shown in FIGS. 1b and 11b, each wall panel 34 includes three grow cups 50 equally spaced apart in a checkerboard-like pattern. Twenty-four grow cups 50 are provided per level 36. Alternating vertical rows of two growth cups at the edges of the wall panels 34 with one growth cup in the center ensures maximum spacing such that each plant at the edge of the wall panel 34 receives the most direct light without its leaves shading the vicinal plants. This plant spacing pattern also ensures that each plant's root system on the inside of the wall receives optimal nutrient solution without said root bundle obstructing nutrient supply from vicinal plant roots. Plant spacing is further optimized by placing the adjacent wall panels 34 at a 45-degree angle with respect to each other, ensuring that adjacent plants at wall panel 34 edges face away from each other and do not shade them. Alternating the checkerboard pattern of growth cups on adjoining walls further ensures maximal plant spacing. Since the plants are growing upwards towards the light source from their growth cups, each plant on every wall sits in an independent zone of insolation and receives direct light from sunlight as it moves across the sky or from synthetic light sources such as LED lighting. Because most plants require a mix of sun and shade, and cannot tolerate direct sun throughout the day, the cylindrical orientation of the vertical system ensures that all plants on each of the eight faces of the column receive periods of both direct and indirect sunlight. In this manner, the system also acts as a time-based shade structure.

Each grow cup 50 is cuboid-like in shape transected by the inner surface 38 and outer surface 40 of the wall panel 34. Part of the cuboid resides exterior to and extends outwardly from the outer surface 40 and part of the cuboid resides interior to and extends inwardly from the inner surface 38. The part of the grow cup 50 that resides exteriorly includes two exterior sides 52 interconnected with an exterior front 54 defining two exterior edges 56. The two exterior sides 52 and the exterior front 54 intersect with the outer surface 40 of the wall panel 50. A top end 58 of the exterior front 54 and the top ends 60 of the exterior sides 52 define an exterior opening 62 providing access to a volume inside the grow cup 50 sized and configured to receive a complementary-shaped volume of growth substrate. Plants growing in the growth substrate grow freely out of exterior opening 62. The exterior opening 62 is quadrilateral having four sides defined by the two top ends 60 of the sides 52, the top end 58 of the front 54 and the outer surface 40 of the wall panel 34. The exterior opening 62 is sized and shaped to match to the size and shape of the growth substrate inserted into the grow cup 50. The grow cup 50 is cuboid in shape and matches cuboid shaped growth substrate that is sized to fit snugly inside the grow cup 50 such that the entire top surface of the growth substrate is exposed by the exterior opening 62 maximizing exposure to sunlight. The entire top surface of the growth substrate faces upwards at the exterior side of the wall panel 34. When a growth substrate is inserted into the cuboid growth cup 50, approximately half resides inside the interior and half exterior to the plane of the outer surface 40. In one variation, the cuboid is grow site is frusto pyramidal in shape of an inverted four-sided pyramid.

The part of the grow cup 50 that resides interiorly includes two interior sides 64 interconnected with an interior back 66 at two interior edges 61. The interior back 66 extends between the interior sides 64. The interior sides 64 have interior bottom ends 68. The interior sides 64 and the interior back 66 intersect with the inner surface 38 of the wall panel 50. The interior back 66 and the interior bottom ends 68 define an interior opening 70. Roots exit the growth substrate and propagate into the interior environment of the wall system 16 via the interior opening 70. The bottom of the cuboid growth cup 50 is open forming part of the interior opening 70. The other part of the interior opening 70 is defined by the interior back 66. As a result, the back and bottom of the cuboid growth cup is open to the interior environment which, advantageously, provides the roots with abundant exposure to the nutrients delivered by the irrigation system 18 as well as room to freely expand and enter the interior of the tower. Approximately half of the bottom surface and a majority of the back surface of the growth substrate projects out past the inner surface 38 into the interior of the column. This arrangement allows aerosolized nutrient solution to finely rain down onto the growth substrate that is exposed through the interior opening 70 and onto the plant roots that grow out through the interior opening 70 and hang down along the inner surface 38.

Furthermore, the interior back 66 serves as a stop or saddle-like support to prevent the growth substrate inside the grow cup 50 from tipping or falling backward through the interior opening 70 into the interior of the wall system 16. The interior opening 70 is sized and configured to prevent a growth substrate located inside the grow cup 50 from falling into the interior of wall system 16. The interior opening 70 is smaller than the growth substrate. Because the substrate is configured to sit inside the grow cup such that a corner of a cuboid substrate is exposed or open to the interior opening 70, a maximum surface area of the substrate is exposed to the moisture and oxygen present in the interior volume of the grow tower. Also, the interior back 66 prevents a growth substrate inside the grow cup 50 from tipping, falling or angulating forward out of the grow cup 50 through the exterior opening 62 even though the growth substrate may be easily inserted into and removed from the grow cup 50 through the exterior opening 62 by sliding the growth substrate along a trajectory parallel to an axis perpendicular to a plane defined by the top end 58 of the exterior front 54 and top ends 60 of the exterior sides 60. As previously mentioned, each grow cup 50 is formed around a quadrilateral opening in the wall panel 34.

Figure 32A:
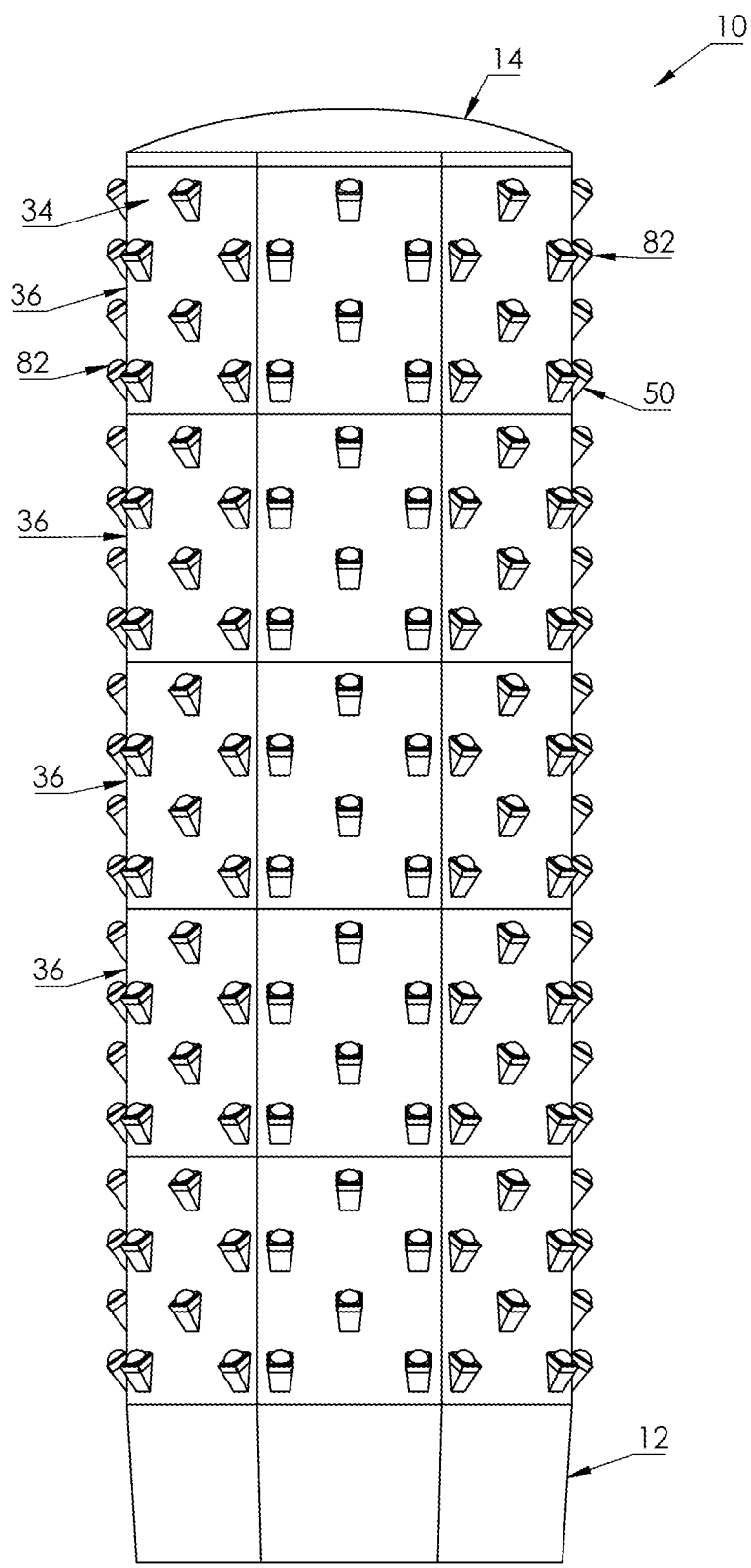
FIG. 32A is a side elevational view of a grow system with grow cup covers according to the present invention.
Figure 32B:
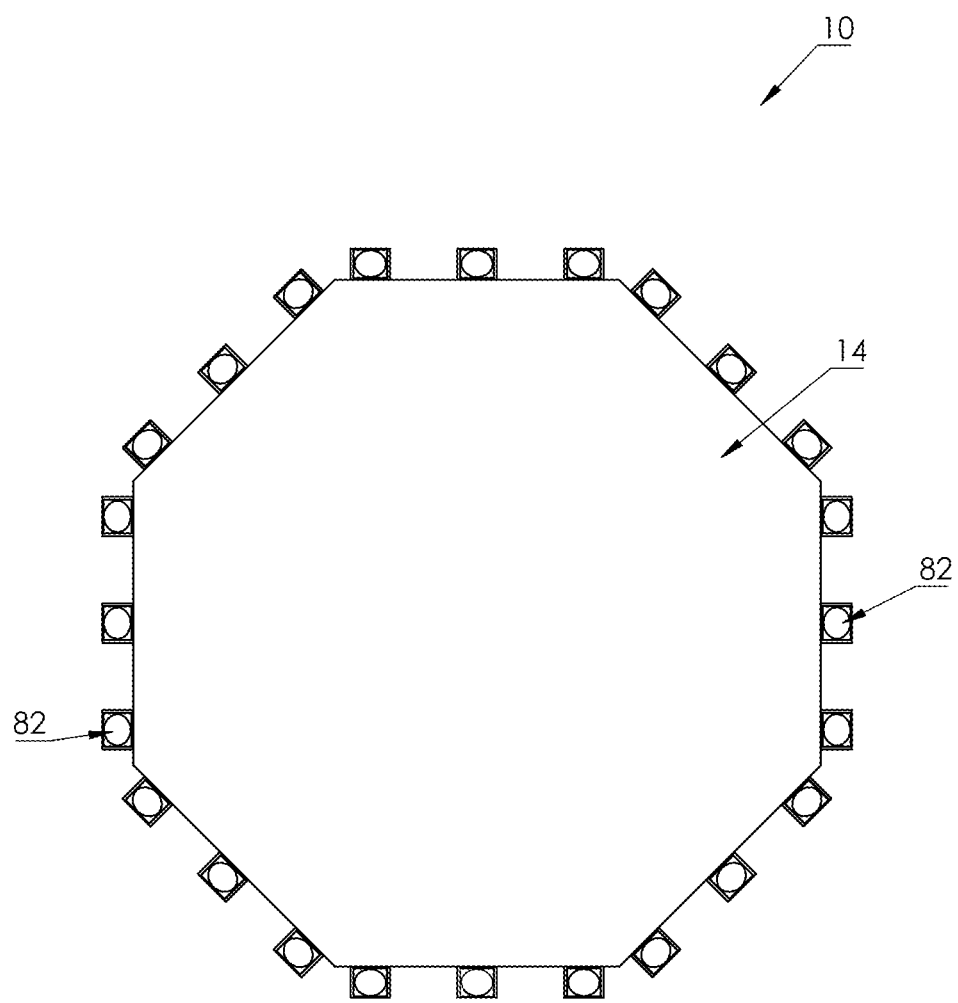
FIG. 32B is a top view of a grow system with grow cup covers according to the present invention.

The growth cup 50 further includes an inner shelf 72 extending between the exterior front 54 and exterior sides 52. The inner shelf 72 is perpendicular to the vertical wall panel 34 and angled with respect to the exterior front 54. The inner shelf 72 serves as a support surface for the growth substrate inside the grow cup 50 and also, in one variation, advantageously, includes a small reservoir 73 shown in FIG. 32 that serves as a location for water, nutrient solution and/or moisture. A small repository of moisture/water/nutrient solution collected in the reservoir 73 advantageously provides hydration to the plant via absorption through the growth substrate in between timed intervals of irrigation delivery via the irrigation system 18 and is especially useful during unexpected changes in environmental temperatures outside the grow system 10, and in general, prevents the substrate from drying out. Furthermore, the channel-like reservoir 73 between the inner shelf 72 and the exterior front 54 advantageously provides moisture for evaporative cooling keeping the plant roots and stem cool as moisture wicks out of reservoir 73 into the substrate growth medium and out of the substrate. The reservoir 73 holds approximately 2 milliliters of liquid and provides a source of moisture that can be wicked through the substrate and flow down on the roots at times when active irrigation is turned off, both at intervals between spraying and at night.

The cuboid-like grow cup 50 is angled approximately between 25-40 degrees, preferably 30 degrees, with respect to the wall panel 34 as shown in the figures. In combination with the inner shelf 72 reservoir 73, the angled grow cup 50 creates an advantageous saddle retainer for the substrate holding the substrate snugly and keeping the plant and roots in place while preventing them from either slipping out of the cup into the interior of the tower system 10 or falling out of the grow cup 50 onto the ground. The top ends 60 of the exterior sides 52 form an angle of approximately 60 degrees between the top ends 60 and the outer surface 40 of the wall panel 34. An axis perpendicular to a plane defined by the top end 58 of the exterior front 54 and top ends 60 of the exterior sides 60 is angled approximately 30 degrees with respect to the outer surface 40 of the wall panel 34. In one variation, the exterior sides 52 are parallel to each other. In another variation, the distance between exterior sides 52 increases toward the top ends 60. In one variation, the interior sides 64 are parallel to each other. In another variation, the distance between the interior sides 64 decreases toward the bottom ends 68.

Light exposure for rapid seedling growth is maximized by the grow cups 50 and resident growth substrates being angled with respect to the plane of the outer surface 40. This ensures optimal plane orientation for the seedling to grow away from the panel and up towards the light. Furthermore, light is maximized by the wall panels 34 being flat and, thereby, reflecting source lighting back to the plant leaves, thereby increasing the amount of light absorbed by each leaf to power photosynthesis and early-stage growth and ensuring that delicate seedlings mature quickly. Because flat panels directly reflect more light energy than do curved panels, maximal available light is directed back towards the plants. Furthermore, the outer surface 38 of each wall panel 34 has a light color such as white or other suitable reflective or glossy coating/color for reflecting light away from the grow system 10. The reflective color/coating advantageously keeps the interior of the tower cool and simultaneously reflects light onto the leaves of the plants growing in the grow cups providing them with extra light.

Each grow cup 50 includes an adjacent water-directing channel 74 formed in the wall panel 34. The water-directing channel 74 is formed on the inner surface 38 of the wall panel 34 with the channel 74 projecting inwardly from the inner surface 38 to form two raised surfaces or ribs/ridges. The two ridges form a V-like shape with the apex of the V removed to form a funnel-like structure that is wider distally from grow cup 50 and narrower proximally to the grow cup 50. The water-directing channel 74 is approximately as wide as the width of the grow cup 50 at the grow cup 50. The water-directing channel 74 is located proximally to the grow cup 50. The water-directing channel 74 is configured to direct nutrient solution that is emitted from the irrigation system 18 from above and dripping down the inner surface 38 of the wall panels 34 into the grow cup 50, over the substrate and plant roots in order to provide extra moisture in the location of the plants along the wall of the tower grow system 10. When multiple levels 36 are stacked upon each other, adjacent wall panels 34 of adjacent levels 36 include water-directing channels 74 for directing fluid toward a grow cup 50 formed on an adjacently lower wall panel 34. As such, some of the channels 74 are sized and configured to span two levels 36 and be formed on a vertically adjacent wall panel 34 to direct fluid into grow cups 50 located close to the top end 42 of a lower wall panel 34. The water-directing channels 74 direct nutrient solution that hits the inside top perimeter of the system's top walls. The water drips down along the inner surface 38 of the wall panels 34 and runs down into the interior opening 70 of the grow cups 50. Each water-directing channel 74 includes two legs to form a V-like shape with each leg extending laterally horizontally away from the grow cup 50 to the half-way point on the horizontal axis between growth cups 50 such that the water-directing channels 74 do not overlap the water-directing channels of a vertically adjacent grow cups. The nutrient solution that runs down the inside system wall panels 34 is directed to flow down onto the growth substrate where it further runs through and slowly passes down across the plant roots to provide them with nutrient-rich, pH-adjusted solution. In this way, nutrient solution is gently introduced to drip down and cling to plant roots, enabling their colonizing bacteria and fungi time to absorb and metabolize it without washing off said beneficial organisms with too harsh a flow. Additional, horizontal ridges may be inscribed across the inside surfaces of the wall panels 34 in order to further reduce the speed at which nutrient solution flows down them, thereby increasing exposure time for nutrient absorption by plant roots.

The grow cups 50 of the present invention do not require the use of net pots to retain the substrate, plant and roots. The substrate is precisely fitted to be received in the grow cups 50 of the present invention. The grow cups 50 have four canted walls that create a narrower base than top. Less labor is required to plant and harvest this substrate over systems with differently-shaped grow cup receptacles and/or wall overhangs, and over those that require net pots which are costly and difficult to re-use, and can reduce nutrient flow over the substrate and plant roots and can further damage the plant roots at harvest when said cups are separated from plant roots, causing the roots to tear. While preventing the substrate from moving within them, the grow cups 50 receive and secure the substrate without compressing it, thereby allowing substrate expansion due to unimpeded nutrient solution uptake and consequent plant root growth. Because the grow cups 50 are fully enclosed on three sides, their design directs root growth out through the inside and bottom surface openings of the grow cups 50 where roots will receive the most abundant nutrient supply. To prevent the substrate from slipping down through the grow cups and falling into the interior of the system, the grow cups include saddles along the two vertical interior sides, a retaining bar at the top and a partial step at the bottom which secure the substrate in a stable fixed position while allowing maximal interior surface area for irrigation, oxygenation and root growth. These saddles further prevent the substrate from rotating downwards and falling out of the tower when plants mature and become top-heavy, thereby ensuring that they remain in their optimal vertical orientation with respect to the light source and do not rotate downwards. The top three protruding edges of the grow cups are rounded to prevent cuts and wounds to users and prevent damage to the plants.

Figure 23:
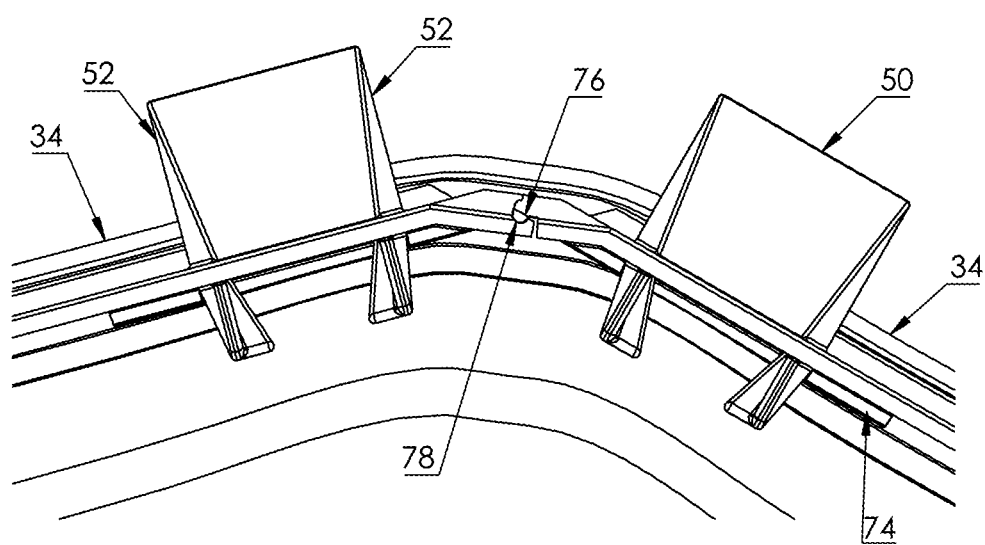
FIG. 23 is a bottom perspective section view of two adjacent wall panels according to the present invention.
Figure 24:
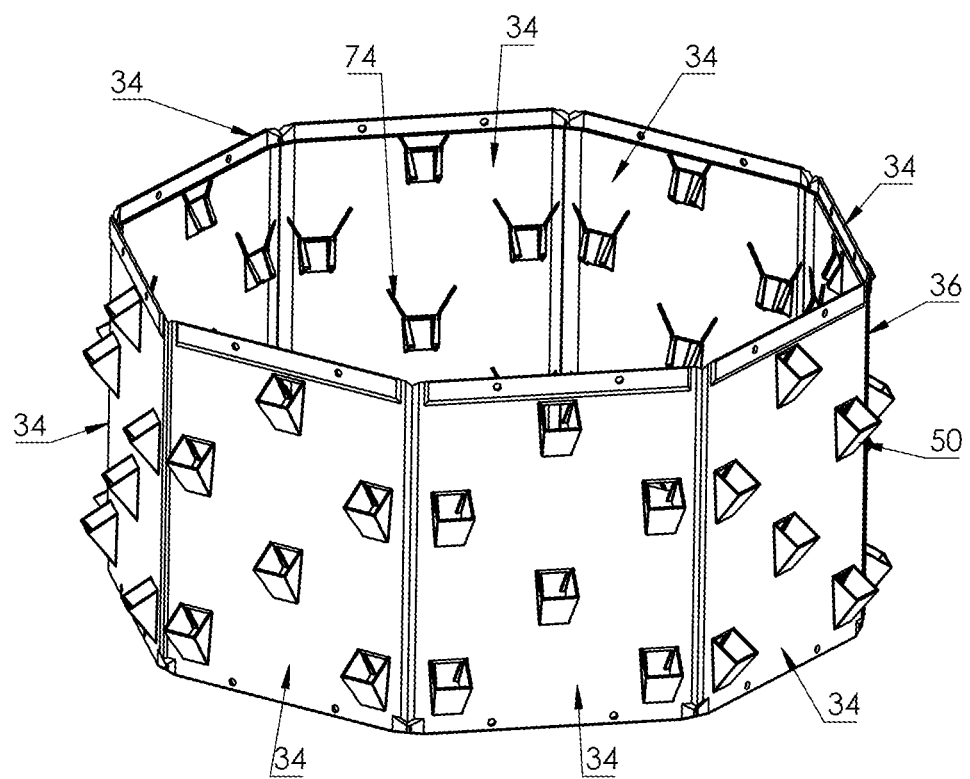
FIG. 24 is a top perspective view of a single octagonal ring-shaped level of a wall system according to the present invention.
Figure 25:
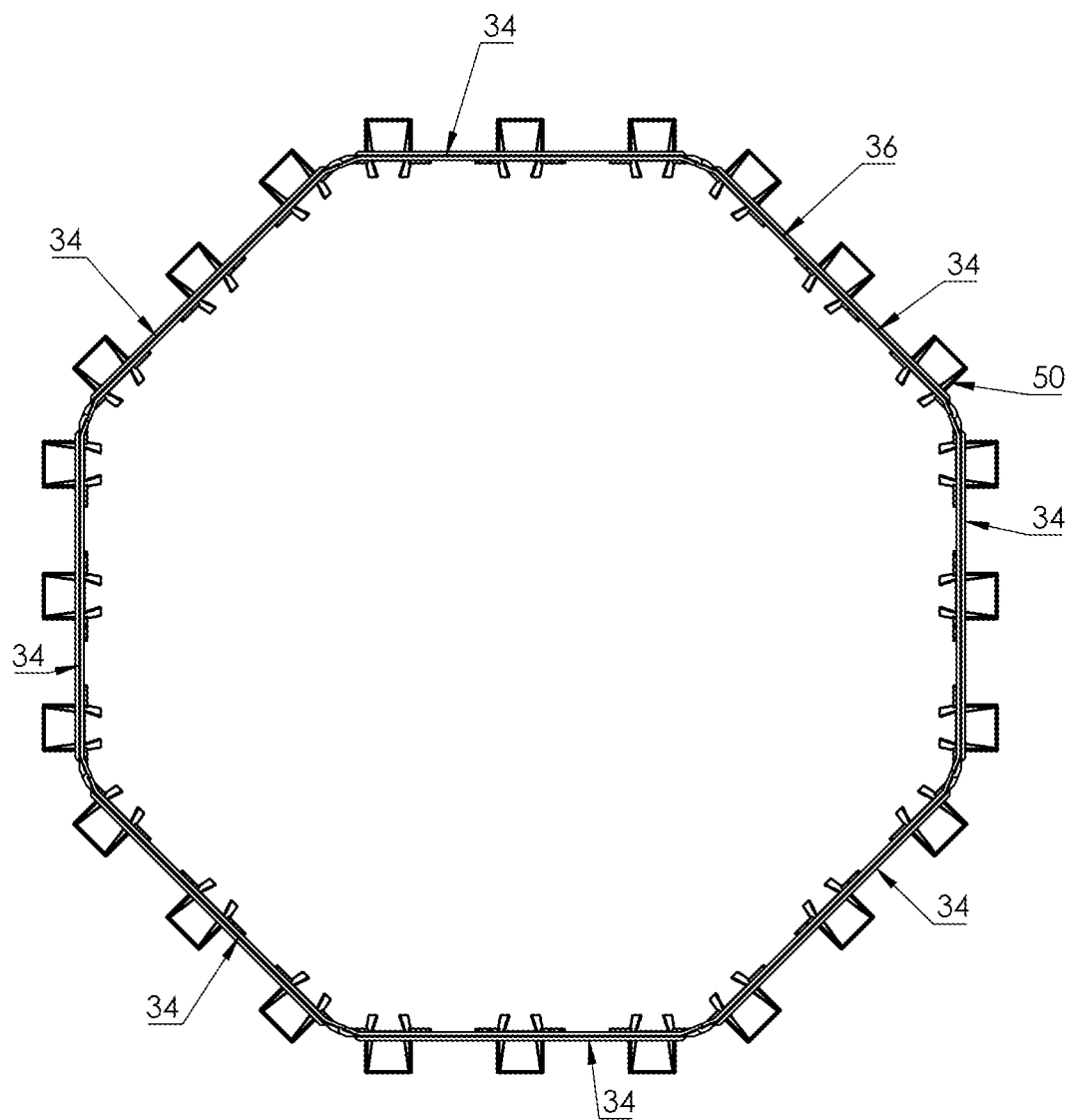
FIG. 25 is a top view of a single octagonal ring-shaped level of a wall system according to the present invention.

With particular reference to FIG. 23, the wall panels 34 click together along their vertical sides 46, 48 with a snap-fit attachment to form octagonal rings. In particular, a linear hemispherical ball joint tongue 76 is formed along the first side 46 that is sized and configured to mate with a complementary notched hemispherical groove 78 formed in the second side 48 of an adjacent wall panel 34. The tongue 76 is first inserted into the groove 78 with the adjacent wall panels 34 at an angle of approximately 80 degrees between them whereupon the wall panels are rotated to angle of approximately 45 degrees between them for the linear hemispherical ball joint and notched hemispherical groove to lock together in their detent position. The click-lock attachments form durable, rigid and waterproof seals. Two adjacent wall panels 34 connected along their sides 46, 48 with their respective tongue 76 and groove 78 mate together such that the adjacent wall panels 34 form an angle of 45 degrees between them as shown in FIG. 23. One octagonal-shaped level 36 is shown in FIGS. 24-25 wherein eight wall panels 34 are connected together along their sides 46, 48 using the tongue 76 and groove 78 configuration.

The wall system 16 has been designed with a single repeated, interlocking wall panel 34 component. Along their vertical edges, the wall panels 34 are angled with respect to the planar faces of the wall panels 34. The two-part tongue-and-groove snap-fit system enables the wall panels 34 to be assembled at a 45-degree angle such that eight wall panels 34 together form an octagonal level 36 having eight corners. These corners form eight vertical girders that are aligned vertically across multiple levels 36 and provide pillar strength for the octagonal column wall system 16 that is water tight and can withstand tension, compression, shear, bending and torsional forces. The vertical girders formed at the corners are areas of wall panel that are uninterrupted by apertures or grow cups and may further include an increased thickness in the wall panel 34 relative to the thickness of the wall panel in the location between the sides 46, 48. As a result less, less material is employed between the girders, giving the wall panels a high strength-to-weight ratio, making them lighter in weight overall and easier to handle by one person as well as less costly to manufacture and ship. The water-directing channels 74 provide additional rigidity to the wall panel 34 in the location between the girders. Together with the channels 74, the corner girders, the nesting ledges 80, the ring-level fasteners, the sturdy stepped base 12 and the snug-fitting convex lid 14, and sturdy stepped base 12, these create a solid and stable design that strongly resists torsion flexion and other deformational forces. The two-part tongue-and-groove snap-fit prevents leakage of fluid from inside the column at the vertical seams. Also, the tongue-and-groove attachment along the vertical edges of the wall panels 34 form a flush connection at the inner surface such that water flow across the vertical seams is not interrupted by discontinuities.

Figure 40:
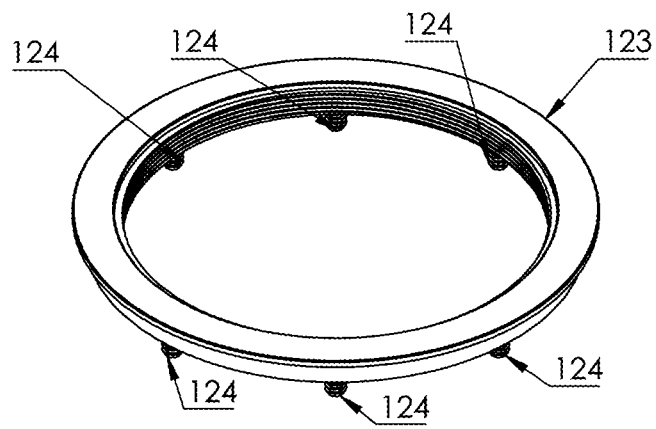
FIG. 40 is a top perspective view of a retaining ring according to the present invention.
Figure 41:
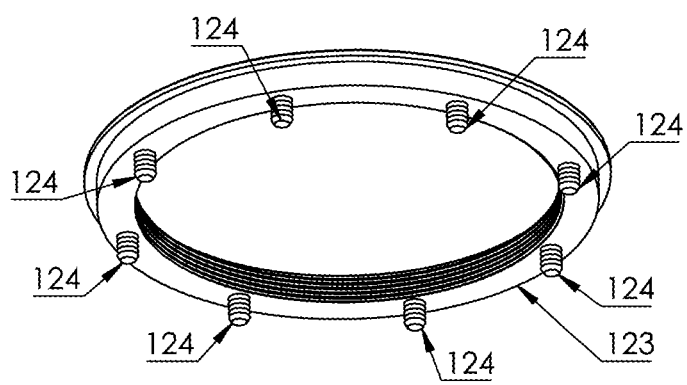
FIG. 41 is a bottom perspective view of a retaining ring according to the present invention.
Figure 42:
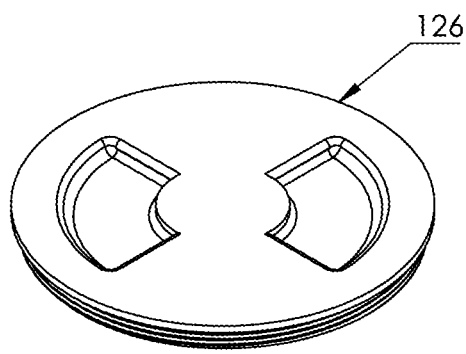
FIG. 42 is a top perspective view of a vent insert according to the present invention.
Figure 43:
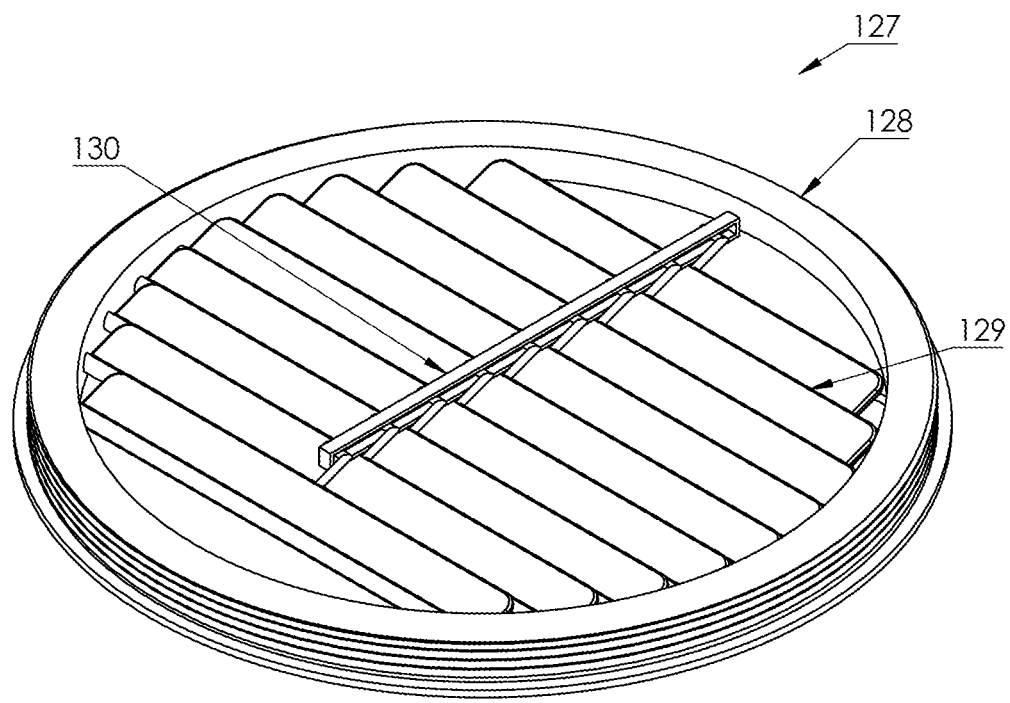
FIG. 43 is a top perspective view of a vent insert in an open position according to the present invention.
Figure 44:
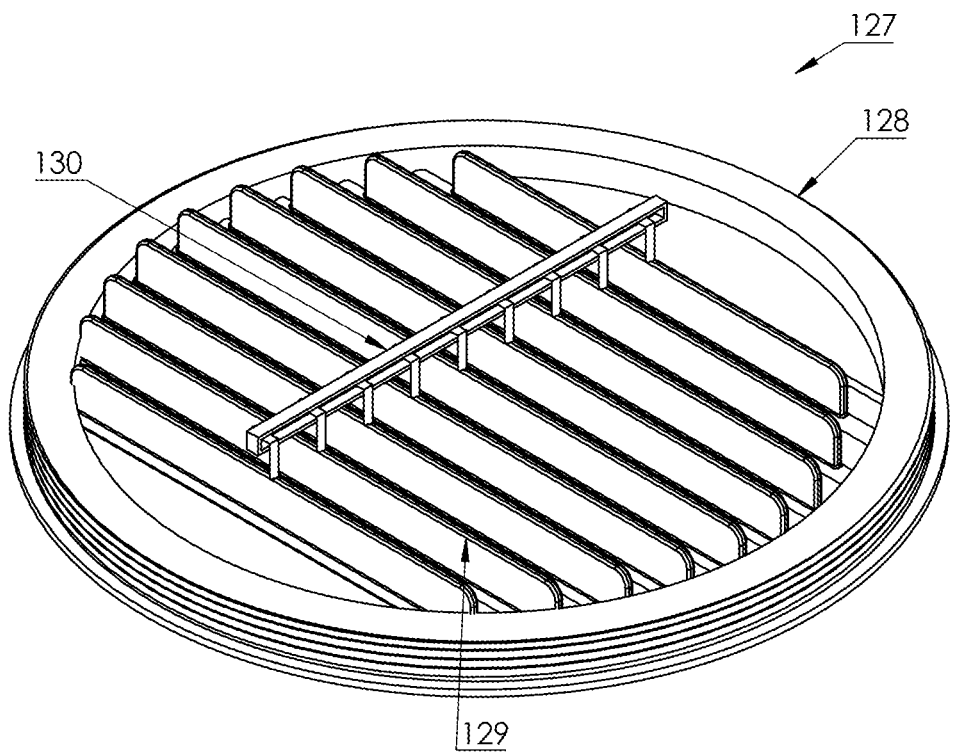
FIG. 44 is a top perspective view of a vent insert in a closed position according to the present invention.
Figure 45:
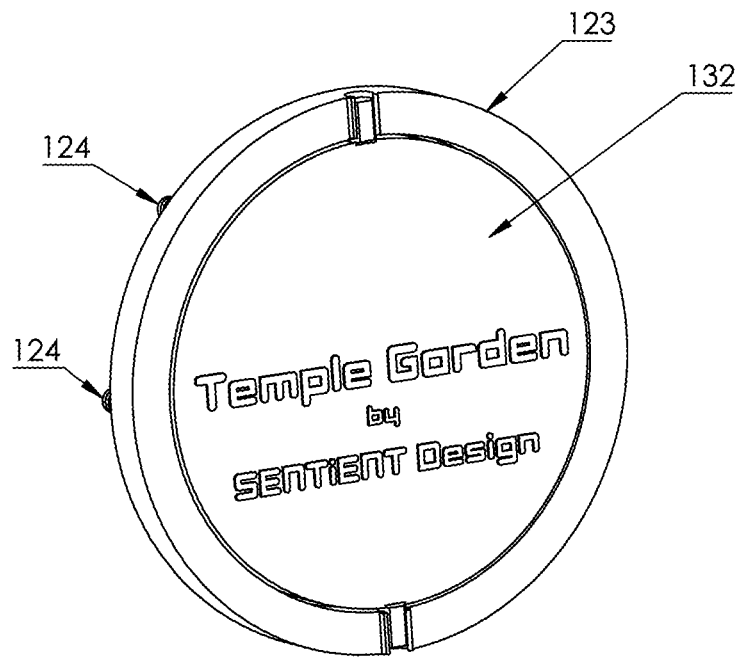
FIG. 45 is a top perspective view of a vent insert in a closed position according to the present invention.
Figure 46:
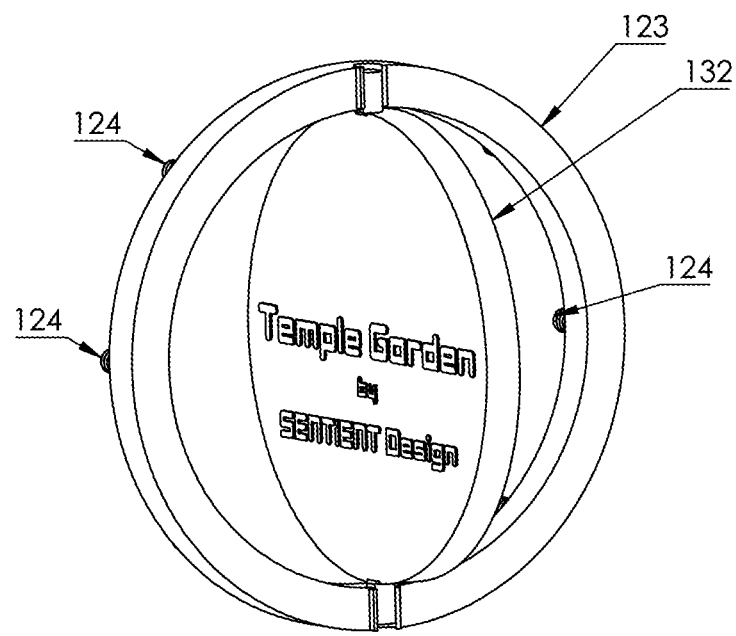
FIG. 46 is a top perspective view of a vent insert in an open position according to the present invention.
Figure 47:
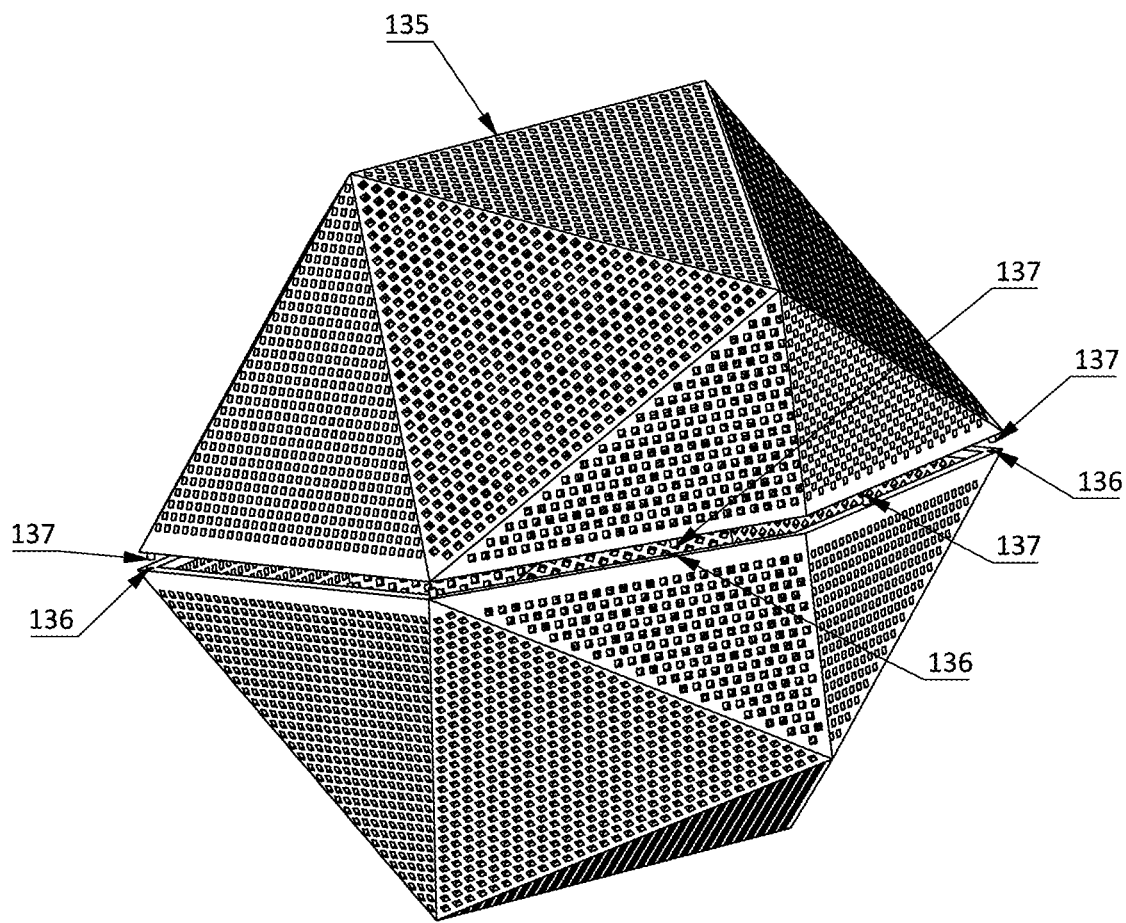
FIG. 47 is a top perspective of bio box in an open position according to the present invention.

The first or bottommost level 36 is provided with at least one porthole 37 formed through one or more of the wall panels 34 of the ring level 36. The porthole 37 may be provided with a retaining ring 123 of the type shown in FIGS. 40-41 having insertion pins 124 for snapping into complementary apertures in the wall panel 34 or lid 14 in the location surrounding the porthole 37. The inner perimeter of the retaining ring 123 includes threads for threading with a variety of vent inserts 126, 127. A vent insert 127 with louvers to cover the porthole 37 in an adjustable manner is shown in FIGS. 43-44. The louvered insert 127 has an open configuration shown in FIG. 43 in which a plurality fins 129 that are connected to a spine 130 are perpendicular to the plane of the ring and a closed configuration shown in FIG. 44 in which the plurality of fins 129 are substantially parallel with respect to the plane of the ring 123. Any position in between the open and closed configuration is possible by moving the spine 130 and/or fins 129 to any degree or angulation to adjust the opening of the slats between the fins 129. Another variation of a vent insert 126 is shown in FIG. 42. Turning to FIGS. 45-46, a retaining ring 123 with insertion pins 124 for snapping into complementary apertures in the wall panel 34 or lid 14 in the location surrounding the porthole 37 is provided. The outer surface of the of the retaining ring 123 is provided with C-shaped channels for snap connecting with posts of a vent insert 132 such that the vent insert may swivel between an open position shown in FIG. 46 and a closed position shown in FIG. 45 in order to adjust the degree of ventilation.

The vent inserts 126, 127 can open and close to provide the tower system 10 with adjustable access to air entering the tower from the ambient exterior environment. Access to the cooler air at bottom of the tower provides convective circulation and cooling for the interior environment of the tower. The porthole provides ventilation as well as a means for observation of the irrigation pump and fluid level in the base 12 and a means to refill it and adjust nutrients and pH level. In one variation, two portholes 37 are provided in opposite locations of the first level 36 for added ventilation. Additional portholes 92 may be provided in the lid 14. The portholes 37 serve as access points for accessing the reservoir interior or for observation of the internal environment, monitoring the health of the plant roots, inserting instrumentation, thermometers, for filling and topping off the reservoir, for checking on the pump, for checking and cleaning the filter element, for inserting and removing bio bags and for other purposes. A wall panel 34 with a porthole 37 can be integrated into the tower at any panel location and level of the column. The portholes 37 are sized to allow sufficient area for instruments and hands to be inserted, and for visual observation. Inserts of clear plastic in lieu of vented inserts are employed for viewing the interior of the grow tower chamber without the need to open and disrupt the air flow and temperature. Because temperature regulation is critical to plant growth and this regulation can be solved through convective cooling, the lower access points and higher access points such as in the lid when opened can also serve as a flue system for conveying heat out the tower lid through convective cooling. The subject system is especially efficient at convective cooling during hot weather because of its large open interior vertical column and the fine mist that is developed within it by the spray system. When both the base and lid portholes 37, 92 are opened, mist rises out the top of the column as with a chimney, thereby conveying the heat with it and drawing cooler, oxygenated air into the system at the base. When the porthole doors are louvered or provided with vents, the rate of convective cooling can be adjusted by the user.

The system 10 includes a large, open interior column without structures that would interfere with natural convective currents. The large, wide and unobstructed nutrient reservoir base 12 that sits directly on and is in contact with the underlying terrain is self-regulating with respect to the water solution temperature inasmuch as it is cooled by the ground during periods of extreme high ambient air temperatures and warmed by the ground during periods of low ambient air temperatures. This temperature-regulated nutrient solution is distributed in fine droplets throughout the interior cubic space of the tower, thereby keeping its microbiome within safe temperature zones and also cooling and moistening the plant roots. Additionally, as nutrient solution cascades down the inside flat surfaces of the wall panels comprising the tower system, it draws off heat and cools them. Portholes 37, 92 placed just above the reservoir base 12 and in the lid 14 allow heat to escape through passive or active convection of humid air during periods of high external ambient temperature. Inversely, heat can be absorbed and retained by closing the portholes during periods of low external ambient temperature, thereby regulating the temperature of the nutrient solution and thus modulating the effect of external temperature swings on the internal cavity of the tower, on the plant roots and the colonizing bacteria and fungi that serve to metabolize the raw nutrients, and even on the plant leaves.

Each octagonal level 36 is configured to be capable of nesting on top of another octagonal level 36. The first or bottommost level 36 is set on top of the base 12. Additional levels 36 are located on top of the level 36 below to create a taller grow system 10 with more grow sites 50. A tower with five ring levels 36 includes as many as 240 grow cup cultivation sites. In order to facilitate vertical stacking of ring levels 36 the top end 42 of each wall panel 34 includes a ledge 80 sized and configured to receive a complimentarily-shaped bottom end 44 of the wall panel 34 directly above. Each wall panel 34 at their top and bottom mating ends 42, 44 include a half-lap joint that allows each wall panel 34 to be stacked atop the one below. These lap joints act as centering means that increase the ease with which ring levels 36 are placed upon one another and create a snug pressure fit from the weight above. The lap joints advantageously resist accidental displacement or removal of the ring levels 36 and wall panels 34. Additionally, the lap joints at the seams between the ring levels prevent nutrient solution from seeping out, further preventing resulting algae growth and calcification from building up at the outside joints which can be harmful to plants and cause degradation of the underlying structure. Also, the lap joint is configured to form a flush inner surface across horizontal seams of vertically adjacent wall panels such that water flow across these horizontal seams is not impeded. Smooth and slow laminar fluid flow down the inside structural walls is maintained across the horizontal seams between the wall panel tops and bottoms with the lap joint and outer ledge.

Figure 26:
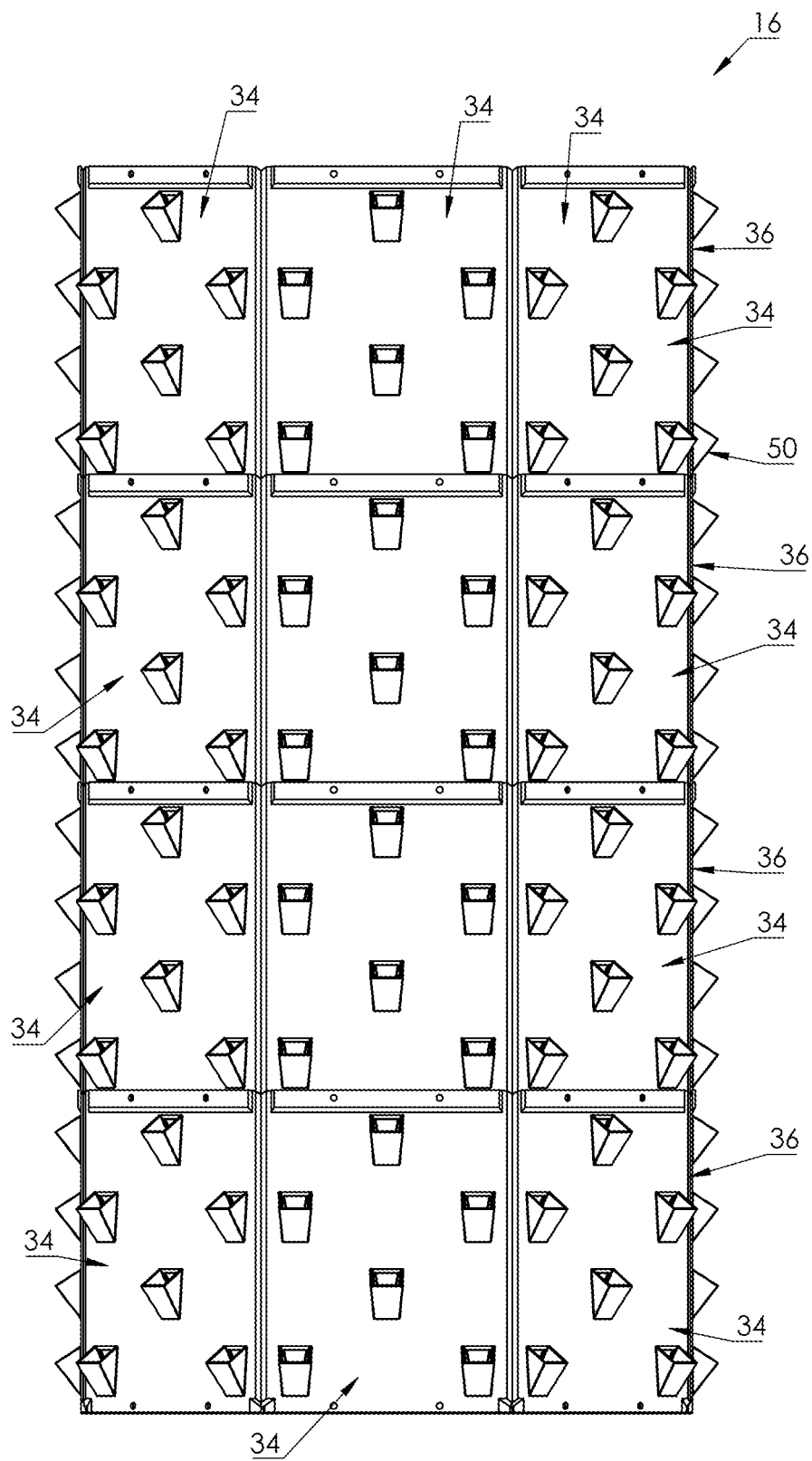
FIG. 26 is a front elevational view of a wall system comprising four octagonal ring-shaped levels according to the present invention.
Figure 27:
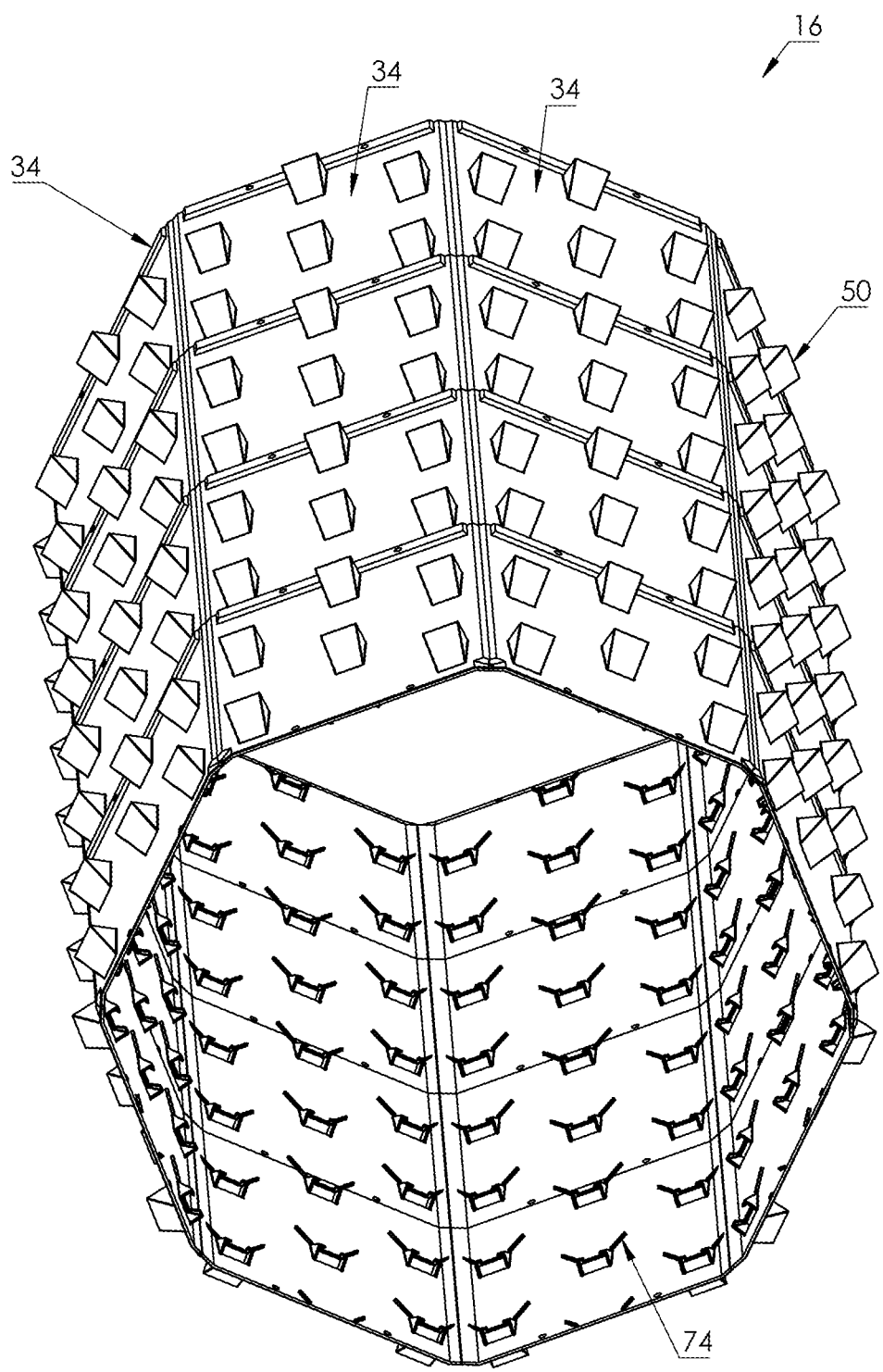
FIG. 27 is a bottom perspective view of a wall system comprising four octagonal ring-shaped levels according to the present invention.
Figure 28:
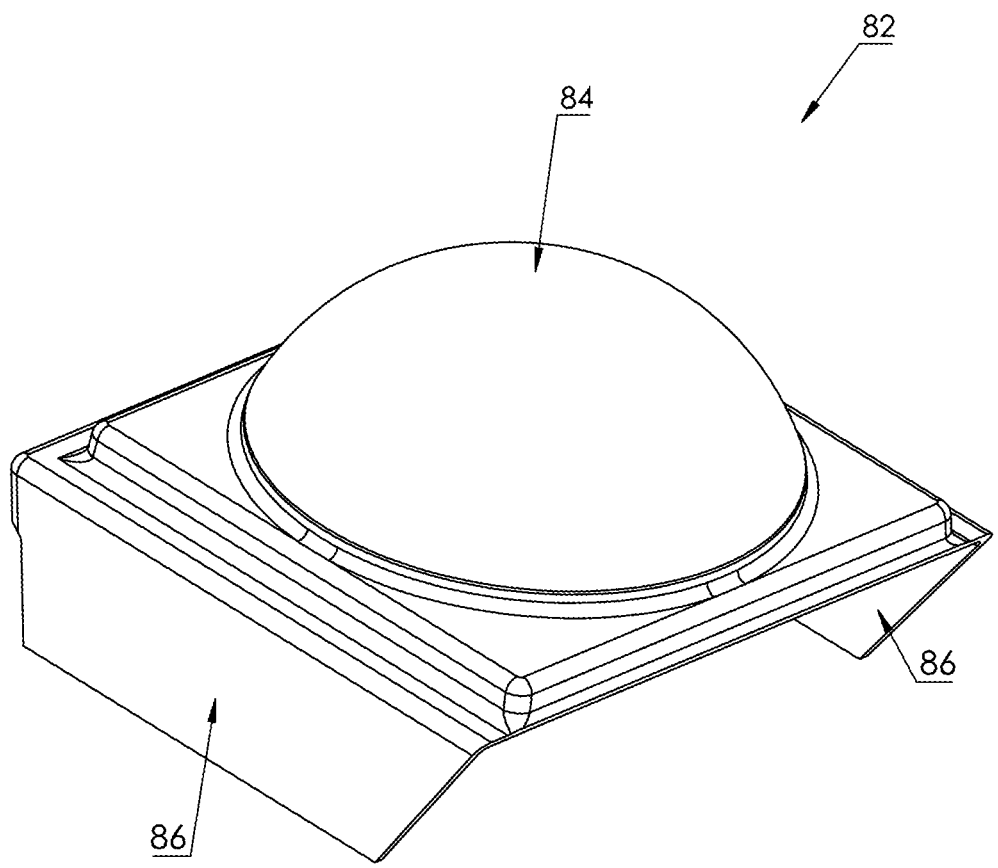
FIG. 28 is a top perspective view of a grow cup cover according to the present invention.
Figure 29:
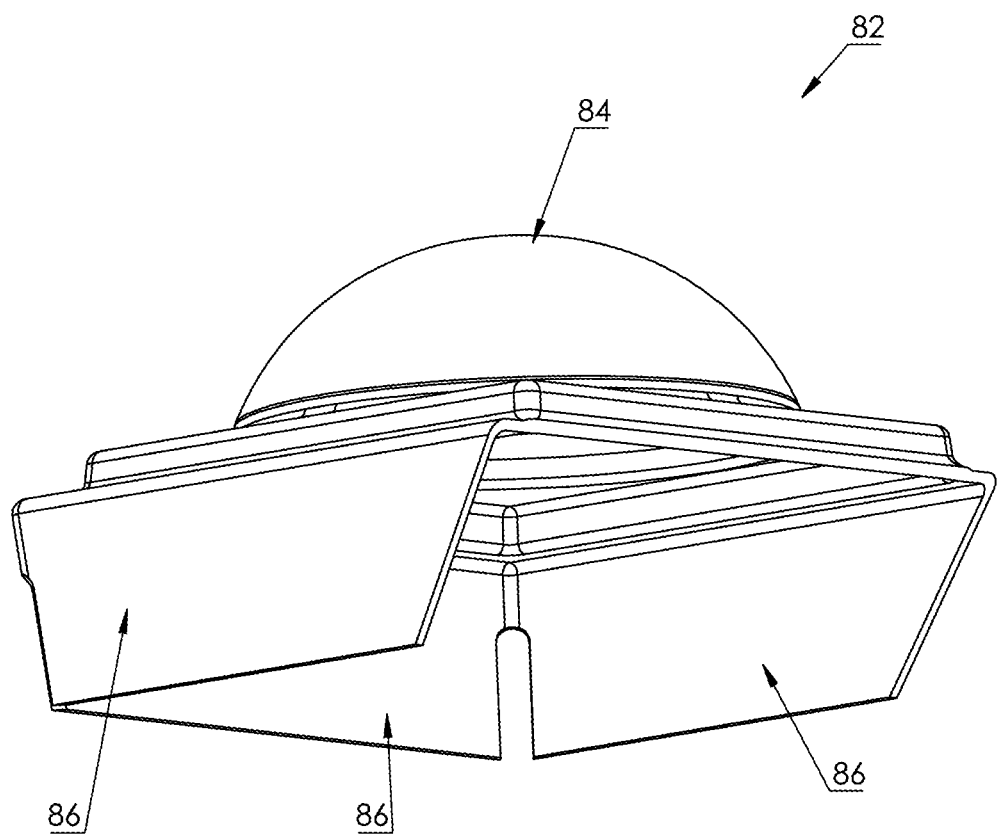
FIG. 29 is a bottom perspective view of a grow cup cover according to the present invention.
Figure 30:
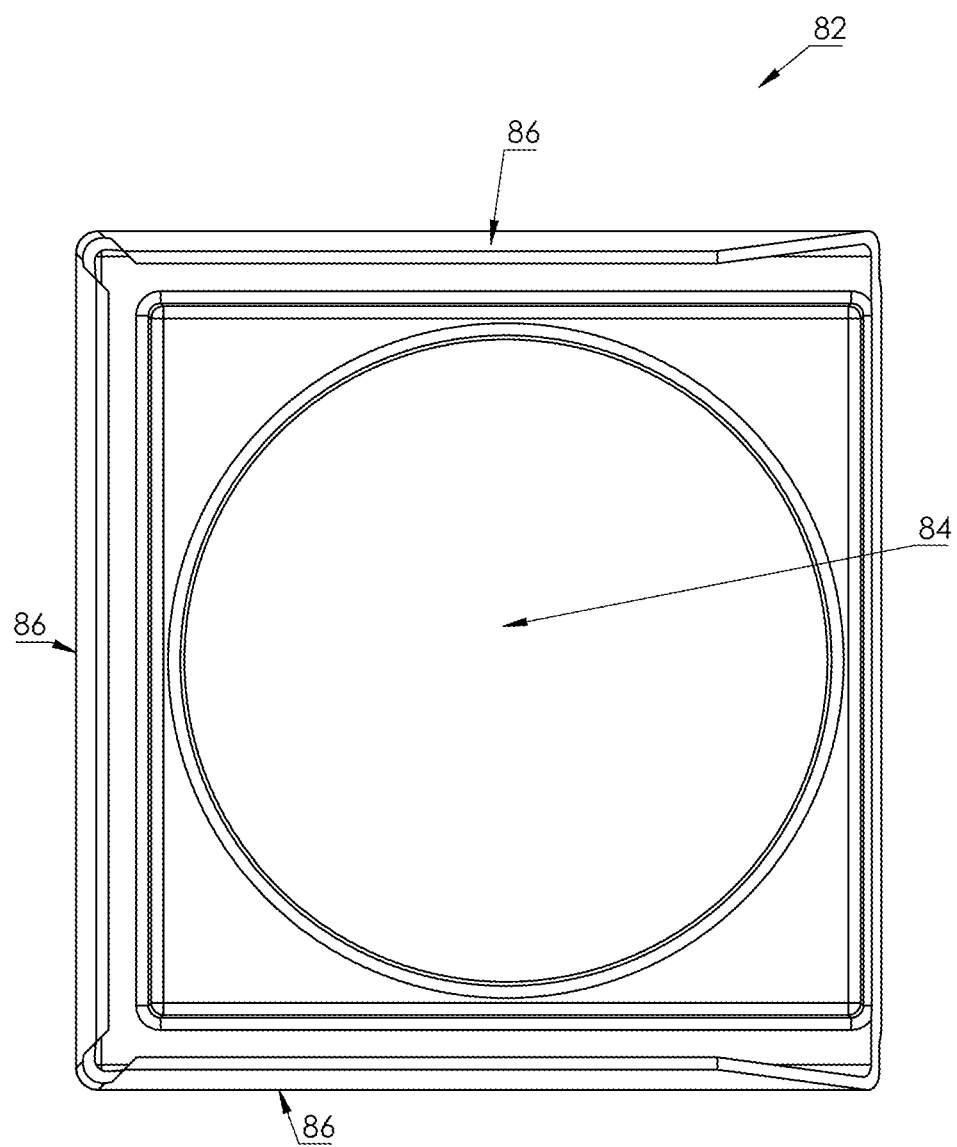
FIG. 30 is a bottom view of a grow cup cover according to the present invention.
Figure 31A:
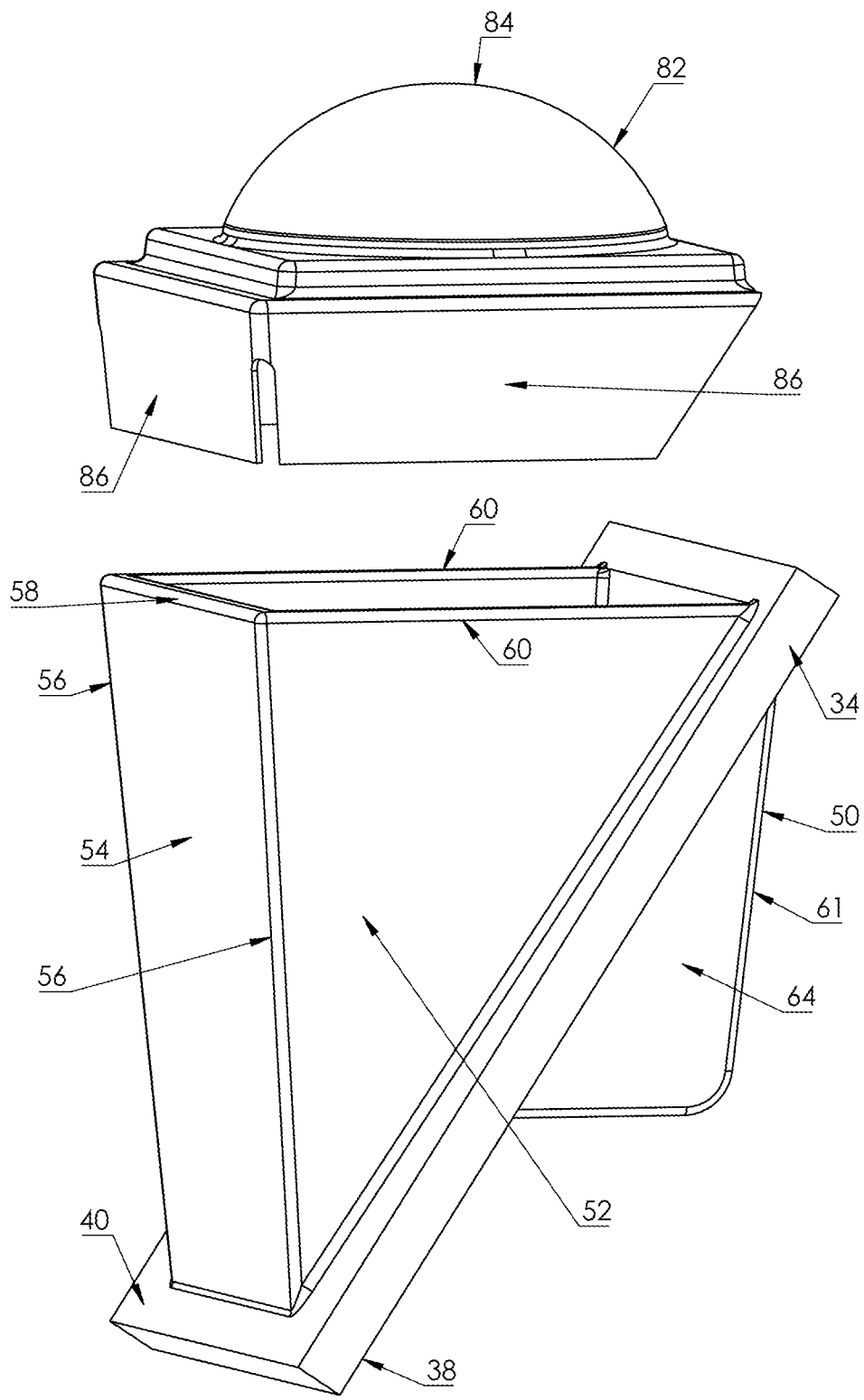
FIG. 31A is a top perspective, exploded view of a grow cup cover and grow cup according to the present invention.
Figure 31B:
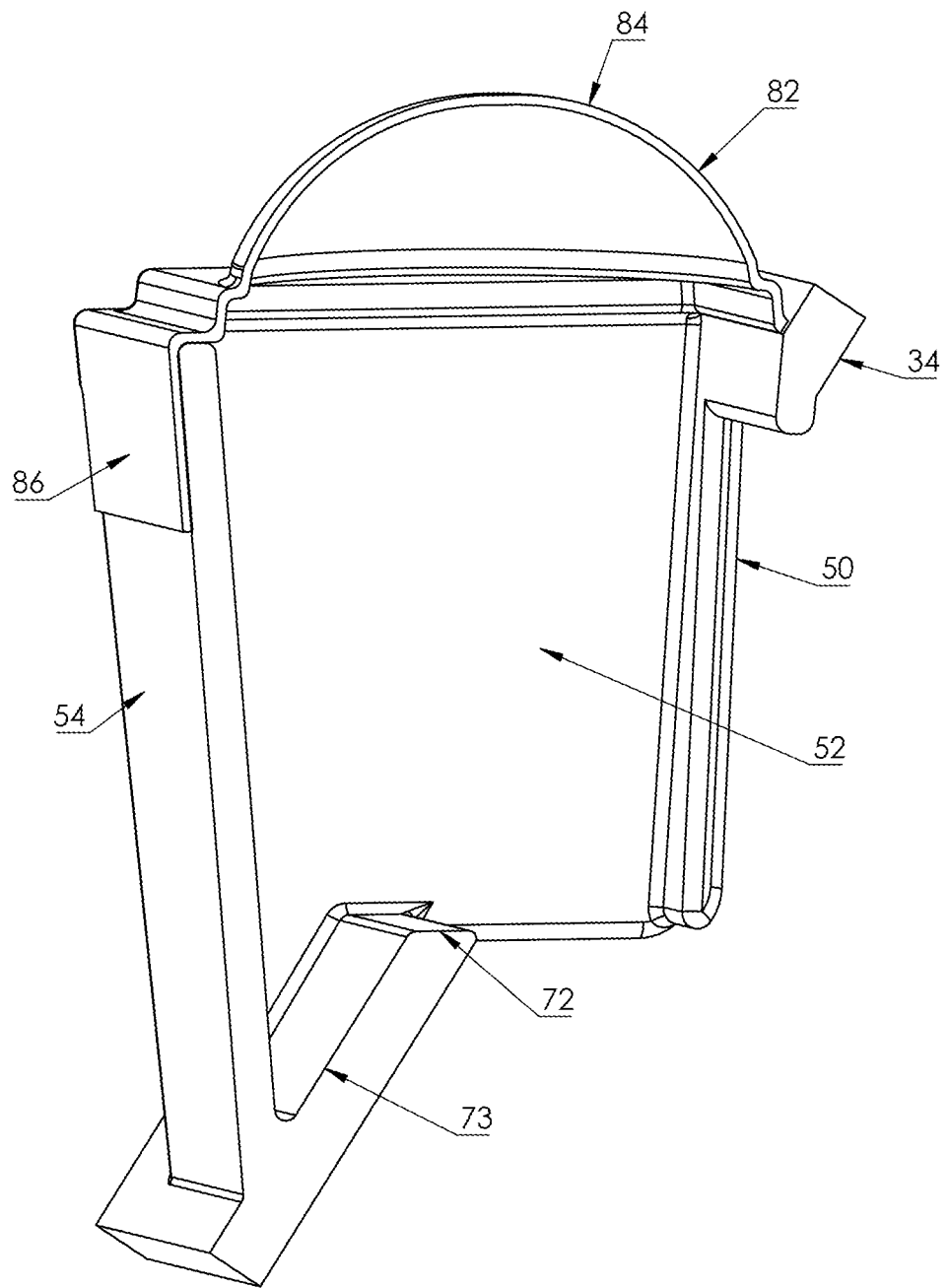
FIG. 31B is a cross-sectional view of a grow cup cover and grow cup according to the present invention.

All of the wall panels 34 are advantageously identical and serve as building blocks for any of the ring levels 36. Some of the wall panels 34 are distinguished only by the presence of a ventilation porthole which can be located anywhere around an individual ring level 36 or on any one of the multiple levels 36 in the tower. In addition to the ledge 80 serving as a means for the vertical attachment of wall panels 34, a plurality of apertures 45 along the top end 42 and bottom end 44 are provided for the insertion of optional fasteners (not shown) preferably of the type described in U.S. patent application Ser. No. 16/537,322 entitled "Fastener" by Sentient Design, Inc. of San Diego, Calif. incorporated herein by reference in its entirety. The fasteners are passed through the apertures 45 of a wall panel 34 and through the apertures 45 of a wall panel 34 directly above and/or below it. Alternatively, or in addition to the use of fasteners, the bottom end 44 may be configured to snap-fit with the top end 42 of a wall panel 34 directly below it. A wall system 16 constructed with four ring levels 32 is shown in FIGS. 26-27. Although the system is designed for a snug pressure fit, the fasteners further ensure that a level 36 cannot forcefully be separated from the one above or below when attached. Each wall panel 34 includes four mounting apertures 45 per side for a total of 32 such apertures 45 per level 36. These apertures 45 are placed two per wall at the top and two per wall at the bottom, allowing the wall panels to be fastened together at their adjoining tops and bottoms to create a single solid structure. The resulting octagonal level advantageously resists rotation due to torsional forces when external forces are applied.

Turning to FIGS. 28-32, a removable grow cup cover 82 according to the present invention will now be described. The cover 82 fits onto the top of a grow cup 50 to advantageously provide the seed and seedling protection from the elements including light, rain, wind, birds and other predators. Furthermore, due to heat transfer from the top of the dome to the interior, the cover 82 advantageously provides a greenhouse-like, warm and moist environment and prevents the substrate from drying out for improved seed-to-seedling growth. The cover 82 is slipped onto a grow cup 50 when seeded substrate is inserted into position inside the grow cup 50. The cover 82 includes a domed top 84 to provide extra space for seedlings to grow. The cover 82 includes three closed sides 86 that slide over the exterior front 54 and sides 52 of the grow cup 50 to provide a secure snap-fit or compression fit connection. The open side of the cover 82 faces and outer surface 40 of the wall panel 34.

The seed cover 82 of the present invention allows the seeds to be propagated in place in the vertical system grow cups and thus avoids the need for secondary systems for germinating seeds and growing seedlings. The seed covers 82 are domed caps designed to fit snugly onto the grow cups 50 and completely cover the exterior opening 62. The seed covers 82 protect the seed and substrate from pests and predators, allow them to be remain irrigated and moist, keep them in the dark, warm them during the day and provide the best conditions for the early establishment of rhyzospheric colonization by beneficial microorganisms. To ensure unstinted growth, seed covers 82 are domed to allow the seeds to germinate and grow stalks with cotyledons. Once the cotyledons are open and established, the seed covers 82 can be removed and the plants exposed to light. This integrated propagation and cultivation system advantageously increases propagation success and reduces equipment usage and associated costs, saves time, saves labor, and reduces transplantation risk. It further helps the plants become established quickly and grow more vigorously by providing the right conditions to cultivate rhyzospheric microbial colonization and further grow and circulate these microbes throughout the system. The seed covers 82 are further designed to slide on and off the grow cup 50 receptacles without the need for tools, and to remain on the grow cups 50 without falling off due to environmental forces such as high winds. Additionally, the grow cup reservoir 73 that is integrated into the base of each grow cup 50 further ensures that the substrate remains moist throughout the propagation cycle. In this singular propagation/cultivation system, nutrient solution composition and pH can be adjusted to the needs of the plants at each stage, seeds, seedlings and plants can be kept at the proper temperature range, seeds and seedlings can be kept safe from light, pests and predators, and plants can be grown undisturbed from seed to harvest.

Figure 33:
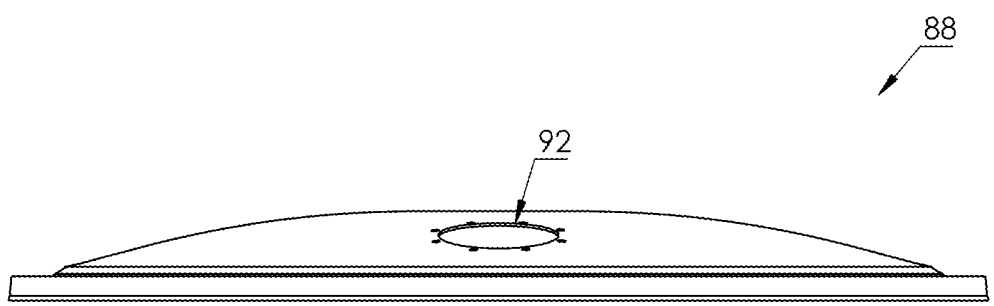
FIG. 33 is a front elevation view of a lid according to the present invention.
Figure 34:
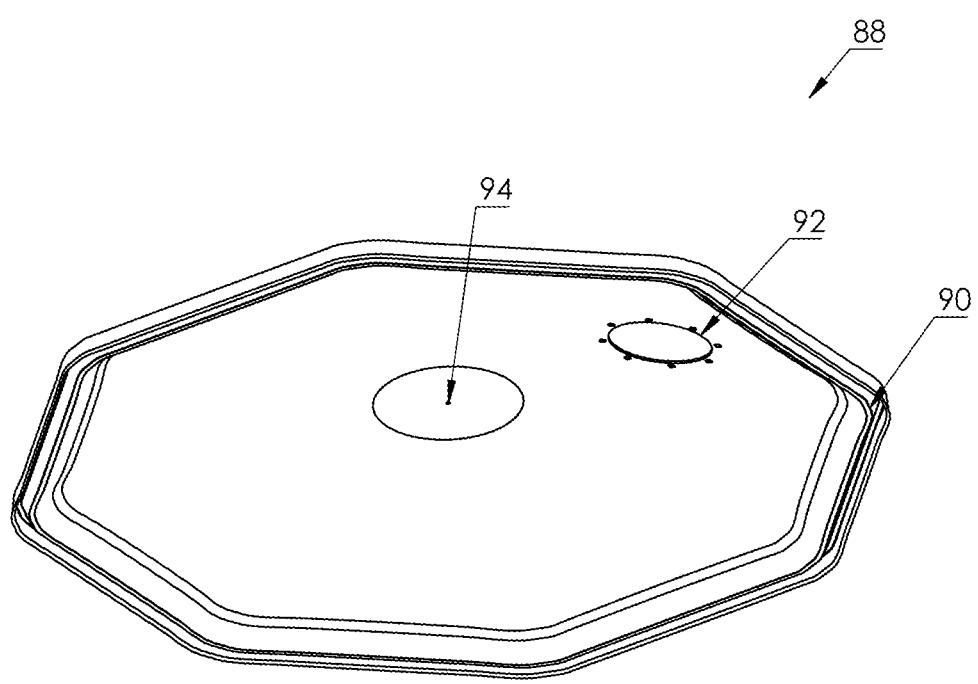
FIG. 34 is a bottom perspective view of a lid according to the present invention.

Turning now to FIGS. 33-34, the lid 14 of the grow system 10 will be described. The lid 14 is sized and configured to fit on top of the topmost level 36 of the wall system 16. The lid 14 closes the interior volume of the system 10, helps maintain high levels of humidity inside the tower system 10 and shades the plant roots from direct light. The lid 14 is octagonal in shape to correspond with the octagonal ring-shaped levels 36. The undersurface of the lid 14 includes a double overlap lip forming a centering groove 90 around the perimeter of the lid 14 sized and configured to receive therein the top ends 42 of the wall panels 34 of the topmost ring level 36. The centering groove 90 makes it easy to place and remove the lid 14. In one variation, the walls formed along the interior and exterior perimeter of this groove 90 are canted inwards towards their respective tops, making the groove 90 wider at the base. This makes the lid 14 fit easily onto the wall panels 34 and allows the lid 14 to be easily pushed onto the column for a snug, water-tight fit that does not require additional fastening. The lid 14 increases the structural rigidity and integrity of the tower system 10 when in position on top of the wall system 16. The lid 14 provides columnar strength to the system 10 by connecting together the wall panels 34 at the topmost section of the tower. Combined with the base 12, the lid 14 fully connects the wall system 16 into one integrated structure that firmly resists bending and twisting. Furthermore, the lid 14 is domed-shaped having a concave undersurface and convex outer surface providing vertical and lateral structural integrity and, like an umbrella, directing rainwater away due to its parabolic, convex shape. Because the perimeter of the lid 14 is octagonal and the top section is domed, the eight transition points serve as curved girders that add structural strength to the cap, thereby allowing it to be manufactured out of lightweight materials. Additional structural strength is designed into the cap through its corrugated outer perimeter. The lid 14 provides a dark environment for the plant roots protecting them from direct light that would dry out the rootlets and root hairs and kill the rhizospheric microbial colonies living among them.

When the irrigation system 18 is turned on, some of the spray from the irrigation system 18 will land on the undersurface of lid 14 and because of the concave shape beads of moisture will advantageously flow down and be directed toward the perimeter of the lid 14. At the perimeter, some of the spray from the irrigation system will hit the inside portion of the centering groove 90 that is angled to further direct moisture from the lid 14 and onto the inner surfaces 38 of the wall panels 34 of the topmost ring level 36. The outside portion of the centering groove 90 is resident outside of the wall system 16 and abuts the outer surfaces 40 of the wall panels 34. The lid 14 seals the juncture with the wall system 16 in a manner that prevents moisture from leaking out of or into the tower system 10 while advantageously directing moisture down the inner surfaces 38 of the wall panels 34 where the V-shaped water directing channels 74 further direct moisture into the grow cups 50. Any additional nutrient solution adhering to the inside surface of the lid through surface tension will cascade towards the inside perimeter and flow downwards across the inner lip where it will then be directed onto the inside panel walls of the column and down onto the plant substrate and roots.

The lid 14 also helps regulate the internal temperature of the tower system 10. The lid 14 further includes a hole 92 in the domed top. The hole 92 provides for ventilation of the interior space. The circular hole 92 may be fitted with solid porthole door or with a retaining ring 123 such as that shown in FIGS. 40-42 which in turn can be provided with a vent insert 126 such as that shown in FIG. 42 or one with louvers as shown in FIGS. 43-44, or a solid door that rotates to open and closed to adjust the amount of air passing through the hole 92 as shown in FIGS. 45-46. The solid door 132 in FIGS. 45-46 can also be snapped in and out of the C-channels formed into the retaining ring frame 123. Together with the porthole in one or more of the wall panels 34 of the wall system 16, the hole 92 in the lid 14 provides adjustable air exchange and ventilation and sets up convection currents as cooler air enters the one or more portholes in a lower wall panel(s) and warmer air exits the hole 92 in the lid 14. This ventilation provided by the grow system 10 advantageously maximizes oxygenation of the root system inside the grow tower. The ventilation also assists in controlling the temperature of the interior environment which can be regulated with timed activation of a fan or opening and closing of louvers electronically or manually. The hole 92 may be fitted with a passive fan driven by the convection currents or with an active fan powered by electricity. The lid 14 further includes a central opening 94 for mounting a spray nozzle of the irrigation system 18. This spray nozzle may be mounted directly beneath the inside of the domed lid or may be dropped down by means of a standoff or spacer to adjust the points at which the spray hits the inside of the system. Other apertures may be provided in the lid 14 and configured for mounting additional hardware including but not limited to a solar panel for powering the irrigation system 18 or ventilation fan, irrigation control electronics and a battery pack.

In one variation, the lid 14 is provided with mounting holes for a solar panel. This solar panel can be used to power the irrigation system 18, making the system power energy independent and providing shade to the tower during times of high insolation and heat. The high strength and curved underside of the lid 14 also permits the mounting of the irrigation spray head 100. By mounting the spray head 100 into the underside of the lid 14, secondary support structures are not required such as affixing to a hard pipe that runs up from pump at the system base.

With reference back to FIGS. 4-5 and to FIGS. 35-39, the irrigation system 18 will now be described. The irrigation system 18 includes a water pump 96 located inside the base 12 and a flexible conduit 98 connected to the water pump 96 for delivering fluid to a spray nozzle 100 connected to the lid 14. The water pump 96 is a brushless submersible DC water pump 96. The DC water pump 96 is connected to a power source (not shown). The power source may be a battery, a standard AC household current via an inverter, a solar panel (not shown) mounted to the lid 14 or any combination of the above. The pump 96 is submerged in nutrient solution located in the base 12. The pump 96 draws solution from the reservoir base 12 and up through the flexible tubing 98 to the spray nozzle 100 from where the nutrient solution is delivered to the roots of the plants inside the wall system 16. The conduit 98 is a flexible irrigation hose. This conduit 98 can be hand-pressed onto the fittings at the proximal ends of the pump 96 and spray nozzle 100 respectively and removed as necessary. The conduit 98 can also be securely fastened to each end with a hose clamp or similar fastener. While the figures depict the conduit 98 in the middle of the column, alternatively, the conduit 98 can be placed on the side running it from the pump to the edge of the base, up one of the tower interior corner girders or octagonal corners and then to the receiving end of the spray nozzle 100. A conduit with a smaller diameter requires a smaller volume of nutrient solution to be raised to the height of the irrigation head and, therefore, a low power pump 96 may be used to provide a rapidly rotating spray nozzle 100.

Figure 38:
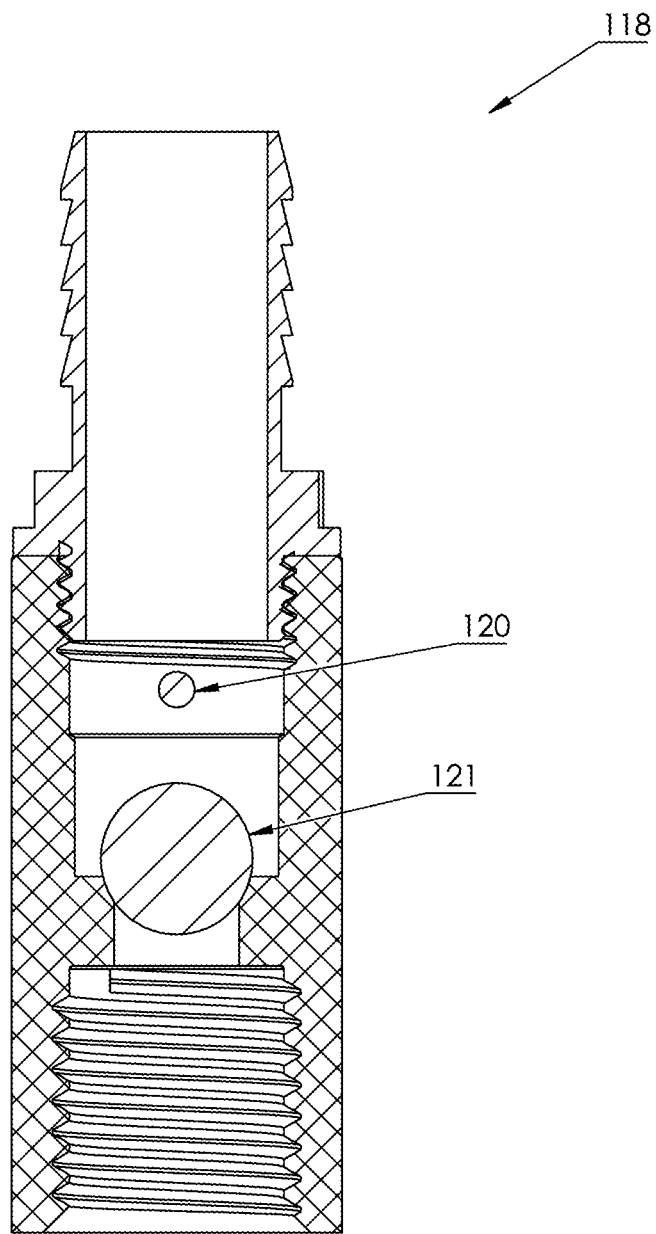
FIG. 38 is a cross-sectional view of a valve in a closed position according to the present invention.
Figure 39:
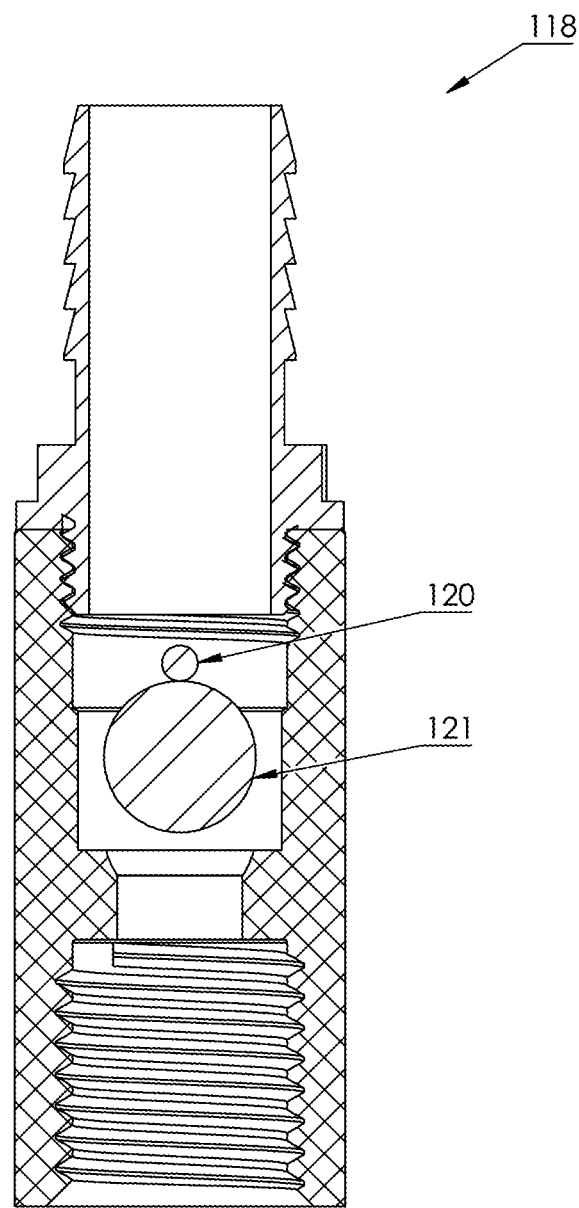
FIG. 39 is a cross-sectional view of a valve in an open position according to the present invention.

When the irrigation system 18 is turned on and off, nutrient solution is intermittently raised up the conduit 98 from a pump submerged in the reservoir base. At the end of each timed irrigation cycle, this solution will drop back down the length of the conduit 98 to the level in the reservoir of the base 12. The solution must then be pumped back up the conduit 98 at inception of each succeeding cycle before being exiting the spray nozzle 100 and being delivered to the plants. To save energy and time that the pump is activated and also to avoid vapor locking of the pump and/or spray nozzle, a one-way ball check valve 118 is provided at the base of the conduit 98 where it connects with the pump 96. The check valve 118 having a ball 121 and a stop 120 that automatically opens and closes with fluid pressure is shown in FIGS. 38-39. At the end of each irrigation cycle when the pump 96 shuts off, the check valve 118 is configured such that a standing column of nutrient solution advantageously remains in the conduit 98 and, in one variation, also remains in the spray nozzle 100. When the pump is turned on, nutrient solution in conduit 98 is immediately delivered to the plants at the beginning of each new pump cycle conserving energy and time.

Figure 37:
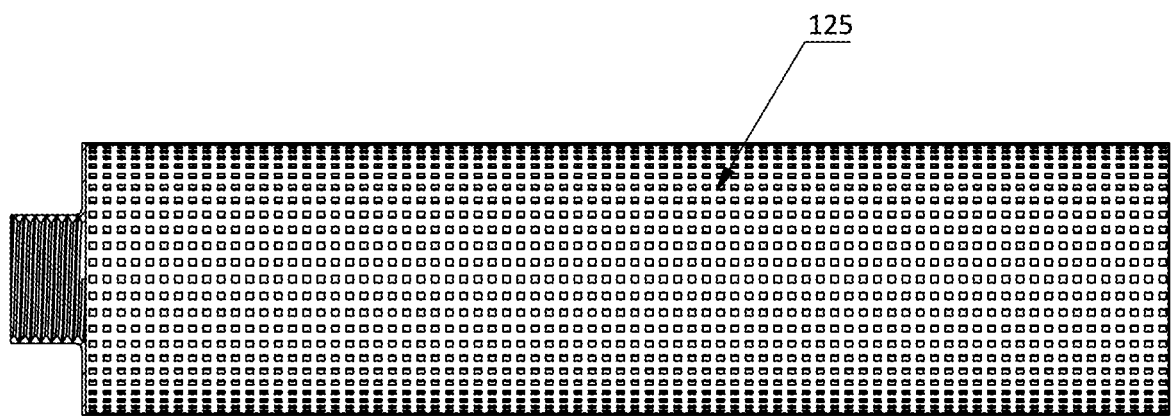
FIG. 37 is a front elevational view of a filter according to the present invention.

The water pump 96 is a low-power, high-volume pump. The submersible pump 96 used in the subject invention is a 12-volt DC brushless pump that requires less than 10 watts of electrical power. The low electrical requirements allow the irrigation system 18 to use a 12-volt solar panel placed without the need for an inverter or storage battery. A filter 125 may be provided to filter the nutrient solution so as to not clog the pump or spray nozzle. The filter 125, as shown in FIG. 37, is a plastic cylinder with a plurality of holes to allow high volumes of water to enter without restriction and a proximal end with a screw fitting for attaching to the pump inlet. The holes block particles over a specific size from entering and clogging either the pump or the irrigation head. As it attached to the outside of the pump, it is easily inspected and cleaned. Also, an electronic irrigation controller (not shown) may be provided to control the pump 96, irrigation cycle and power supply. The controller includes a microprocessor and input and output means including a display and means including sensors to monitor key cultivation parameters such as ambient temperature, temperature inside the grow system 10, nutrient solution levels, pH levels, humidity, battery charge, solar panel efficiency and the like. Integration of the control system via wireless technology including a standard mobile electronics application is also included. If a solar panel is employed, it is connected to an electronic system that adjusts the output of the solar panel based on the available photovoltaic power. Because plant metabolism is proportional to insolation, this system appropriately adjusts the amount of nutrient solution in accordance with the needs of the plants by delivering higher volumes of irrigation during periods of high insolation/photosynthesis and lesser volumes of irrigation to the plants during periods of low insolation/low photosynthesis. Importantly, when the plants enter the night metabolic cycle where they burn sugars instead of photosynthesizing, the irrigation system turns off and allows the plants to absorb the nutrients and beneficial microorganisms collected on the roots during the day within an interior column that maintains high levels of oxygenation and humidity. By means of this proportional irrigation, the solar power system is battery-independent. This advantageously avoids using storage batteries in solar power systems which are large, heavy, costly, inefficient, and dangerous. Additionally, because all component parts utilize direct current, no electrical power inverter element is necessary. Avoiding the necessity of DC/AC power inversion thus reduces the number of parts required and increases system dependability and efficiency.

Figure 35:
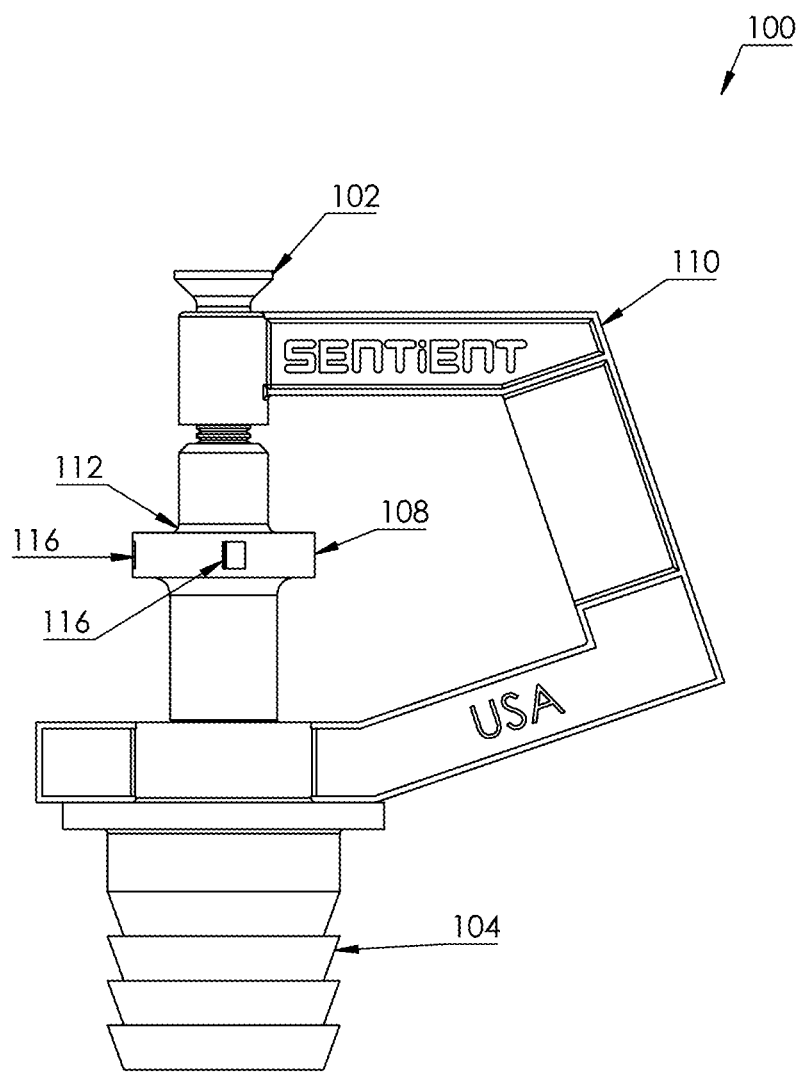
FIG. 35 is a front elevational view of a spray nozzle according to the present invention.
Figure 36:
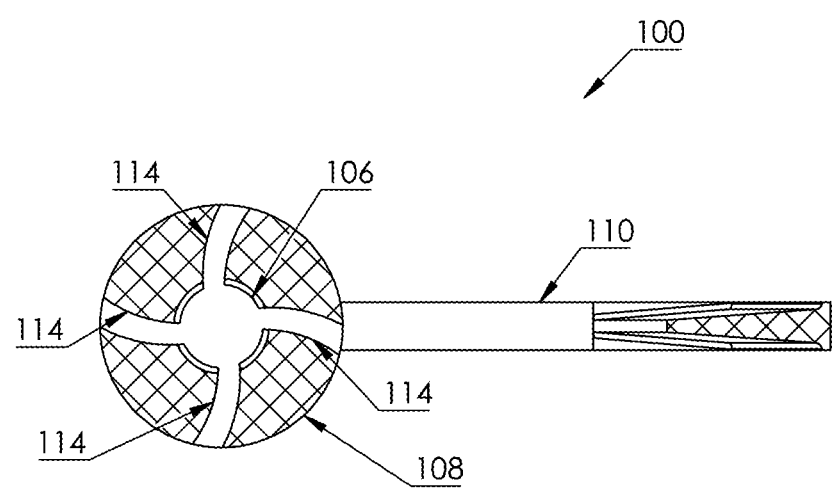
FIG. 36 is a cross-sectional view of a spray nozzle according to the present invention.

With specific reference to FIGS. 35-36, the spray nozzle 100 will now be described. The spray nozzle 100 includes a means for attaching the nozzle 100 to the lid 14. As shown, the nozzle 100 includes a fastener 102 sized and configured to pass through the central opening 94 in the lid 14 and be threaded to secure the nozzle 100 to the lid 14 and to remove it for cleaning or exchange without allowing for leakage of light, liquid water, water vapor or air. The spray nozzle 100 further includes a barbed member 104 sized and configured to connect to the irrigation conduit 98. The barb-fitting member 104 easily attaches to the flexible conduit 98 and remains fastened throughout the pressure range without leaking or coming apart. The barb fit also allows the conduit 98 to be easily removed and replaced as necessary. The spray nozzle 100 is in fluidic communication with the conduit 98 via a fluidic passageway 106. The passageway 106 delivers fluid to the spray head 108 that is mounted on a frame 110. The spray head 108 is mounted to the frame 110 such that the head 108 is free to rotate on an axis 112. The spray head 108 includes three curved interior channels 114 with each having an exit aperture 116. Fluid delivered under pressure from the water pump 96 enters the passageway 106 and further into the spray head 108 where it is diverted into the channels 114. The curvature of the channels 114 causes the spray head 108 to easily and quickly rotate about the axis 112 as the fluid exits the spray head 108 via the apertures 116. The spray head 108 accelerates to rotational velocity and delivers substantial amounts of nutrient solution at high ejection speeds in a circular spray pattern.

The spray nozzle 100 is designed with more than one channel 114. FIG. 36 shows four water channels 114 that are equally directed at an angle from its radius. Three channels 114 may also be employed. When nutrient solution is pumped up the irrigation conduit 98 to the base of the spray head 108, the diameter at the channels 114 is reduced which increases the fluidic velocity and rotational force with which the spray head spins. The nutrient solution is ejected out the distal end of the three channels 114 that are placed 120 degrees apart from one another. Because the solution is ejected at an angle with respect to the radius in turbine-like fashion, it causes the spray head 108 to spin. With low power input from the pump 96 and a low-friction rotational mount of the spray head 108 on the axis 112, the turbine head 108 ejects high volumes of rapidly jetting nutrient solution towards the top and inside walls of the grow column at an angle of incidence of approximately 90-110 degrees with respect to the bottom of the vertical sidewall. This solution splashes against the walls and breaks up into even finer particles. Some of these particles adhere through surface tension to the inside walls of the grow column where they cascade down in rivulets and are collected by the water directing channels 74 and routed onto and through the substrate and then on down to the plant roots. The rest of these particles rebound off the walls and settle onto the plant roots in a fine mist. The rest of this solution adheres through surface tension to the inside walls of the grow column where it cascades down and is collected by the water directing channels 74 and routed onto and through the substrate and then on down to the plant roots. Because of their high surface area-to-volume ratio, these finely aerosolized particles increase the rate of oxygen diffusion over the larger sized droplets or the running or standing nutrient solution found in other hydroponic or aeroponic systems. The spray head 108 is removable for easy cleaning and replacement. Also, the spray nozzle 100 is removable with respect to the head 108 for cleaning or replacement. Because the spray head 108 functions at any angle with respect to the axis of gravity, unlike most other hydroponic or aeroponic systems, the present invention will work on sloped or uneven ground.

In use, the assembled grow system 10 is a high-strength octagonal vertical tower that is highly resilient to weather conditions. The system 10 withstands high winds and protects the roots inside the tower from ultraviolent light. The stability of the tower is increased with the base 12 filled with nutrient solution. The base 12 can hold over 30 gallons of nutrient solution with over 240 pounds of weight contained within the base 12 preventing the entirety of the grow system from falling over in high winds. The same holds true for different sizes of the tower. The base can be filled with solution prior to mounting the wall system 16 or after the wall system 16 has been assembled on the base 12 through an opening in one of wall panels 34 in a lower ring level 36. The water pump 96 resident inside the base 12 is submerged by the solution and connected to a power source. The stand-alone system can be powered by AC or DC and/or by a single solar panel mounted on top of the structure. The grow system 10 may be employed outdoors, or indoors, in greenhouses, or under natural or under synthetic light such as LED lighting. Young seedlings or mature plants along with their accompanying growth medium substrate are inserted into the grow cups 50 of the tower. Alternatively, seeded substrate may be employed and inserted the grow cups 50. The planted substrate is inserted into grow cups 50 through the exterior opening 62. If seeded substrate is employed, the seed covers 82 are placed over the grow cups 50 to create a moist/humid/warm, greenhouse-like environment shielded from direct sunlight and protected from birds and other predators. The seed cover 82 prevents the substrate from drying out. The dome 84 of the seed cover 82 may be translucent or opaque. When the seeds have sprouted and plant cotyledons are formed, the seed covers 82 are removed from the grow cups 50. The grow cups 50 are designed to allow for maximum exposure of the substrate and plant roots to the interior of the tower where they are irrigated with nutrient solution. As plants mature, their roots grow out through the substrate and protrude into the interior of the system through the interior opening 70 and partially contact the inside walls of the tower beneath the grow cup 50. There they receive water, oxygen and nutrients as they are sprayed down upon them via the irrigation system 18. The nutrient spray hits the interior surfaces and naturally form rivulets cascading down the inside walls. These rivulets are collected and directed via the integral water-directing channels 74.

The brushless water pump 96 pumps pH-balanced nutrient solution that can be synthetic or organic through the flexible irrigation conduit 98 to the spray nozzle 100. The grow system 10 can be farmed with a variety of synthetic and organic nutrients. A bio bag that comprises a mesh bag filled with organic materials and a substrate that allows for microbial colonization may be placed into the reservoir of the base 12 containing highly oxygenated, pH-balanced nutrient solution. The microorganisms present in the organic materials of the bio bag multiply and colonize the substrate within the bag. These beneficial organisms then flow out the mesh bag due to reservoir water movement and like tea into the surrounding solution which is further pumped onto the exposed areas of the substrate and plant within the interior of the column where they further colonize the plant roots and drive biodynamic nutrient metabolism as previously described. A substitute for a bio bag is a bio box 135 which is also called a bio reactor 135 shown in FIG. 45. The bio box 135 is a rigid container for housing biodynamic media and/or other substance(s). The bio box 135 has a plurality of openings sized for the egress of microorganisms and other particles having a size that will pass through the pump and will not clog the pump or irrigation spray head. The openings in the bio box 135 are also sized to prevent larger particles that would clog the pump and irrigation spray head such as from compost, dirt, mulch, soil, growth medium, and other substance(s) inside the bio box from exiting the bio box into the surrounding solution and making its way to clog the pump and irrigation spray head as the bio box 135 is submerged in the nutrient solution and located in the base 12 generally near the pump. The bio box 135 includes an opening for inserting and removing and replacing medium/substance from its interior. In one variation, the bio-box 135 is comprised of two identical clamshell-like pieces that removably snap together by aligning and inserting projecting pins 137 of one piece of the container into holes 136 formed in the other piece. The bio box 135 may be any shape such as a sphere, cylinder or polygon or a combination of shapes. In one variation, the bio box 135 has at least one flat face on which it sits in the base 12. One or more angled faces help to anchor the bio box 135 by preventing the bio box 135 from migrating/rolling when submerged inside the base 12. In one variation, the bio box 135 is an icosahedron which is a polyhedron with 20 faces. The icosahedron advantageously provides a high surface area to interior volume ratio while preventing its migration along the base 12. The container walls/faces are rigid and porous. In one variation, the faces are meshed. The one or more flat faces help to anchor the bio box. In one variation, the bio box 135 may have any suitable number of faces The bio box 135 is submerged into the nutrient solution within the reservoir base. Biodynamic media such as organic compost as well as high surface area media such as expanded clay pellet partially fill the bio box 135. Because plants cannot adequately fix nitrogen and metabolize other essential nutrients without bacterial and fungal microorganisms acting as pathway intermediaries, the beneficial microbiota is cultivated in large quantities in the bio box 135 and made available to the plant roots. In soilless agriculture such as with the present invention, the rhizospheric microbiome is cultivated by placing biodynamic stock and an inert material with high surface area within the reservoir base 12. When the bio box 135 is placed in the nutrient solution, the microorganisms contained in the media metabolize the available aqueous nutrient, proliferate and colonize the surfaces of the adjacent grow media. Because the pump and irrigation cause the oxygenated nutrient solution in the reservoir to be in constant motion, the microorganisms are caused to continually flow out through the meshed/porous walls/faces of the bioreactor and into the surrounding solution where they are further pumped into the irrigation system and sprayed onto the plant roots. When thusly introduced, the microbiota adheres to the plant roots through a process known as rhizospheric colonization. This method of introducing, cultivating and irrigating the essential root microbiome significantly advances plant nutrient metabolism and, thereby, accelerates plant growth while also increasing the plants' resistance to root pathogens.

The spray nozzle 100 is a high-speed, high-volume rotating sprinkler head 108 mounted to the inside top of the lid 14. It may be fitted with a deflector to adjust the angle of the spray being ejected from the nozzle and or mounted to a standoff to adjust the points at which the spray hits the inside lid and walls of the system. The pump 96 can be operated continuously or set to timed on/off cycles via a controller. The pump 96 pushes water up the conduit 98 to the spray nozzle 100 to drive the spray head 108. When the spray nozzle 100 is under fluidic pressure from the pump 96, the spray head 108 rotates at a high speed and delivers substantial volumes of water in a circular spray pattern. This spray is aerosolized into small droplets which rain onto the plant roots growing through the substrate and into the interior of the tower. The spray also impacts the inside top of the lid 14 and the inside surfaces of the wall panels 34 at an angle of incidence between 90-110 degrees. Upon impact against these inner surfaces of the tower, the spray further atomizes forming a fine oxygenated mist that allows the plant rhizosphere to absorb high levels of oxygen for nutrient metabolism. A portion of the spray lands on the inner surfaces and cascades in rivulets down the insides of the wall panels 34 and is directed by the water-directing channels 74 to further irrigate the substrate and plant roots. The spray nozzle 100 delivers a constant or variable nutrient solution and operates during daylight hours in nominal condition on a "5 minute on/5 minute off" cycle. Plant roots stay moist during the off cycles due to the high humidity generated inside the growth tower and aided by the little reservoir 73 inside each grow cup 50. The reservoirs 73 prevent the plants from drying out during nutrient feed off cycles and in extreme high-heat weather conditions. This feeding cycle allows the plants' rhizospheric organisms sufficient time to metabolize the nutrients present in the solution without their being washed away by a continuous flow of solution. It also allows the organisms direct access to high levels of oxygen available from the ambient air inside the tower and through aeration of the fine droplets of nutrient solution via the high-speed spray head 108. Excess nutrient solution advantageously makes its way back down into the base 12 and is recycled. The tower system 10 uses approximately 1% of the water typically expended in traditional soil farming techniques. The grow cups 50 are angled such that the plant faces upwardly towards the sun. The plant leaves receive reflected light off the flat outer surfaces of the wall panels 34. The plants are provided with maximal sunlight exposure to the leaves and the leaves have sufficient room to grow away from the outer surface of the wall panels 34. Furthermore, the grow sites evenly distributed around the tower and the octagonal ring arrangement advantageously prevents plants on each wall from competing for light as well as provides alternating periods of direct and indirect sunlight through partial shading.

The wall system 16 has a plurality of grow cups arranged in a high-density pattern for maximal crop yields in a limited space. The grow system 10 has a small footprint and uses cubic footage very efficiently. The grow system 10 with five levels supports as many as 240 plants in a biodynamic soilless environment. Advantageously, a 5-level system 10 is easily accessible without the use of a ladder. The plants are well ventilated through convective cooling provided by openings in the lid 14 and wall panels 34. This ventilation provides high oxygen availability to the plant roots through exposure to moving ambient air within the tower. At harvest time, the entire plant, roots and substrate are easily removed from the growth cup 50 via the exterior opening 62 without any structural elements impeding them or severing the roots as the plant is pulled out of the top of the grow cup 50. The raised grow cups 50 prevent plants from being infected by soil-borne organisms or eaten by ground-dwelling pests. The tower system 10 can be farmed without insecticides and fungicides and with all organic and biodynamic inputs. Farming via this system will not deplete topsoil. Farmers can significantly increase their crop yields by growing vertically in this system while also reducing their water use as well as the use of traditional fertilizers, pesticides and other inputs necessary for horizontal farming in increasingly depleted topsoil. While in use, the system sinks carbon from the air and produces oxygen when plants photosynthesize and grow on it. After plants have been removed from the grow cups 50, the system 10 is prepared for the next cycle of plant cultivation. The nutrient solution can be easily decanted through a spigot at the reservoir base 12 whereupon the interior and exterior of the tower system 10 can be cleaned by hosing or wiping them down with water. No chemicals or scrubbing agents are required for cleaning. New seeds or seedlings can then be re-planted in the grow cups 50 for the next cycle of cultivation and harvest. The grow system 10 may also be farmed in rotation by transplanting, cultivating and harvesting plants by individual grow cup 50, by wall panel 34 or by ring level 36. For example, each of the eight sides of a single ring level 36 can be planted simultaneously and harvested by level 36 with each level 36 being harvested and replanted in rotation. In another example, plants can be planted and harvested by wall panel 34 week-after-week after eight weeks such that the plants in one wall panel 34 mature and are harvested and replanted in rotation on a weekly basis around the octagon. This allows the system 10 to continue to cultivate new plants without interruption.

Because seeds can be propagated in situ and do not need to be transplanted, the time, energy, equipment and overall cost involved in growing seeds to seedlings is greatly reduced. Substrate with seeds can be planted directly into the system and seedlings can be reared with the specialized seed covers 82 placed at each growth cup receptacle. Substrate and seed easily fit in growth cup receptacles designed to receive them without their being obstructed by net pots or other structural elements common to other systems. When the germinated plants have grown theft first cotyledon leaves, the covers can be easily removed for re-use at the next cycle. No transplantation is required.

Plants in the system of the present invention are easier to cultivate because the present system is ergonomically designed so that a single person of average height can tend to every plant on a tower comprising 1-5 ring levels by simply walking around the system or rotating it on a movable plate. Because no ladders are required, the job of tending plants in this system is safer than for comparable systems where plants cannot be reached by hand. The access port for checking pH, nutrient and water levels is adjacent to the top surface of the nutrient solution reservoir and the clear portholes allow water levels to be easily monitored. Adjusting for passive convective cooling is a simple matter of opening portholes or replacing porthole doors with louvered ones. Access ports are large and allow easy access for placing tools, hoses and other objects within them. Checking the sprinkler head is also easy because it is conveniently accessed with the self-centering lid that requires no fasteners to attach.

The system 10 does not require a careful vertical plumb to fully irrigate all the plants and operate correctly. It does not require rotating or other movement to function. When used in conjunction with the solar electric power subsystem, it does not need to be connected to an external source of power. At harvest, whole, undamaged live plants are easily removed from the growth cups with their entire root systems intact. No roots are torn away from the plant or left behind. Following harvest, the system is easily cleaned. Nutrient solution is easily decanted by opening the valve at the provided spigot. As there are no roots left behind at harvest and there are no obstructing structural elements within the interior of the column, the system can then be sprayed lightly with water on the outside and inside by removing the lid. It is not necessary to tip the tower over, gain access to hard-to-reach enclosed areas, use specialized tools to remove debris, scrub the parts down, or use chemical cleaners that can be harmful to plants and people. Owing to its novel snap-together design, the system is easy to assemble. Assembled ring levels are easily placed atop the reservoir and the ring level beneath it. The lid is easily fitted to the top of the tower. A person of average height can set the fifth ring level and lid without having to use a stool or ladder. If the user decides to fasten levels together, specialized click-lock fasteners of a unique design are provided. The system is similarly easy to disassemble. Fasteners are removed by cutting with a nipper dyke and each level can be removed from the adjoining level by hand. The octagonal panels are easily separated and disassembled into individual wall panels. The entire system is lightweight and can be compactly transported for re-assembly and re-use in a new location. All parts are dishwasher safe for cleaning.

The interior of the grow system 10 is simple and is free from bends, twists, turns, enclosed sections and other hard-to-access areas, thereby, making the entire system easily cleaned by spraying with a hose and water. All exterior and interior surfaces of the subject system are easily accessible, including the inside of the grow cup receptacles. In other systems that are designed with internal structures, including drip holes, plates and strengthening members, plant roots can attach to and grow on, around and through these structures. At harvest, these roots then tear away from the plants, causing damage to the harvested plant and leaving rotting root matter behind. This rotting root matter not only creates detritus which clogs the pump, nutrient solution delivery systems and other interior surfaces, but it also leads to additional pathogen growth which makes the plants that grow in these systems unhealthy for human consumption. Importantly, this system lacks any such structures and allows for plants to be harvested with their entire root systems intact. Such plants can be consumed immediately or placed in a bowl of water to remain living for later use. By leaving little behind at harvest, there is little to clean up afterwards. Furthermore, because the system is uniquely designed with novel watertight seams at the junctures between the wall panels 34 both vertically and horizontally, as well as at the junctures between the reservoir base and the lid 14, the problem of nutrient solution seepage, associated algae growth and mineral encrustation on the exterior surfaces of the system is avoided. Nor is there leakage at the joints where the grow cup receptacles attach to the wall panels due to their integral design. As a result, there is little to clean on the outside of the subject system. It can be easily hosed off or wiped down. Also, decanting nutrient solution from soilless cultivation systems can be very difficult to accomplish, as well as being laborious and wasteful. However, in the present invention, the inside of the reservoir base is divided into two sections that are canted towards a central channel and are also canted downwards from the back to front. This causes all nutrient solution and foreign matter that is within it to run down into the provided center channel, out the provided hole near the base of the reservoir and through a provided spigot. Unlike other systems, it is not necessary to tilt or move the system to thoroughly decant the solution. The spigot is further provided with a standard hose attachment which allows the user to connect a hose to it and use the nutrient solution for secondary purposes, such as to water flower and garden beds. In addition to the nutrient solution being re-used throughout the entire cultivation cycle of the plants, it is also possible to re-use the nutrient solution remaining in the reservoir for subsequent crop cycles. This recycling at harvest makes the best and most sustainable use of the key inputs of water and nutrients. The spray nozzle can be removed easily by hand for inspection and cleaning and because its fluid ejection holes are of a relatively large pore size, under normal operating conditions the head is not likely to clog. Cleaning out the spray nozzle only requires removing it from the stem and blowing into it. Alternately, removing and replacing it with a fresh one can be accomplished by unscrewing it from the cap at the top and removing it from the irrigation hose at its barbed connection. All component parts are dishwasher-safe. Because each wall panel is relatively small, panels can be deep-cleaned by stacking them in a dishwasher and running them through a cycle. They can also be placed in a washing machine or stacked in a cleaning bath in the reservoir base.

The simplicity with which the subject invention can be broken down and re-assembled makes it easy to store, ship and move from site to site. While the entire assembled system is designed for ease of handling and transport, it can be more compactly transported over large distances through disassembly. Wall panel rings can be easily separated from each other by removing them from their nesting steps. The rings can then be dis-assembled by unsnapping them at their side wall click-lock junctions. The entire system can be broken down into component parts that nest together for ease of transport and safety.

The grow system 10 reduces labor in planting, cultivating and harvesting crops. The system 10 is also easy to clean between harvesting and replanting cycles. The system 10 does not require footing on a perfectly flat surface nor exact vertical plumb. The grow system 10 is easily assembled on location by one person and can be broken down and re-assembled as needed. The wall panels 34 are easily stacked and the multiple bases 12 can be nested inside each other for shipping. The grow system 10 is extremely quiet with no noticeable pump noise and with the aesthetic qualities of both a sculpture and a fountain. The overall sound level emitted by the soft patter of drops on the inside walls is less than 20 dB within a 24-inch radius of the system, making the sound pressure approximately 10 times less powerful than traditional vertical hydroponic drip systems, making it ideal for indoor use. The tower system 10 can be scaled down in size to function as a table top system for growing plants and herbs inside a kitchen or home. Plants grow quickly and vigorously in the grow system 10.

It is understood that various modifications may be made to the embodiments of the aeroponic grow system disclosed herein. Therefore, the above description should not be construed as limiting, but merely as exemplifications of preferred embodiments. Those skilled in the art will envision other modifications within the scope and spirit of the present disclosure.

I claim:

1. An aeroponic grow system, comprising:
a cover;
a base having a bottom wall integral with a sidewall; the sidewall encompassing and upstanding from the bottom wall and defining a reservoir; the sidewall having an inner surface, an outer surface and a top end; and
a wall system located between the base and the cover; the wall system including a plurality of planar, modular wall panels removably interconnected at their first and second side edges to form a ring level; each ring level having an equal number of wall panels; the wall system having one or more ring levels stacked upon each other with a bottommost ring level being stacked directly onto the sidewall of the base and the cover being located on a topmost ring level defining an interior; wherein the wall panels have an inner surface and an outer surface transected by a plurality of grow sites;
wherein each grow sites of the plurality of grow sites comprises: a quadrilateral opening in the wall panel; each quadrilateral opening having a top and a bottom interconnected by a first side and a second side, said first and second sides integrally attached to the wall panel; wherein the first and second side further comprise: a first interior sidewall extending into the interior at the first side; the first interior sidewall having a first interior edge and a first bottom edge; a second interior sidewall extending into the interior at the second side; the second interior sidewall having a second interior edge and a second bottom edge; said first and second interior sidewalls extending directly from the inner surface of the wall panel; a first back wall extending from the first interior edge; a second back wall extending from the second interior edge; wherein the first backwall and the second backwall extend inward toward each other and substantially perpendicular to the first and second interior sidewalls respectively; a first exterior side extending outwardly from the outer surface; a second exterior side extending outwardly from the outer surface; the first exterior side having a first top edge and a first exterior edge; the second exterior side having a second top edge and a second exterior edge; said first and second exterior side extending directly from the outer surface of the wall panel; each grow site of the plurality of grow sites having an exterior front wall extending between the first and second exterior sides at the first and second exterior edges; the exterior front wall having a front top edge.

2. The aeroponic grow system of claim 1 wherein each ring level comprises eight wall panels to define an octagonal shape.

3. The aeroponic grow system of claim 1 wherein the inner surface includes at least one water-directing channel above each grow site configured to direct water into the grow site.

4. The aeroponic grow system of claim 1 wherein the grow site is frusto pyramidal in shape of an inverted four-sided pyramid.

5. The aeroponic grow system of claim 1 wherein the first interior sidewall is perpendicular to the inner surface; the second interior sidewall is perpendicular to the inner surface; the first exterior side is perpendicular to the outer surface; the second exterior side is perpendicular to the outer surface.

6. The aeroponic grow system of claim 1 wherein the base is unitary having a plurality angled side walls equal to the number of wall panels in each ring level; the base having an interior ledge along at least part of the top end configured to receive the bottommost ring level such that the wall panels rest directly on the side walls of the base.

7. The aeroponic grow system of claim 1 wherein grow sites are configured to support plants such that roots protrude through an interior opening into the interior of the system and such that foliage grows out of an exterior opening.

8. The aeroponic grow system of claim 7 wherein the interior opening is L-shaped.

9. The aeroponic grow system of claim 1 wherein each grow site includes a secondary reservoir; the secondary reservoir being configured to retain a volume of liquid.

10. The aeroponic grow system of claim 1 wherein each grow site is a rectangular cuboid angled with respect to the wall panel.

11. The aeroponic grow system of claim 1 wherein each grow site includes an exterior opening; and further including one or more removable covers connected to the grow site to cover the exterior opening.

12. The aeroponic grow system of claim 1 wherein the grow sites are arranged in a checkerboard pattern on each wall panel.

13. The aeroponic grow system of claim 1 wherein each wall panel includes: a top end and bottom end interconnected by the first and second side edges; a top ledge formed at the top end of the wall and configured to receive the bottom end of the wall panel of a vertically adjacent wall panel such that the inner surfaces of vertically adjacent wall panels are coplanar.

14. The aeroponic grow system of claim 1 wherein the wall panel includes a hemispherical ball-joint tongue formed along the first side edge of the wall panel and configured to mate with a complementary hemispherical groove formed along the second side edge of the wall panel to create a click-lock seam that prevents water egress.

15. The aeroponic grow system of claim 1 wherein one of the wall panels of the bottommost ring level includes a vent hole and the cover includes a vent hole.

16. An aeroponic grow system, comprising:
a cover;
a base having a bottom wall integral with a sidewall; the sidewall encompassing and upstanding from the bottom wall and defining a reservoir; the sidewall having an inner surface, an outer surface and a top end; and
a wall system located between the base and the cover; the wall system including a plurality of planar, modular wall panels removably interconnected at their first and second side edges to form a ring level; each ring level having an equal number of wall panels; the wall system having one or more ring levels stacked upon each other with a bottommost ring level being stacked directly onto the sidewall of the base and the cover being located on a topmost ring level defining an interior; wherein the wall panels have an inner surface and an outer surface transected by a plurality of grow sites, such that the plurality of grow sites are open to a singular central cavity;

wherein the base is unitary having a plurality of angled side walls equal to the number of wall panels in each ring level; the base having an interior ledge along at least part of the top end configured to receive the bottommost ring level such that the wall panels rest directly on the side walls of the base and the inner surfaces of the wall panels of the bottommost ring level are continuous with the inner surface of the base; and an irrigation system including a pump located in the base, a conduit connected to the pump and extending upwardly in the interior and connected to a spray nozzle; the irrigation system being configured to deliver solution from the reservoir and be ejected from the spray nozzle onto the inner surface of the wall panels and collect back into the reservoir.

17. The aeroponic grow system of claim 16 wherein the sidewall of the base includes a drain hole and the bottom wall comprises two opposing surfaces angled toward each other and canted toward the drain hole.

18. The aeroponic grow system of claim 16 wherein the inner surface includes at least one water-directing channel above each grow site configured to direct water into the grow site.

19. An aeroponic grow system, comprising:
a cover;
a base having a bottom wall integral with a sidewall; the sidewall encompassing and upstanding from the bottom wall and defining a reservoir; the sidewall having an inner surface, an outer surface and a top end; and
a wall system located between the base and the cover; the wall system including a plurality of planar, modular wall panels removably interconnected at their first and second side edges to form a ring level; each ring level having an equal number of wall panels; the wall system having one or more ring levels stacked upon each other with a bottommost ring level being stacked directly onto the sidewall of the base and the cover being located on a topmost ring level defining an interior; wherein the wall panels have an inner surface and an outer surface transected by a plurality of grow sites; and a nutrient solution delivery system comprising:
a submersible pump located in the base; the pump having a fluidic inlet and fluidic outlet;
a conduit having a diameter and extending between a proximal end and a distal end; the proximal end being connected to the fluidic outlet of the pump; the conduit extending vertically along a central axis of the system;
a spray nozzle connected to the cover; the distal end of the conduit being connected to the spray nozzle such that the conduit is in fluidic communication with the spray nozzle;
a spray head in fluidic communication with the spray nozzle and rotatable with respect to a spray nozzle; the spray head having an axis of rotation; the spray head having at least one exit port; each exit port having a cross-section smaller than the diameter of the conduit and configured to eject fluid tangent to a radial axis to rotate the spray head; the radial axis lying in a plane perpendicular to the axis of rotation.

20. The aeroponic grow system of claim 19 wherein the spray head is configured to eject fluid such that fluid strikes the inner surface.

21. The aeroponic grow system of claim 19 wherein the cover has a concave surface and the spray head is configured to eject fluid to strike the concave surface.

* * * * *